United States Patent
Patel et al.

(10) Patent No.: US 11,966,895 B2
(45) Date of Patent: Apr. 23, 2024

(54) REFUND CENTERS FOR PROCESSING AND DISPENSING VENDING MACHINE REFUNDS VIA AN MDB ROUTER

(71) Applicant: PAYRANGE INC., Portland, OR (US)

(72) Inventors: Paresh K. Patel, Portland, OR (US); Chris Sokol, Portland, OR (US)

(73) Assignee: PayRange Inc., Portland, OR (US)

( * ) Notice: Subject to any disclaimer, the term of this patent is extended or adjusted under 35 U.S.C. 154(b) by 520 days.

(21) Appl. No.: 15/893,514

(22) Filed: Feb. 9, 2018

(65) Prior Publication Data
US 2018/0165908 A1  Jun. 14, 2018

Related U.S. Application Data

(63) Continuation of application No. PCT/US2017/015676, filed on Jan. 30, 2017, which
(Continued)

(51) Int. Cl.
*G06Q 20/18* (2012.01)
*G06Q 20/20* (2012.01)
(Continued)

(52) U.S. Cl.
CPC ............ *G06Q 20/18* (2013.01); *G06Q 20/20* (2013.01); *G06Q 20/202* (2013.01);
(Continued)

(58) Field of Classification Search
None
See application file for complete search history.

(56) References Cited

U.S. PATENT DOCUMENTS

| 4,374,557 A | 2/1983 | Sugimoto et al. |
| D295,637 S | 5/1988 | Wells-Papanek et al. |

(Continued)

FOREIGN PATENT DOCUMENTS

| CN | 1561508 A | * | 1/2005 | ............ G06Q 20/02 |
| CN | 204375056 U | * | 6/2015 | |

(Continued)

OTHER PUBLICATIONS

Raja et al. A Stochastic Game Theoretic Model for Expanding ATM Services. https://ieeexplore.ieee.org/stamp/stamp.jsp?tp=&arnumber=7395687 (Year: 2015).*

(Continued)

*Primary Examiner* — El Mehdi Oussir
(74) *Attorney, Agent, or Firm* — Morgan, Lewis & Bockius LLP

(57) ABSTRACT

A method is performed at an electronic payment module with one or more processors, memory, a slave interface that couples the module with an unattended machine via a multi-drop bus (MDB), and one or more host interfaces that couple the module with at least one payment peripheral of the unattended machine. The method also includes: receiving, from a refund center, a request to issue an approved refund of a predetermined amount and one or more criteria that must be satisfied before dispensing the predetermined amount. In accordance with a determination that the one or more criteria are met, the method includes issuing (i) a signal to the unattended machine, via the slave interface, that the at least one payment peripheral is unavailable and (ii) a signal to the at least one payment peripheral, via the one or more host interfaces, to dispense the predetermined amount.

12 Claims, 51 Drawing Sheets

Related U.S. Application Data is a continuation-in-part of application No. 14/641,236, filed on Mar. 6, 2015, now abandoned, which is a continuation-in-part of application No. 14/320,534, filed on Jun. 30, 2014, now abandoned, which is a continuation-in-part of application No. 14/214,644, filed on Mar. 14, 2014, now Pat. No. 8,856,045, which is a continuation-in-part of application No. 29/477,025, filed on Dec. 18, 2013, now Pat. No. Des. 755,183.

(60) Provisional application No. 62/289,158, filed on Jan. 29, 2016, provisional application No. 62/081,492, filed on Nov. 18, 2014, provisional application No. 61/917,936, filed on Dec. 18, 2013.

(51) Int. Cl.
  *G06Q 20/32* (2012.01)
  *G06Q 20/40* (2012.01)
  *G07F 7/00* (2006.01)

(52) U.S. Cl.
  CPC ......... *G06Q 20/327* (2013.01); *G06Q 20/407* (2013.01); *G07F 7/005* (2013.01)

(56) References Cited

U.S. PATENT DOCUMENTS

| | | |
|---|---|---|
| 5,479,602 A | 12/1995 | Baecker et al. |
| 5,844,808 A | 12/1998 | Konsmo et al. |
| 5,880,733 A | 3/1999 | Horvitz et al. |
| 5,892,900 A | 4/1999 | Ginter et al. |
| D412,154 S | 7/1999 | Lok |
| 5,955,718 A | 9/1999 | Levasseur |
| D416,230 S | 11/1999 | Narumo et al. |
| 6,056,194 A | 5/2000 | Kolls |
| 6,390,269 B1 | 5/2002 | Billington |
| D461,476 S | 8/2002 | Evers et al. |
| 6,462,644 B1 | 10/2002 | Howell et al. |
| D467,935 S | 12/2002 | Coleman |
| 6,505,095 B1 | 1/2003 | Kolls |
| D474,154 S | 5/2003 | Lai |
| 6,584,309 B1 | 6/2003 | Whigham |
| 6,594,759 B1 | 7/2003 | Wang |
| 6,743,095 B2 | 6/2004 | Cole et al. |
| D496,370 S | 9/2004 | Red |
| 6,793,134 B2 | 9/2004 | Clark |
| 6,810,234 B1 | 10/2004 | Rasanen et al. |
| 6,840,860 B1 | 1/2005 | Okuniewicz |
| D519,465 S | 4/2006 | Sirichai et al. |
| 7,085,556 B2 | 8/2006 | Offer |
| 7,110,954 B2 | 9/2006 | Yung et al. |
| 7,127,236 B2 | 10/2006 | Khan et al. |
| 7,131,575 B1 | 11/2006 | Kolls |
| D547,761 S | 7/2007 | Hui |
| D578,135 S | 10/2008 | Nathan |
| 7,455,223 B1 | 11/2008 | Wilson et al. |
| 7,458,510 B1 | 12/2008 | Zhou |
| 7,464,867 B1 | 12/2008 | Kolls |
| 7,493,288 B2 | 2/2009 | Biship |
| 7,513,419 B1 * | 4/2009 | Crews .................. G06Q 20/042 |
| | | 235/379 |
| D594,024 S | 6/2009 | King |
| D599,806 S | 9/2009 | Brown et al. |
| D599,812 S | 9/2009 | Hirsch |
| D601,142 S | 9/2009 | Lindley |
| 7,672,680 B1 | 3/2010 | Lee et al. |
| D613,300 S | 4/2010 | Chaudhri |
| D614,640 S | 4/2010 | Viegers et al. |
| 7,690,495 B1 | 4/2010 | Rolls |
| 7,721,958 B2 | 5/2010 | Belfer et al. |
| D625,326 S | 10/2010 | Allen |
| 7,848,980 B2 | 12/2010 | Carlson |
| D631,060 S | 1/2011 | Flik et al. |
| D637,604 S | 5/2011 | Brinda |
| D638,853 S | 5/2011 | Brinda |
| D640,282 S | 6/2011 | Woo |
| D640,284 S | 6/2011 | Woo et al. |
| 7,962,369 B2 | 6/2011 | Rosenberg |
| 7,965,693 B2 | 6/2011 | Jiang et al. |
| 7,983,670 B1 | 7/2011 | Elliott |
| D644,240 S | 8/2011 | Arnold et al. |
| 8,020,763 B1 | 9/2011 | Kowalchyk |
| D649,154 S | 11/2011 | Vance et al. |
| 8,059,101 B2 | 11/2011 | Westerman |
| D651,608 S | 1/2012 | Allen |
| D651,609 S | 1/2012 | Pearson et al. |
| D656,947 S | 4/2012 | Vance et al. |
| 8,157,167 B2 | 4/2012 | Cost et al. |
| D658,667 S | 5/2012 | Cho et al. |
| D662,508 S | 6/2012 | Kim |
| 8,201,736 B2 * | 6/2012 | Doglioni Majer ...... G07F 9/009 |
| | | 221/9 |
| D662,942 S | 7/2012 | Trabona et al. |
| D664,988 S | 8/2012 | Gleasman et al. |
| 8,255,323 B1 | 8/2012 | Casey et al. |
| D669,899 S | 10/2012 | Cheng |
| D672,364 S | 12/2012 | Reyna |
| 8,346,670 B2 | 1/2013 | Hasson et al. |
| 8,356,754 B2 | 1/2013 | Johnson et al. |
| 8,376,227 B2 | 2/2013 | Hammad et al. |
| 8,396,589 B2 | 3/2013 | Katzenstein Garibaldi et al. |
| D681,050 S | 4/2013 | Ray et al. |
| 8,412,626 B2 | 4/2013 | Hirson et al. |
| D681,660 S | 5/2013 | Matas |
| 8,438,066 B1 | 5/2013 | Yuen |
| D687,056 S | 7/2013 | Matas et al. |
| 8,479,190 B2 | 7/2013 | Sueyoshi et al. |
| 8,489,140 B2 | 7/2013 | Weiner et al. |
| 8,514,775 B2 | 8/2013 | Frecassetti et al. |
| 8,517,766 B2 | 8/2013 | Golko et al. |
| D691,140 S | 10/2013 | Huang |
| D692,456 S | 10/2013 | Brinda |
| 8,548,426 B2 | 10/2013 | Smith |
| 8,577,734 B2 | 11/2013 | Treyz |
| 8,583,496 B2 | 11/2013 | Yoo et al. |
| D695,305 S | 12/2013 | Bhatia et al. |
| 8,596,528 B2 | 12/2013 | Fernandes et al. |
| 8,596,529 B1 | 12/2013 | Kolls |
| 8,600,899 B1 | 12/2013 | Davis |
| 8,606,702 B2 | 12/2013 | Ruckart |
| 8,615,445 B2 | 12/2013 | Dorsey et al. |
| 8,645,971 B2 | 2/2014 | Carlson et al. |
| D701,527 S | 3/2014 | Brinda et al. |
| 8,700,530 B2 | 4/2014 | Smith |
| 8,707,276 B2 | 4/2014 | Hill et al. |
| 8,712,893 B1 | 4/2014 | Brandmaier |
| D705,244 S | 5/2014 | Arnold et al. |
| D706,802 S | 6/2014 | Myung et al. |
| D706,810 S | 6/2014 | Jones et al. |
| D707,234 S | 6/2014 | Tan |
| 8,761,809 B2 | 6/2014 | Faith et al. |
| 8,769,643 B1 | 7/2014 | Ben Ayed |
| 8,788,341 B1 * | 7/2014 | Patel ...................... G07F 9/026 |
| | | 705/14.53 |
| 8,794,734 B2 | 8/2014 | Drummond |
| 8,810,430 B2 | 8/2014 | Proud |
| 8,819,659 B2 | 8/2014 | Ramer et al. |
| 8,831,677 B2 | 9/2014 | Villa-Real |
| 8,838,481 B2 | 9/2014 | Moshfeghi |
| 8,850,421 B2 | 9/2014 | Proud |
| D716,339 S | 10/2014 | Lee |
| 8,856,045 B1 | 10/2014 | Patel et al. |
| D717,747 S | 11/2014 | Nishimoto et al. |
| 8,881,975 B1 | 11/2014 | Matthews |
| 8,898,620 B2 | 11/2014 | Eizenman et al. |
| D718,779 S | 12/2014 | Hang et al. |
| 8,903,737 B2 | 12/2014 | Cameron et al. |
| D720,765 S | 1/2015 | Xie et al. |
| D721,374 S | 1/2015 | Liu |
| 8,958,846 B2 | 2/2015 | Freeny, Jr. |
| D724,603 S | 3/2015 | Williams et al. |
| D726,736 S | 4/2015 | Smirin et al. |

(56) References Cited

U.S. PATENT DOCUMENTS

| | | | |
|---|---|---|---|
| D726,757 S | 4/2015 | Angelides | |
| D727,337 S | 4/2015 | Kim et al. | |
| D727,341 S | 4/2015 | Park | |
| 9,001,047 B2 | 4/2015 | Forstall | |
| 9,210,247 B2 | 4/2015 | Vance et al. | |
| D730,403 S | 5/2015 | Farmer | |
| 9,037,492 B2 | 5/2015 | White | |
| D730,904 S | 6/2015 | Liu | |
| D735,219 S | 7/2015 | Young-Ri et al. | |
| D735,236 S | 7/2015 | Keavney | |
| 9,092,768 B2 | 7/2015 | Breitenbach et al. | |
| D735,751 S | 8/2015 | Hwang et al. | |
| D736,248 S | 8/2015 | Chen et al. | |
| 9,098,961 B1 * | 8/2015 | Block | G07F 19/201 |
| D741,865 S | 10/2015 | Sundermeyer et al. | |
| D741,897 S | 10/2015 | Wilkinson et al. | |
| D745,537 S | 12/2015 | Smirin et al. | |
| D746,866 S | 1/2016 | Memoria et al. | |
| D748,113 S | 1/2016 | Gray | |
| 9,262,771 B1 | 2/2016 | Patel | |
| 9,272,713 B1 | 3/2016 | Dvoskin et al. | |
| D754,744 S | 4/2016 | Tijssen et al. | |
| D755,183 S | 5/2016 | Patel et al. | |
| 9,395,888 B2 | 7/2016 | Schiplacoff et al. | |
| D763,888 S | 8/2016 | Patel | |
| D763,905 S | 8/2016 | Patel | |
| D764,532 S | 8/2016 | Patel | |
| D765,101 S | 8/2016 | Park et al. | |
| 9,424,603 B2 | 8/2016 | Hammad | |
| 9,483,763 B2 | 11/2016 | Van Os | |
| D773,480 S | 12/2016 | Zhou et al. | |
| D773,508 S | 12/2016 | Patel | |
| 9,547,859 B2 * | 1/2017 | Patel | G06Q 20/3821 |
| D795,287 S | 8/2017 | Sun | |
| D806,741 S | 1/2018 | Majernik et al. | |
| D808,425 S | 1/2018 | Park et al. | |
| D808,998 S | 1/2018 | Wu et al. | |
| 9,875,473 B2 | 1/2018 | Patel | |
| D809,540 S | 2/2018 | Vedrody et al. | |
| 9,898,884 B1 | 2/2018 | Arora et al. | |
| D816,701 S | 5/2018 | Ball et al. | |
| 10,121,318 B2 | 11/2018 | LeMay et al. | |
| 10,163,292 B1 | 12/2018 | Romero | |
| 10,210,501 B2 | 2/2019 | Low et al. | |
| 10,217,151 B1 | 2/2019 | Greiner et al. | |
| 10,304,057 B1 | 5/2019 | Powell | |
| 10,380,573 B2 | 8/2019 | Lin et al. | |
| 10,410,194 B1 | 9/2019 | Grassadonia | |
| 10,423,949 B2 | 9/2019 | Lvons et al. | |
| 10,824,828 B2 | 11/2020 | Ostri | |
| 10,977,642 B2 | 4/2021 | Khan | |
| 11,010,759 B1 | 5/2021 | Maeng | |
| 11,042,852 B1 * | 6/2021 | Wadhwa | G06Q 20/40145 |
| 11,074,577 B1 | 7/2021 | Soccorsy et al. | |
| 11,227,275 B2 | 1/2022 | Van Heerden et al. | |
| 11,308,462 B2 | 4/2022 | Berman et al. | |
| 11,564,266 B1 * | 1/2023 | Kahn | H04M 15/785 |
| 2002/0016740 A1 | 2/2002 | Ogasawara | |
| 2002/0164953 A1 | 11/2002 | Curtis | |
| 2003/0009385 A1 * | 1/2003 | Tucciarone | H04L 9/40 705/26.1 |
| 2003/0089767 A1 | 5/2003 | Kiyomatsu | |
| 2003/0101096 A1 | 5/2003 | Suzuki et al. | |
| 2003/0110097 A1 | 6/2003 | Lei | |
| 2003/0130902 A1 | 7/2003 | Athwal | |
| 2003/0158891 A1 | 8/2003 | Lei et al. | |
| 2003/0191811 A1 | 10/2003 | Hashem et al. | |
| 2003/0206542 A1 | 11/2003 | Holder | |
| 2003/0236872 A1 | 12/2003 | Atkinson | |
| 2004/0049454 A1 | 3/2004 | Kanno et al. | |
| 2004/0117262 A1 | 6/2004 | Berger et al. | |
| 2004/0122685 A1 | 6/2004 | Bunce et al. | |
| 2004/0133653 A1 | 7/2004 | Defosse | |
| 2005/0021459 A1 | 1/2005 | Bell | |
| 2005/0043011 A1 | 2/2005 | Murray | |
| 2005/0080510 A1 * | 4/2005 | Bates | G06Q 30/0641 700/241 |
| 2005/0101295 A1 | 5/2005 | Rupp | |
| 2005/0177798 A1 | 8/2005 | Thomson et al. | |
| 2005/0181804 A1 | 8/2005 | Misikangas et al. | |
| 2005/0232421 A1 | 10/2005 | Simons et al. | |
| 2005/0234776 A1 | 10/2005 | Jacoves | |
| 2006/0043175 A1 | 3/2006 | Fu et al. | |
| 2006/0052157 A1 | 3/2006 | Walker et al. | |
| 2006/0123335 A1 | 6/2006 | Sanchez et al. | |
| 2007/0050083 A1 | 3/2007 | Signorelli et al. | |
| 2007/0083287 A1 | 4/2007 | Defosse et al. | |
| 2007/0095901 A1 | 5/2007 | Illingworth | |
| 2007/0119680 A1 | 5/2007 | Saltsov et al. | |
| 2007/0159994 A1 | 7/2007 | Brown et al. | |
| 2007/0186105 A1 | 8/2007 | Bailey et al. | |
| 2007/0187491 A1 | 8/2007 | Godwin et al. | |
| 2007/0227856 A1 | 10/2007 | Gopel | |
| 2007/0255653 A1 | 11/2007 | Tumminaro | |
| 2008/0010190 A1 | 1/2008 | Rackley, III et al. | |
| 2008/0010193 A1 | 1/2008 | Rackley, III et al. | |
| 2008/0033880 A1 | 2/2008 | Fiebiger et al. | |
| 2008/0040265 A1 | 2/2008 | Rackley | |
| 2008/0126213 A1 | 5/2008 | Robertson et al. | |
| 2008/0141033 A1 | 6/2008 | Ginter et al. | |
| 2008/0154727 A1 | 6/2008 | Carlson | |
| 2008/0154735 A1 | 6/2008 | Carlson | |
| 2008/0163257 A1 | 7/2008 | Carlson et al. | |
| 2008/0167017 A1 | 7/2008 | Wentker et al. | |
| 2008/0167991 A1 | 7/2008 | Carlson et al. | |
| 2008/0183480 A1 | 7/2008 | Carlson et al. | |
| 2008/0201226 A1 | 8/2008 | Carlson et al. | |
| 2008/0208762 A1 | 8/2008 | Arthur et al. | |
| 2008/0249658 A1 * | 10/2008 | Walker | G07F 9/02 700/236 |
| 2008/0254853 A1 | 10/2008 | Wright et al. | |
| 2008/0255947 A1 | 10/2008 | Friedman | |
| 2008/0319913 A1 | 12/2008 | Wiechers et al. | |
| 2009/0037284 A1 | 2/2009 | Lewis et al. | |
| 2009/0076896 A1 | 3/2009 | Dewitt | |
| 2009/0099961 A1 | 4/2009 | Ogilvy | |
| 2009/0106160 A1 | 4/2009 | Skowronek | |
| 2009/0119190 A1 | 5/2009 | Realini | |
| 2009/0171682 A1 | 7/2009 | Dixon et al. | |
| 2009/0287349 A1 * | 11/2009 | Mardiks | G06Q 30/06 705/51 |
| 2009/0288173 A1 * | 11/2009 | Mardiks | G06Q 30/06 726/27 |
| 2009/0303982 A1 | 12/2009 | Blachman et al. | |
| 2009/0306818 A1 | 12/2009 | Slagley et al. | |
| 2009/0306819 A1 | 12/2009 | Insolia | |
| 2009/0313125 A1 * | 12/2009 | Roh | G07F 9/02 345/173 |
| 2009/0313132 A1 | 12/2009 | McKenna et al. | |
| 2009/0327089 A1 | 12/2009 | Kanno et al. | |
| 2010/0061294 A1 | 3/2010 | Proctor, Jr. | |
| 2010/0082485 A1 | 4/2010 | Lin et al. | |
| 2010/0094456 A1 | 4/2010 | Simpkins et al. | |
| 2010/0105454 A1 * | 4/2010 | Weber | G07F 17/32 463/1 |
| 2010/0198400 A1 * | 8/2010 | Pascal | G11B 31/00 700/232 |
| 2010/0227671 A1 | 9/2010 | Laaroussi et al. | |
| 2010/0276484 A1 | 11/2010 | Banerjee et al. | |
| 2010/0280956 A1 | 11/2010 | Chutorash | |
| 2010/0312692 A1 | 12/2010 | Teicher | |
| 2010/0320266 A1 | 12/2010 | White | |
| 2010/0329285 A1 | 12/2010 | Stanton | |
| 2011/0029405 A1 | 2/2011 | Cronin | |
| 2011/0040686 A1 | 2/2011 | Carlson | |
| 2011/0125561 A1 | 5/2011 | Marcus | |
| 2011/0153436 A1 | 6/2011 | Krampe | |
| 2011/0153442 A1 | 6/2011 | Krampe | |
| 2011/0153495 A1 | 6/2011 | Dixon et al. | |
| 2011/0172848 A1 | 7/2011 | Breitenbach et al. | |
| 2011/0178883 A1 | 7/2011 | Granbery | |
| 2011/0225067 A1 | 9/2011 | Dunwoody | |
| 2011/0238476 A1 | 9/2011 | Carr | |
| 2011/0244799 A1 | 10/2011 | Roberts et al. | |

(56) References Cited

U.S. PATENT DOCUMENTS

| | | |
|---|---|---|
| 2011/0251892 A1 | 10/2011 | Laracey |
| 2011/0251910 A1 | 10/2011 | Dimmick |
| 2011/0276636 A1 | 11/2011 | Cheng et al. |
| 2011/0289023 A1 | 11/2011 | Forster et al. |
| 2012/0011024 A1 | 1/2012 | Dorsey et al. |
| 2012/0016731 A1 | 1/2012 | Smith et al. |
| 2012/0029691 A1 | 2/2012 | Mockus et al. |
| 2012/0030047 A1 | 2/2012 | Fuentes et al. |
| 2012/0036045 A1 | 2/2012 | Lowe et al. |
| 2012/0066096 A1 | 3/2012 | Penide |
| 2012/0078735 A1 | 3/2012 | Bauer et al. |
| 2012/0108173 A1 | 5/2012 | Hahm et al. |
| 2012/0136478 A1* | 5/2012 | Anand ............... G06Q 20/3278 700/237 |
| 2012/0150742 A1 | 6/2012 | Poon et al. |
| 2012/0158172 A1 | 6/2012 | Wencslao |
| 2012/0158528 A1 | 6/2012 | Hsu et al. |
| 2012/0160912 A1 | 6/2012 | Laracey |
| 2012/0197740 A1 | 8/2012 | Grigg et al. |
| 2012/0203666 A1 | 8/2012 | Torossian et al. |
| 2012/0231844 A1 | 9/2012 | Coppinger |
| 2012/0246074 A1 | 9/2012 | Annamalai et al. |
| 2012/0253852 A1 | 10/2012 | Pourfailah |
| 2012/0254631 A1 | 10/2012 | Skillman et al. |
| 2012/0255653 A1 | 10/2012 | Chin |
| 2012/0258773 A1 | 10/2012 | Alvarez Rivera et al. |
| 2012/0276845 A1 | 11/2012 | Wikander |
| 2012/0290472 A1 | 11/2012 | Mullen et al. |
| 2012/0296826 A1 | 11/2012 | Bergdale et al. |
| 2012/0303528 A1 | 11/2012 | Weiner et al. |
| 2012/0316963 A1 | 12/2012 | Moshfeghi |
| 2012/0330764 A1 | 12/2012 | Nahidipour |
| 2012/0330844 A1 | 12/2012 | Kaufman |
| 2013/0030931 A1 | 1/2013 | Moshfeghi |
| 2013/0054016 A1 | 2/2013 | Canter et al. |
| 2013/0054336 A1 | 2/2013 | Raylin |
| 2013/0054395 A1 | 2/2013 | Cyr et al. |
| 2013/0067365 A1 | 3/2013 | Shrufi et al. |
| 2013/0085835 A1 | 4/2013 | Horowitz |
| 2013/0087050 A1 | 4/2013 | Studor et al. |
| 2013/0100886 A1 | 4/2013 | Cherian |
| 2013/0110296 A1 | 5/2013 | Khoo et al. |
| 2013/0117490 A1 | 5/2013 | Harriman |
| 2013/0117738 A1 | 5/2013 | Livingston et al. |
| 2013/0124289 A1 | 5/2013 | Fisher |
| 2013/0126607 A1 | 5/2013 | Behjat |
| 2013/0143498 A1 | 6/2013 | Niemi |
| 2013/0166448 A1 | 6/2013 | Narayanan |
| 2013/0185150 A1 | 7/2013 | Crum |
| 2013/0191789 A1 | 7/2013 | Calman |
| 2013/0217333 A1 | 8/2013 | Sprigg et al. |
| 2013/0246171 A1 | 9/2013 | Carapelli |
| 2013/0246364 A1 | 9/2013 | Bhavith |
| 2013/0267121 A1 | 10/2013 | Hsu |
| 2013/0267176 A1 | 10/2013 | Hertel et al. |
| 2013/0275303 A1 | 10/2013 | Fiore |
| 2013/0275305 A1 | 10/2013 | Duplan |
| 2013/0278622 A1 | 10/2013 | Sun et al. |
| 2013/0282590 A1 | 10/2013 | Rajarethnam et al. |
| 2013/0297422 A1 | 11/2013 | Hunter et al. |
| 2013/0311379 A1 | 11/2013 | Smith |
| 2013/0311382 A1 | 11/2013 | Fosmark et al. |
| 2013/0331985 A1 | 12/2013 | Felique |
| 2013/0332293 A1 | 12/2013 | Ran |
| 2013/0346305 A1 | 12/2013 | Mendes |
| 2014/0012414 A1* | 1/2014 | Perez ..................... G07F 9/001 700/241 |
| 2014/0019367 A1 | 1/2014 | Khan et al. |
| 2014/0025958 A1 | 1/2014 | Caiman |
| 2014/0032410 A1* | 1/2014 | Georgiev ............. G06Q 20/405 705/44 |
| 2014/0032413 A1 | 1/2014 | Low |
| 2014/0040028 A1 | 2/2014 | King et al. |
| 2014/0040117 A1 | 2/2014 | Jain |
| 2014/0052524 A1 | 2/2014 | Andersen |
| 2014/0052607 A1 | 2/2014 | Park |
| 2014/0064116 A1 | 3/2014 | Linde et al. |
| 2014/0067542 A1 | 3/2014 | Everingham |
| 2014/0074714 A1 | 3/2014 | Melone et al. |
| 2014/0074723 A1 | 3/2014 | Kamat |
| 2014/0085046 A1 | 3/2014 | Shin et al. |
| 2014/0085109 A1 | 3/2014 | Stefik |
| 2014/0089016 A1 | 3/2014 | Smullin |
| 2014/0100977 A1 | 4/2014 | Davis |
| 2014/0108108 A1 | 4/2014 | Artman |
| 2014/0122298 A1 | 5/2014 | Oyer |
| 2014/0136301 A1 | 5/2014 | Valdes |
| 2014/0136411 A1 | 5/2014 | Cho et al. |
| 2014/0143055 A1 | 5/2014 | Johnson |
| 2014/0143074 A1 | 5/2014 | Kolls |
| 2014/0143137 A1* | 5/2014 | Carlson ................ G06Q 20/18 705/39 |
| 2014/0172179 A1 | 6/2014 | Baudin |
| 2014/0180852 A1 | 6/2014 | Mat |
| 2014/0188708 A1 | 7/2014 | Govindarajan et al. |
| 2014/0201066 A1 | 7/2014 | Roux et al. |
| 2014/0249995 A1 | 9/2014 | Ogilvy |
| 2014/0278989 A1 | 9/2014 | Calman |
| 2014/0279008 A1 | 9/2014 | Calman |
| 2014/0279101 A1 | 9/2014 | Duplan et al. |
| 2014/0279426 A1* | 9/2014 | Holman ............. G06Q 30/0207 705/39 |
| 2014/0279537 A1 | 9/2014 | Cicoretti |
| 2014/0279556 A1 | 9/2014 | Priebatsch |
| 2014/0289047 A1 | 9/2014 | Yee |
| 2014/0317611 A1 | 10/2014 | Wojcik et al. |
| 2014/0324627 A1 | 10/2014 | Haver |
| 2014/0337235 A1 | 11/2014 | Van Heerden et al. |
| 2014/0351099 A1 | 11/2014 | Zhu |
| 2014/0361872 A1 | 12/2014 | Garcia et al. |
| 2014/0378057 A1 | 12/2014 | Ramon et al. |
| 2015/0006421 A1* | 1/2015 | Pearson ............. G06Q 10/1053 705/321 |
| 2015/0051977 A1 | 2/2015 | Lyman |
| 2015/0073980 A1 | 3/2015 | Griffin et al. |
| 2015/0081462 A1 | 3/2015 | Ozvat et al. |
| 2015/0088698 A1 | 3/2015 | Ackerman |
| 2015/0100152 A1 | 4/2015 | Trevino et al. |
| 2015/0105901 A1 | 4/2015 | Joshi et al. |
| 2015/0120546 A1 | 4/2015 | Fernandes |
| 2015/0120555 A1 | 4/2015 | Jung |
| 2015/0149992 A1 | 5/2015 | Wade et al. |
| 2015/0154579 A1* | 6/2015 | Teicher ............. G06Q 20/40145 705/21 |
| 2015/0169312 A1 | 6/2015 | Patel |
| 2015/0170131 A1 | 6/2015 | Patel |
| 2015/0170132 A1 | 6/2015 | Patel |
| 2015/0170136 A1 | 6/2015 | Patel |
| 2015/0178702 A1 | 6/2015 | Patel |
| 2015/0220381 A1 | 8/2015 | Horagan et al. |
| 2015/0235202 A1* | 8/2015 | Zabala ................ G06Q 20/326 700/232 |
| 2015/0278811 A1 | 10/2015 | Lalchandani |
| 2015/0287085 A1 | 10/2015 | Windmueller |
| 2015/0302377 A1 | 10/2015 | Sweitzer |
| 2015/0302411 A1 | 10/2015 | Bondesen et al. |
| 2015/0317720 A1* | 11/2015 | Ramaratnam ........ G06Q 20/202 705/21 |
| 2015/0332029 A1 | 11/2015 | Coxe |
| 2015/0346994 A1 | 12/2015 | Chanyontpatanakul |
| 2015/0373537 A1 | 12/2015 | Toksvig |
| 2015/0379491 A1* | 12/2015 | Ma ..................... G07F 19/209 235/379 |
| 2016/0012465 A1* | 1/2016 | Sharp .................. G06Q 20/321 705/14.17 |
| 2016/0019604 A1 | 1/2016 | Kobayashi |
| 2016/0063476 A1 | 3/2016 | Baldie |
| 2016/0086145 A1* | 3/2016 | Tsutsui .............. G06Q 30/0275 463/25 |
| 2016/0092859 A1 | 3/2016 | Klingen |
| 2016/0098690 A1 | 4/2016 | Silvia et al. |
| 2016/0132870 A1 | 5/2016 | Xu et al. |
| 2016/0196220 A1 | 7/2016 | Perez et al. |

(56) References Cited

U.S. PATENT DOCUMENTS

| | | | |
|---|---|---|---|
| 2016/0232515 A1 | 8/2016 | Jhas | |
| 2016/0292469 A1 | 10/2016 | Ianni | |
| 2016/0335620 A1 | 11/2016 | Lyons et al. | |
| 2016/0350744 A1* | 12/2016 | Tang | G06Q 20/326 |
| 2017/0006656 A1 | 1/2017 | Nacer et al. | |
| 2017/0193478 A1 | 7/2017 | Dhurka | |
| 2017/0193479 A1* | 7/2017 | Kamat | G06Q 20/3276 |
| 2017/0193508 A1 | 7/2017 | Patel et al. | |
| 2017/0330164 A1 | 11/2017 | Suelberg et al. | |
| 2018/0005220 A1 | 1/2018 | Laracey | |
| 2018/0197167 A1 | 7/2018 | Ganesan et al. | |
| 2018/0240096 A1 | 8/2018 | Patel | |
| 2018/0276674 A1 | 9/2018 | Ramatchandirane et al. | |
| 2018/0315271 A1 | 11/2018 | Gharabegian et al. | |
| 2018/0374076 A1 | 12/2018 | Wheeler et al. | |
| 2019/0236586 A1 | 8/2019 | Mei et al. | |
| 2019/0244205 A1 | 8/2019 | Fieglein | |
| 2020/0387881 A1 | 12/2020 | Smith et al. | |
| 2021/0012318 A1 | 1/2021 | Ducoulombier | |
| 2021/0056552 A1 | 2/2021 | Murray | |
| 2021/0158309 A1 | 5/2021 | Mcginlay et al. | |
| 2021/0357932 A1 | 11/2021 | Patel | |
| 2021/0375094 A1* | 12/2021 | Thomas | G07F 17/3209 |
| 2022/0405733 A1 | 12/2022 | Yao et al. | |
| 2023/0222506 A1 | 7/2023 | Patel et al. | |
| 2023/0274274 A1 | 8/2023 | Patel | |
| 2023/0289811 A1 | 9/2023 | Patel et al. | |
| 2023/0297987 A1 | 9/2023 | Patel | |

FOREIGN PATENT DOCUMENTS

| | | | | |
|---|---|---|---|---|
| CN | 105139196 A | | 12/2015 | |
| CN | 106803175 A | * | 6/2017 | G06F 8/65 |
| CN | 107480975 A | * | 12/2017 | |
| CN | 108352094 A | * | 7/2018 | G06Q 10/0836 |
| CN | 207663510 U | * | 7/2018 | |
| CN | 109389755 A | * | 2/2019 | |
| CN | 108367497 B | * | 6/2021 | |
| EP | 1571607 A2 | | 9/2005 | |
| EP | 2061001 A1 | | 5/2009 | |
| EP | 3901880 A1 | * | 10/2021 | G06Q 20/18 |
| JP | H1125320 A | * | 7/1997 | |
| JP | 2002-183812 A | | 6/2002 | |
| JP | 2003-242401 A | | 8/2003 | |
| JP | 2003-323662 A | | 11/2003 | |
| JP | 2004-252640 A | | 9/2004 | |
| JP | 2004310740 A | * | 11/2004 | |
| JP | 2005-526325 T | | 9/2005 | |
| JP | 2010528716 A | * | 5/2008 | |
| JP | 2009-259226 A | | 11/2009 | |
| JP | 4586607 B2 | * | 11/2010 | |
| JP | 2012-504273 T | | 2/2012 | |
| KR | 20130138637 A | * | 9/2012 | |
| WO | WO 2003/098561 | | 11/2003 | |
| WO | WO-2006020692 A2 | * | 2/2006 | G06Q 30/06 |
| WO | WO2007/015610 A1 | | 2/2007 | |
| WO | WO2008/083022 A1 | | 7/2008 | |
| WO | WO2008/083025 A2 | | 7/2008 | |
| WO | WO2008/083078 A2 | | 7/2008 | |
| WO | WO2008/083089 A1 | | 7/2008 | |
| WO | WO2008/083105 A2 | | 7/2008 | |
| WO | WO2008/083115 A1 | | 7/2008 | |
| WO | WO2008/083119 A1 | | 7/2008 | |
| WO | WO 2009/070430 A2 | | 6/2009 | |
| WO | WO2013/132995 A1 | | 9/2013 | |
| WO | WO2013/177416 A2 | | 11/2013 | |
| WO | WO 2014/093857 A1 | | 6/2014 | |
| WO | WO 2016/123545 A1 | | 8/2016 | |
| WO | WO-2016158748 A1 | * | 10/2016 | G06K 9/00228 |
| WO | WO2017/010936 A1 | | 1/2017 | |
| WO | WO-2017010936 A1 | * | 1/2017 | G06Q 20/045 |
| WO | WO 2017/143079 A1 | | 8/2017 | |

OTHER PUBLICATIONS

When the Future Feels Worse Than the Past: A Temporal Inconsistency in Moral Judgment, https://citeseerx.ist.psu.edu/viewdoc/download?doi=10.1.1.675.3584&rep=rep1&type=pdf (Year: 2010).*

Heimerl et al. Communitysourcing: Engaging local crowds to perform expert work via physical kiosks, https://citeseerx.ist.psu.edu/document?repid=rep1&type=pdf&doi=253ca0e33ed5fbd6e77bbcd3a5ec430b2d67e0a4 (Year: 2012).*

Baier et al.; Principles of Model Checking. https://vowi.fsinf.at/images/4/4a/TU_Wien-Formale_Methoden_der_Informatik_VU_(Egly)_-_Principles_of_Model_Checking_-_Christel_Baier.pdf (Year: 2007).*

Kevin Werbach. Contracts Ex Machina. https://repository.law.umich.edu/cgi/viewcontent.cgi?article=2936&context=articles (Year: 2017).*

Adams, How can stationary kiosks thrive in a mobile world?, American Banker, 2012.

Frolick, Assessing M-Commerce Opportunities, Auerbach Publications Inc., Information Systems Management, Spring 2004.

How to Pay the New Way, youtube, Apr. 5, 2018, 4 pgs.

Novotny, Applying RFID technology in the retail industry-benefits and concerns from the consumer's perspective, Institute of Economic Science, Eszterhazy Karoly College, Eger, Hungary, Retail Technologies for the 21 Century, innovation and competitiveness in the retail industry, 2015.

Nurel, Recent Developments in Wireless Network Systems, Izmir Institute of Technology, Sep. 2001, 280 pgs.

Patel, Final Office Action, U.S. Appl. No. 14/968,703, dated Feb. 12, 2019, 22 pgs.

Patel, Final Office Action, U.S. Appl. No. 15/435,228, dated Oct. 2, 2020, 24 pgs.

Patel, Final Office Action, U.S. Appl. No. 15/956,741, dated Oct. 2, 2020, 12 pgs.

Patel, Notice of Allowance, U.S. Appl. No. 14/214,644, dated Jun. 10, 2014, 9 pgs.

Patel, Notice of Allowance, U.S. Appl. No. 14/321,733, dated Jun. 22, 2015, 8 pgs.

Patel, Notice of Allowance, U.S. Appl. No. 14/335,762, dated Mar. 30, 2015, 9 pgs.

Patel, Notice of Allowance, U.S. Appl. No. 14/614,336, dated Dec. 11, 2015, 8 pgs.

Patel, Notice of Allowance, U.S. Appl. No. 14/614,336, dated Nov. 25, 2019, 13 pgs.

Patel, Notice of Allowance, U.S. Appl. No. 14/968,703, dated Jun. 27, 2019, 10 pgs.

Patel, Notice of Allowance, U.S. Appl. No. 15/406,492, dated Mar. 11, 2020, 9 pgs.

Patel, Notice of Allowance, U.S. Appl. No. 15/435,228, dated Aug. 12, 2021 9 pgs.

Patel, Notice of Allowance, U.S. Appl. No. 15/603,400, dated Dec. 18, 2019, 8 pgs.

Patel, Notice of Allowance, U.S. Appl. No. 15/603,400, dated Jun. 18, 2020, 5 pgs.

Patel, Notice of Allowance, U.S. Appl. No. 15/878,352, dated Oct. 23, 2020, 8 pgs.

Patel, Notice of Allowance, U.S. Appl. No. 16/029,483, dated Dec. 23, 2020, 21 pgs.

Patel, Notice of Allowance, U.S. Appl. No. 16/748,727, dated May 9, 2022, 16 pgs.

Patel, Notice of Allowance, U.S. Appl. No. 16/748,727, dated Jan. 20, 2022, 15 pgs.

Patel, Notice of Allowance, U.S. Appl. No. 16/750,477, dated Jan. 26, 2022, 14 pgs.

Patel, Notice of Allowance, U.S. Appl. No. 16/934,933, dated Oct. 23, 2020, 8 pgs.

Patel, Office Action, U.S. Appl. No. 14/320,534, dated Apr. 8, 2016, 21 pgs.

Patel, Office Action, U.S. Appl. No. 15/406,492, dated Jul. 25, 2019, 16 pgs.

Patel, Office Action, U.S. Appl. No. 15/435,228, dated Mar. 26, 2020, 21 pgs.

(56) References Cited

OTHER PUBLICATIONS

Patel, Office Action, U.S. Appl. No. 15/603,400, dated Jun. 12, 2019, 10 pgs.
Patel, Office Action. U.S. Appl. No. 15/878,352, dated Jan. 24, 2020, 12 pgs.
Patel, Office Action, U.S. Appl. No. 15/956,741, dated Apr. 22, 2020, 10 pgs.
Patel, Office Action, U.S. Appl. No. 15/956,741, dated Dec. 27, 2021, 10 pgs
Patel, Office Action, U.S. Appl. No. 16/029,483, dated Apr. 27, 2020, 28 pgs.
Patel, Office Action, U.S. Appl. No. 16/681,673, dated Dec. 24, 2021, 20 pgs.
Patel, Office Action, U.S. Appl. No. 16/934,933, dated Oct. 28, 2020, 9 pgs.
Patel, Office Action, U.S. Appl. No. 17/216,399, dated Apr. 8, 2022, 14 pgs.
PayRange Inc., Communication under Rule 71(3) EPC EP 14828617.2, dated Nov. 19, 2020, 8 pgs.
PayRange Inc., Communication under Rule 71(3) EPC, EP 17708929.9, dated Jun. 12, 2020, 5 pgs.
PayRange Inc., European Search Report. EP26263134.1, dated Feb. 9, 2021, 2 pgs.
PayRange Inc., European Search Report, EP 21165692.1, dated Sep. 14, 2021, 9 pgs.
PayRange Inc., IPRP, PCT/US2017/015676, dated Jul. 31, 2018, 9 pgs.
PayRange Inc., IPRP, PCT/US2019/060777, dated May 11, 2021, 7 pgs.
PayRange Inc., ISR/WO, PCT/US2017/015676, dated Apr. 18, 2017, 11 pgs.
PayRange Inc., ISR/WO, PCT/US2017/018194, dated Apr. 12, 2017, 10 pgs.
PayRange Inc., ISR/WO, PCT/US2019/060777, dated Feb. 6, 2020, 11 pgs.
PayRange Inc., ISR/WO, PCT/US2021/042632, dated Nov. 17, 2021, 11 pgs.
PayRange Inc., Notice of Reasons for Rejection, JP 2017-527886, dated Aug. 29, 2019, 10 pgs.
PayRange Inc., Notice of Reasons for Rejection, JP 2018-543707, dated Sep. 4, 2020, 4 pgs.
PayRange Inc., Notice of Reasons for Rejection, JIP 2020-1015 58, dated Oct. 7, 2021, 2 pgs.
PayRange Inc., Summons to Attend Oral Proceedings, EP 14828617.2, Apr. 2, 2020, 12 pgs.
Apple Inc., TradeMark Details, TradeMark: 1437923, Jun. 14, 2011, downloaded on Sep. 27, 2016 from http://intranet.aipo.gov.au/atmoss/Falcon_Details.Print_TM_Details?p_tm_number=1, 2 pgs.
Australian Design No. 315641 which was published on the website http://pericles.ipaustralia.gov.au/adds2/adds.adds_details.paint_details?p_design_id=315641, with a priority date of Jan. 5, 2007.
Australian Design No. 316051 which was published on the website http://pericles.ipaustralia.gov.au/adds2/adds.adds_details.paint_details?p_design_id=3 16051, with a priority date of Jan. 5, 2007.
Australian Design No. 316052 which was published on the website http://pericles.ipaustralia.gov.au/adds2/adds.adds_details.paint_details?p_design_id=3 16052, with a priority date of Jan. 5, 2007.
Australian Design No. 322819 which was published on the website http://pericles.ipaustralia.gov.au/adds2/adds.adds_details.paint_details?p_design_id=3 22819, with a priority date of Apr. 7, 2008.
Australian Design No. 322820 which was published on the website http://pericles.ipaustralia.gov.au/adds2/adds.adds details.paint details?p design id=3 22820, with a priority date of Apr. 7, 2008. [C6].
Australian Design No. 322821 which was published on the website http://pericles.ipaustralia.gov.au/adds2/adds.adds_details.paint_details?p_design_id=322821, with a priority date of Apr. 7, 2008.
Australian Design No. 322818 which was published on the website http://pericles.ipaustralia.gov.au/adds2/adds.adds_details.paint_details?p_design_id=322818, with a priority date of Apr. 7, 2008.

Balan et al., mFerio: the design and evaluation of a peer-to-peer mobile payment system, Jun. 2009, 14 pgs.
Balfe et al., e-EMV: emulating EMV for internet payments with trusted computing Technologies, Oct. 2008, 12 pgs.
Bing, Bing Images Search: "dongle", http://www.bing.com/images/search?q=dongleFORM+HDRSC2, Dec. 12, 2013, 8 pgs.
Google, Chromecast, htttp://www.google.com/intl/devices/chromecast/, Dec. 12, 2013, 4 pgs.
How will Apple's new mobile wallet Passbook impact other mobile wallets?, posted Jun. 13, 2012, retrieved Feb. 13, 2018, retrieved from Internet, <URL:https://www.quora.com/How-will-Apples-new-mobile-wallet-Passbook-impact-other-mobile-wallets>, 5 pgs.
Kadambi et al., Near-Field Communication-based Secure Mobile Payment Service, Aug. 2009, 10 pgs.
Madlmayr et al., "Near Field Communication Based Mobile Payment System," Austrian Research Funding Agency, Project 811408, Mar. 6, 2008, 13 pgs.
Patel, Final Office Action U.S. Appl. No. 14/321,733, dated Nov. 14, 2014, 11 pgs.
Patel, Office Action U.S. Appl. No. 14/321,733, dated Aug. 21, 2014, 9 pgs.
Patel, Notice of Allowance, U.S. Appl. No. 14/321,733, dated Feb. 27, 2015, 9 pgs.
Patel, Office Action U.S. Appl. No. 14/320,534, dated Oct. 29, 2014, 18 pgs.
Patel, Final Office Action U.S. Appl. No. 14/320,534, dated Apr. 16, 2015, 21 pgs.
Patel, Final Office Action U.S. Appl. No. 14/320,534, dated Nov. 30, 2016, 24 pgs.
Patel, Final Office Action U.S. Appl. No. 14/320,534, dated Mar. 2, 2018, 26 pgs.
Patel, Office Action U.S. Appl. No. 14/335,762, dated Dec. 10, 2014, 7 pgs.
Patel, Office Action U.S. Appl. No. 14/335,762, dated Sep. 18, 2015, 23 pgs.
Patel, Final Office Action U.S. Appl. No. 14/335,762, dated Jun. 9, 2016, 15 pgs.
Patel, Notice of Allowance U.S. Appl. No. 14/335,762, dated Oct. 3, 2016, 7 pgs.
Patel, Office Action U.S. Appl. No. 14/321,717, dated Dec. 19, 2014, 16 pgs.
Patel, Final Office Action U.S. Appl. No. 14/321,717, dated Jun. 18, 2015, 22 pgs.
Patel, Office Action U.S. Appl. No. 14/456,683, dated Jan. 2, 2015, 10 pgs.
Patel, Final Office Action U.S. Appl. No. 14/456,683, dated Jun. 8, 2015, 14 pgs.
Patel, Notice of Allowance, U.S. Appl. No. 14/456,683, dated Oct. 8, 2015, 15 pgs.
Patel, Office Action U.S. Appl. No. 14/458,199, dated Jan. 5, 2015, 7 pgs.
Patel, Final Office Action U.S. Appl. No. 14/458,199, dated Jun. 24, 2015, 8 pgs.
Patel, Office Action U.S. Appl. No. 14/458,199, dated Mar. 28, 2016, 8 pgs.
Patel, Notice of Allowance, U.S. Appl. No. 14/458,199, dated Jan. 20, 2017, 9 pgs.
Patel, Office Action U.S. Appl. No. 14/458,192, dated Jan. 30, 2015, 24 pgs.
Patel, Final Office Action U.S. Appl. No. 14/458,192, dated Sep. 16, 2015, 26 pgs.
Patel, Office Action U.S. Appl. No. 14/458,192, dated Mar. 23, 2017, 26 pgs.
Patel, Notice of Allowance, U.S. Appl. No. 14/458,192, dated Oct. 12, 2017, 8 pgs.
Patel, Office Action U.S. Appl. No. 14/321,724, dated Mau 15, 2015, 19 pgs.
Patel, Final Office Action U.S. Appl. No. 14/321,724, dated Oct. 8, 2015, 19 pgs.
Patel, Office Action U.S. Appl. No. 14/321,724, dated Mar. 13, 2017, 21 pgs.
Patel, Final Office Action U.S. Appl. No. 14/321,724, dated Dec. 13, 2017, 22 pgs.

(56) References Cited

OTHER PUBLICATIONS

Patel, Quayle Office Action U.S. Appl. No. 29/524,725, dated Mar. 30, 2016, 7 pgs.
Patel, Notice of Allowance, U.S. Appl. No. 29/524,726, Mar. 29, 2016, 9 pgs.
Patel, Office Action U.S. Appl. No. 14/641,236, dated May 29, 2015, 10 pgs.
Patel, Final Office Action U.S. Appl. No. 14/641,236, dated Mar. 11, 2016, 16 pgs.
Patel, Office Action U.S. Appl. No. 14/641,236, dated Feb. 7, 2018, 19 pgs.
Patel, Office Action U.S. Appl. No. 14/614,336, dated May 27, 2015, 17 pgs.
Patel, Office Action U.S. Appl. No. 29/477,025, dated Aug. 14, 2015, 5 pgs.
Patel, Notice of Allowance, U.S. Appl. No. 29/477,025, dated Dec. 16, 2015, 7 pgs.
Patel, Notice of Allowance, U.S. Appl. No. 29/524,728, dated Mar. 23, 2016, 8 pgs.
Patel, Office Action, U.S. Appl. No. 29/524,727, dated Apr. 1, 2016, 5 pgs.
Patel, Notice of Allowance, U.S. Appl. No. 29/524,727, dated Apr. 7, 2017, 5 pgs.
Patel, Notice of Allowance, U.S. Appl. No. 29/557,541, dated Jul. 27, 2016, 6 pgs.
Patel, Notice of Allowance, U.S. Appl. No. 29/557,541, dated Nov. 30, 2016, 5 pgs.
Patel, Notice of Allowance, U.S. Appl. No. 29/557,542, dated Nov. 10, 2016, 5 pgs.
PayRange, Examination Report No. 1, AU201515565, dated Sep. 28, 2016, 15 pgs. (Received Oct. 12, 2016).
PayRange, Examination Report No. 1, AU201515576, dated Jun. 28, 2016, 8 pgs. (Received Aug. 3, 2016).
PayRange, Examination Report No. 1, AU201515578, dated May 6, 2016, 3 pgs. (Received Aug. 9, 2016).
PayRange, Examination Report No. 1, AU201515579, dated May 6, 2016, 3 pgs. (Received Aug. 3, 2016).
Patel, Notice of Allowance, U.S. Appl. No. 29/524,730, dated Apr. 6, 2016, 8 pgs.
Patel, Office Action, U.S. Appl. No. 14/611,065, dated Oct. 3, 2016, 19 pgs.
Patel, Office Action, U.S. Appl. No. 14/611,065, dated Jun. 13, 2017, 17 pgs.
Patel, Notice of Allowance, U.S. Appl. No. 14/611,065, dated Mar. 26, 2018, 18 pgs.
Patel, Office Action, U.S. Appl. No. 14/968,703, dated Aug. 7, 2018, 31 pgs.
Patel, Ex Parte Quayle, U.S. Appl. No. 29/586,758, dated Aug. 28, 2018, 10 pgs.
PayRange, Office Action, CA164958, dated Feb. 5, 2016, 4 pgs.
PayRange, Office Action, CA164959, dated Feb. 5, 2016, 1 pg.
PayRange, Office Action, CA164960, dated Feb. 5, 2016, 6 pgs.
PayRange, Office Action, CA164961, dated Feb. 5, 2016, 4 pgs.
PayRange, Office Action, CA164962, dated Feb. 5, 2016, 3 pgs.
PayRange, Certificate of Registration, CA164958, Aug. 26, 2016, 1 pg.
PayRange, Certificate of Registration, CA164959, Aug. 26, 2016, 1 pg.
PayRange, Certificate of Registration, CA164960, Aug. 26, 2016, 1 pg.
PayRange, Certificate of Registration, CA164961, Aug. 26, 2016, 1 pg.
PayRange, Certificate of Registration, CA164962, Aug. 26, 2016, 1 pg.
PayRange, Communication Pursuant to Rules 161(1) and 162, EP14828617.2, dated Sep. 21, 2016, 2 pgs.
PayRange, Communication Pursuant to Article 94(3), EP14828617.2, dated Dec. 19, 2017, 6 pgs.
PayRange, Communication Pursuant to Rules 161(1) and 162, EP16706931.9, dated Sep. 21, 2017, 2 pgs.
PayRange, Communication Pursuant to Article 94(3), EP16706931.9, dated Jun. 29, 2018, 8 pgs.
PayRange Office Action, JP2015-023452, dated Jul. 8, 2016, 5 pgs.
PayRange Office Action, JP2015-023452, dated Mar. 17, 2017, 4 pgs.
PayRange Office Action, JP2015-023452, dated Jul. 7, 2017, 4 pgs.
PayRange, Certificate of Registration, JP2015-023452, Dec. 8, 2017, 1 pg.
PayRange Office Action, JP2015-023453, dated Jul. 8, 2016, 5 pgs.
PayRange Office Action, JP2015-023453, dated Mar. 17, 2017, 4 pgs.
PayRange Office Action, JP2015-023453, dated Jul. 7, 2017, 4 pgs.
PayRange, Certificate of Registration, JP2015-023453, Dec. 8, 2017, 1 pg.
PayRange Office Action, JP2015-023454, dated Jul. 8, 2016, 5 pgs.
PayRange Office Action, JP2015-023454, dated Mar. 17, 2017, 4 pgs.
PayRange Office Action, JP2015-023454, dated Jul. 7, 2017, 4 pgs.
PayRange, Certificate of Registraiton, JP2015-023454, Dec. 8, 2017, 1 pg.
PayRange Office Action, JP2015-023455, dated Jul. 8, 2016, 5 pgs.
PayRange Office Action, JP2015-023455, dated Mar. 17, 2017, 4 pgs.
PayRange Office Action, JP2015-023455, dated Jul. 7, 2017, 4 pgs.
PayRange, Certificate of Registration, JP2015-023455, Dec. 8, 2017, 1 pg.
PayRange Office Action, JP2015-023456, dated Jul. 8, 2016, 5 pgs.
PayRange Office Action, JP2015-023456, dated Mar. 17, 2017, 4 pgs.
PayRange Office Action, JP2015-023456, dated Jul. 7, 2017, 4 pgs.
PayRange Decision to Grant, JP2015-023452, dated Oct. 5, 2017, 3 pgs.
PayRange Decision to Grant, JP2015-023453, dated Oct. 5, 2017, 3 pgs.
PayRange Decision to Grant, JP2015-023454, dated Oct. 5, 2017, 3 pgs.
PayRange Decision to Grant, JP2015-023455, dated Oct. 5, 2017, 3 pgs.
PayRange Decision to Grant, JP2015-023456, dated Oct. 5, 2017, 3 pgs.
PayRange, Certificate of Registration, JP2015-023456, Dec. 8, 2017, 1 pg.
PayRange Office Action, MX/f/2015/003172, dated Nov. 29, 2016, 10 pgs.
PayRange, Notice of Allowance, MX/f/2015/003172, dated May 16, 2017, 3 pgs.
PayRange, International Preliminary Report on Patentability, dated Aug. 21, 2018, PCT/US2017/018194, 17 pgs. (Patel).
PayRange, Letters Patent, MX/f/2015/003172, Sep. 14, 2017, 1 pg.
Provisional U.S. Appl. No. 60/871,898, Value Based Offers, inventor Mark Carlson, filed Dec. 26, 2006. US Patent and Trademark Office, 169 pgs.
PayRange, Inc., International Search Report and Written Opinion, PCT/US2014/071284, dated Mar. 25, 2015, 9 pgs.
PayRange, Inc., International Preliminary Report on Patentability, PCT/US2014/071284, dated Jun. 21, 2016, 6 pgs.
PayRange, Inc., International Search Report and Written Opinion, PCT/US2016/015763, dated Aug. 4, 2016, 9 pgs.
PayRange, Inc., International Preliminary Report on Patentability, PCT/US2016/015763, dated Aug. 1, 2017, 7 pgs.
PayRange, EUIPO, RCD file information, Design No. 002833087-0005, Oct. 22, 2015, downloaded on Sep. 27, 2016 from https://euipo.europa.eu/eSearch/, 3 pgs.
PayRange New Product Launch, posted at youtube.com, posting date Jun. 27, 2015, © 2016 YouTube, LLC, [online], [site visited Mar. 2, 2016], Available from Internet, <URL: https://www.youtube.com/watch?v=NTvvV03XFeg., 1 pg.
@RobocopyEs, posted Oct. 11, 2014, retrieved on Feb. 13, 2018 from Internet, <URL:https://twitter.com/robocopyes> 2 pgs.
Smart Vending Machine Demo at TechCrunch Disrupt 2013, posted at youtube.com, posting date Dec. 3, 2013, ©2016 YouTube, LLC, [online], [site visited Mar. 2, 2016], Available from internet, URL: https://www.youtube.com/watch?v=XEz1H-gxLj8>.

(56) References Cited

OTHER PUBLICATIONS

Square Mobile Credit Card Processing for iPhone, iPod, iPad, posted at youtube.com, posting date Apr. 30, 2011, © 2016 YouTube, LLC, [online], [site visited Mar. 2, 2016], Available from internet, <URL: https://www.youtube.com/watch?v=v6sKb3CFSKw>.
Patel, Non-Final Office Action, U.S. Appl. No. 29/670,599, dated Oct. 6, 2020, 6 pgs.
Patel, Notice of Allowance, U.S. Appl. No. 29/670,599, dated May 11, 2021, 8 pgs.
Patel, Notice of Allowance, U.S. Appl. No. 16/392,392, dated Sep. 28, 2022, 2 pgs.
Patel, Notice of Allowance, U.S. Appl. No. 17/529,111, dated Sep. 22, 2022, 9 pgs.
Patel, Notice of Allowance, U.S. Appl. No. 17/654,732, dated Sep. 16, 2022, 8pgs.
Hoffman et al., "New options in Wireless payments", Internet World 7.7:37 Penton Media Inc., Penton Business Media, Inc. and their subsidiaries . (Year: 2001 ).
Carton et al., Framework for Mobile Payments Integration, Electronic Journal of Information Systems Evaluation, 15.1: 14-24, Academic Conferences International Limited, January, (Year: 2012).
Apriva LLC Awarded Patent for System and Method for Facilitating a Purchase Transaction using a Customer Device Beacon, Jun. 7, 2017, Global IP News (Year: 2017).
Nurel "Recent Developments in Wireless Network Systems", Izmir Institute of Technology, Sep. 2001, 280 pages (Year: 2001).
Kumar, Amazon gets Indian patent for auto authentification of mobile transactions, ProQuest document Id:2433007646, Financial Express, 13 August (Year:2020), 2 pgs.
Patel, Office Action, U.S. Appl. No. 17/147,305, dated Aug. 31, 2022, 5 pgs.
Patel, Non-Final Office Action, U.S. Appl. No. 17/443,802, Dec. 23, 2022, 14 pgs.
Patel, Non-Final Office Action, U.S. Appl. No. 15/956,741, Feb. 27, 2023, 11 pgs.
Patel, Notice of Allowance, U.S. Appl. No. 17/443,802, Jun. 28, 2023, 10 pgs.
Patel, Notice of Allowance, U.S. Appl. No. 17/983,311, Jun. 28, 2023,10 pgs.
EIC 3600 Search Report, STIC, Scientific & Technical Information Center, Date Completed Jun. 12, 2023, 5 pgs.
Patel et al., Notice of Allowance, U.S. Appl. No. 17/973,506, Jul. 26, 2023, 13 pgs.
Katy Jacob, "Are mobile payments the smart cards of the aughts?", Scientific and Technical Information Center, Report Information from Dialog, Jul. 14, 2023—11:33, ProQuest, Publication Info: Chicago Fed Letter 240: 1-4. Federal Reserve Bank of Chicago. (Jul. 2007), 9 pgs.
Patel et al., Notice of Allowance, U.S. Appl. No. 17/963,170, Aug. 4, 2023, 16 pgs.
USA Technologies Announces Cashless Solution to Be Offered by Blackboard Inc., Scientific and Technical Information Center, Report Information from Dialog, Jul. 25, 2023, ProQuest, Publication Info: Business Wire Jul. 18, 2007: NA, 6 pgs.
Patel, Non-Final Office Action, U.S. Appl. No. 18/197,071, Aug. 16, 2023, 9 pgs.
Hossain et al., "Comprehensive Study of Bluetooth Signal Parameters for Localization", Department of Electrical & Computer EngineeringNational University of Singapore, 5 pgs. Email: {g0500774, weeseng}@nus.edu.sg.
Hands-Free Profile 1.5, Doc. No. HFP1.5_SPEC, Nov. 25, 2005, 93 pgs.
DEX and MDB: A Primer For Vendors | Vending Market Watch, Feb. 7, 2008, 5 pgs. https://www.vendingmarketwatch.com/print/content/10272928.
MDB Protocol V4.2—Multi-Drop Bus—Internal Communication Protocol, MDB / ICP, Version 4.2, Feb. 2011, 313 pgs.
Gruber et al., "The Commodity Vending Machine", Forum Ware International Feb. 2005, 11 pgs.
Michael L. Kasavana, Innovative VDI Standards: Moving an Industry Forward, The Journal of International Management, vol. 4, No. 3, Dec. 2009, 10 pgs.
SDFL Administrative Order 2021-33, Apr. 6, 2021, 5 pgs.
The New York Times by David Poque, In Arrived of 2 iPhones, 3 Lessons, Sep. 17, 2013, 4 pgs. https://www./nytime.com/2013/09/18/technology/personaltech/In-Arrived-of-2-iPhones-3-Lessons.html.
Cnet, John Thompson, How to use S Beam on your Samsung Galaxy S3, Jun. 21, 2012, 5 pgs. https://www.cnet.com/how-to/how-to-use-s-beam-on-your-samsung-galaxy-s3/.
Iphone, User Guide For iOS 6.1 Software, 156 pgs.
Apple Reports Fourth Quarter Results, Oct. 28, 2013, 4 pgs.
Apple Announces iPhone 5s—The Most Forward—Thinking Smartphone in the World, Sep. 10, 2013, 5 pgs.
CNet, by Marguerite Reardon, Motion sensing comes to mobile phones, Jun. 11, 2007, 4 pgs.
Multi-Drop Bus—Internal Communication Protocol, MDB / ICP, Version 3, Mar. 26, 2003, 270 pgs.
Weidong Kou, Payment Technologies for E-Commerce, University of Hong Kong Pokfulam Road, Hong Kong, ACM Subject Classification (1998): H.4, K.4.4, J.1, 339 pgs.
Specification for RFID Air Interface, EPCTM Radio-Frequency Identity Protocols, Class-1 Generation-2 UHF RFID, Protocol for Communications at 860 MHz—960 MHz, Version 1.2.0, EPCglobal Inc., Oct. 23, 2008, 108 pgs.
Patel et al., Notice of Allowance, U.S. Appl. No. 17/973,506, Dec. 7, 2023, 11 pgs.
Bailey, Mobile-phone payment option gains ground, Dialog, STIC, Report Information from Dialog, Nov. 29, 2023, 6 pgs.
Patel, Non-Final Office Action, U.S. Appl. No. 17/968,672, Dec. 15, 2023, 14 pgs.
Patel, Non-Final Office Action, U.S. Appl. No. 17/973,505, Dec. 15, 2023, 14 pgs.
Patel, Notice of Allowance, U.S. Appl. No. 18/197,070, Dec. 20, 2023, 10 pgs.
"Mobile payment heads to the U.S.", Mobile Internet 6.10:1. Information Gatekeepers, Inc. (Oct. 2004), 2 pgs.
"During the period 2005 to 2009, the total No. of wireless data connections used for retail applications in Europe can be expected to rise from less than 1 million to around 3 million", M2 Press Wire, Feb. 28 (Year: 2006), 3 pgs.
Patel, Non-Final Office Action, U.S. Appl. No. 17/973,507, Jan. 26, 2024, 9 pgs.
Patel, Notice of Allowance, U.S. Appl. No. 15/956,741, Jan. 18, 2024, 18 pgs.
IEEE Standard for Information technology—Telecommunication and information exchange between systems—Local and metropolitan area networks—Specific requirements, Part 15.4: Wireless Medium Access Control (MAC) and Physical Layer (PHY) Specifications for Low-Rate Wireless Personal Area Networks (LR-WPANs), IEEE, The Institute of Electrical and Electronics Engineers, Inc., 3 Park Avenue, New York, NY 10016-5997, USA, Oct. 1, 2003, 679 pgs.
Patel et al., Notice of Allowance, U.S. Appl. No. 17/963,170, Dec. 12, 2023, 11 pgs.
Slick self-service options: as staffing remains lean grocers are using advanced self-service checkouts and kiosks to augment customer service, Dialog, STIC, Report Information from Dialog, Nov. 30, 2023, 8 pgs.
Patel, Notice of Allowance, U.S. Appl. No. 18/197,071, Jan. 26, 2024, 10 pgs.
Patel, Notice of Allowance, U.S. Appl. No. 17/983,311, Oct. 4, 2023, 11 pgs.
Patel, Non-Final Office Action, U.S. Appl. No. 18/197,070, Sep. 27, 2023, 8 pgs.

* cited by examiner

| Tab | Favorite? | Alert | View to User |
|---|---|---|---|
| All | Yes | No | User can make Hands-free Credit with the connected vending machine |
| All | No | Yes | User needs to launch Mobile Device and then swipe to make transaction manually |
| Favorite | Yes | No | Hands-free transaction will be available to the user via vending machine |
| Favorite | No | No | User is not alerted for the vending machine which is not a favorite machine. Hands-free mode will not work, manual swipe for transaction required by user. |
| Either All or Favorite | Yes | Yes | BUT Hands-free Credit is not available (disabled by module, expired AuthGrant, insufficient balance, or other issue), then user will get an alert so that user can swipe credit manually. |

Figure 3

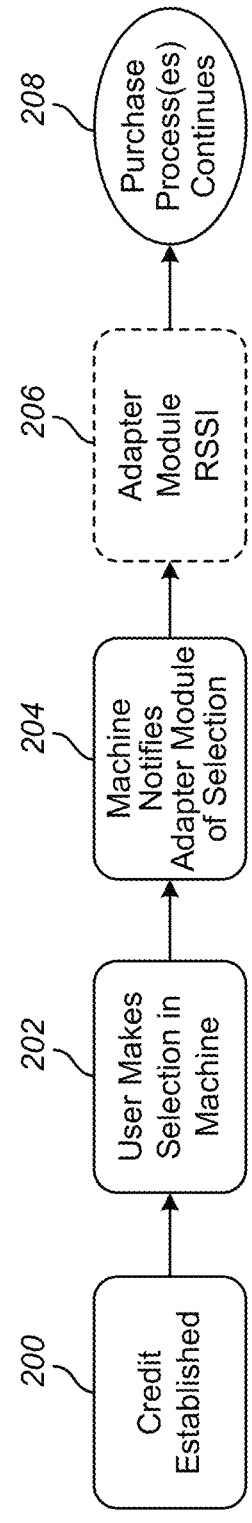

Figure 4

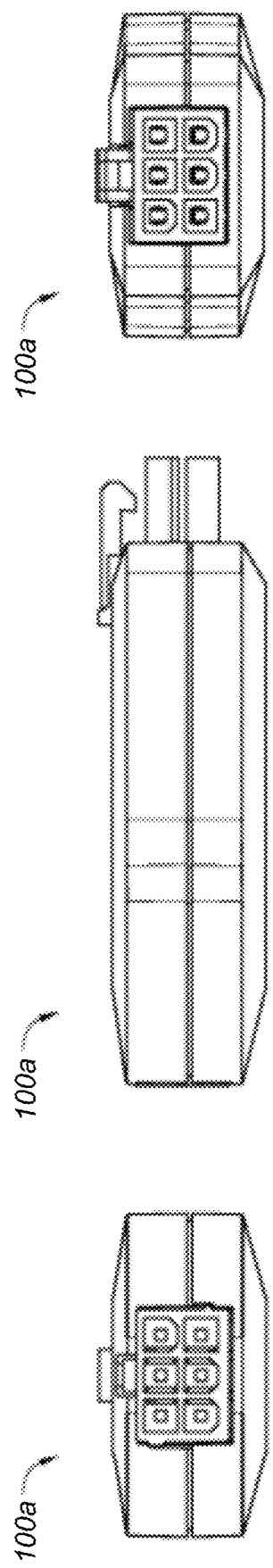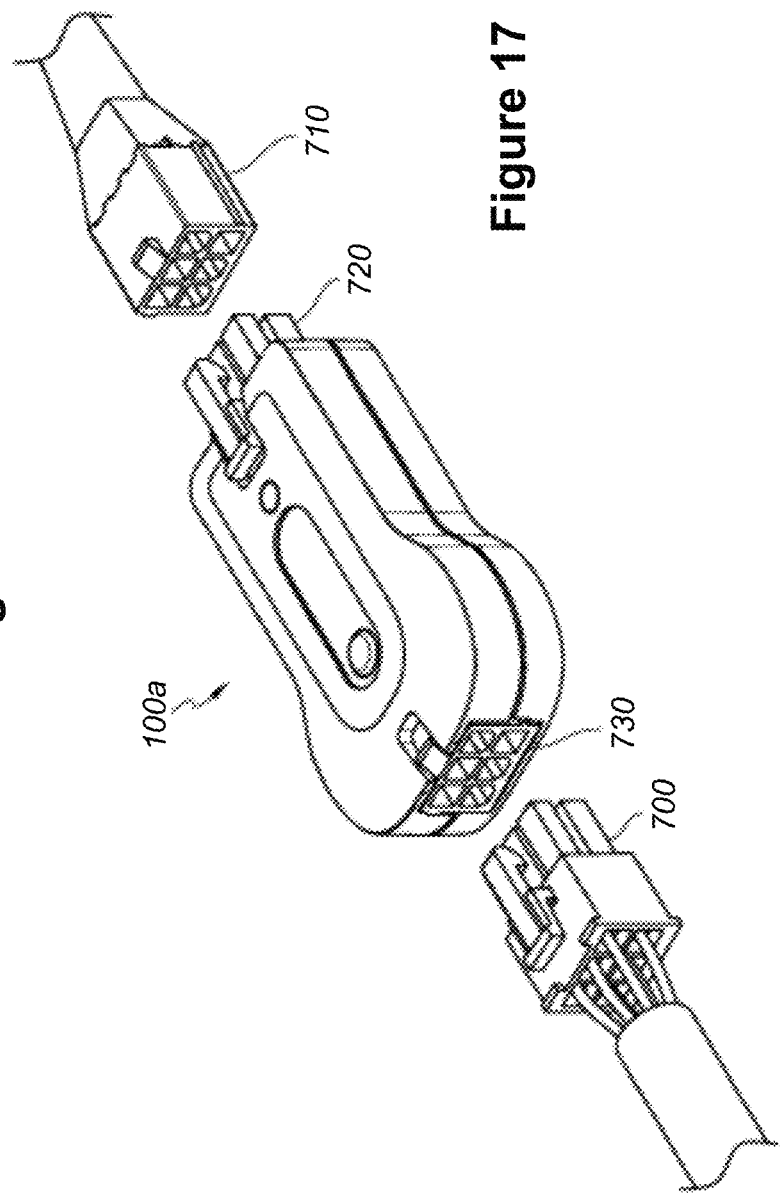

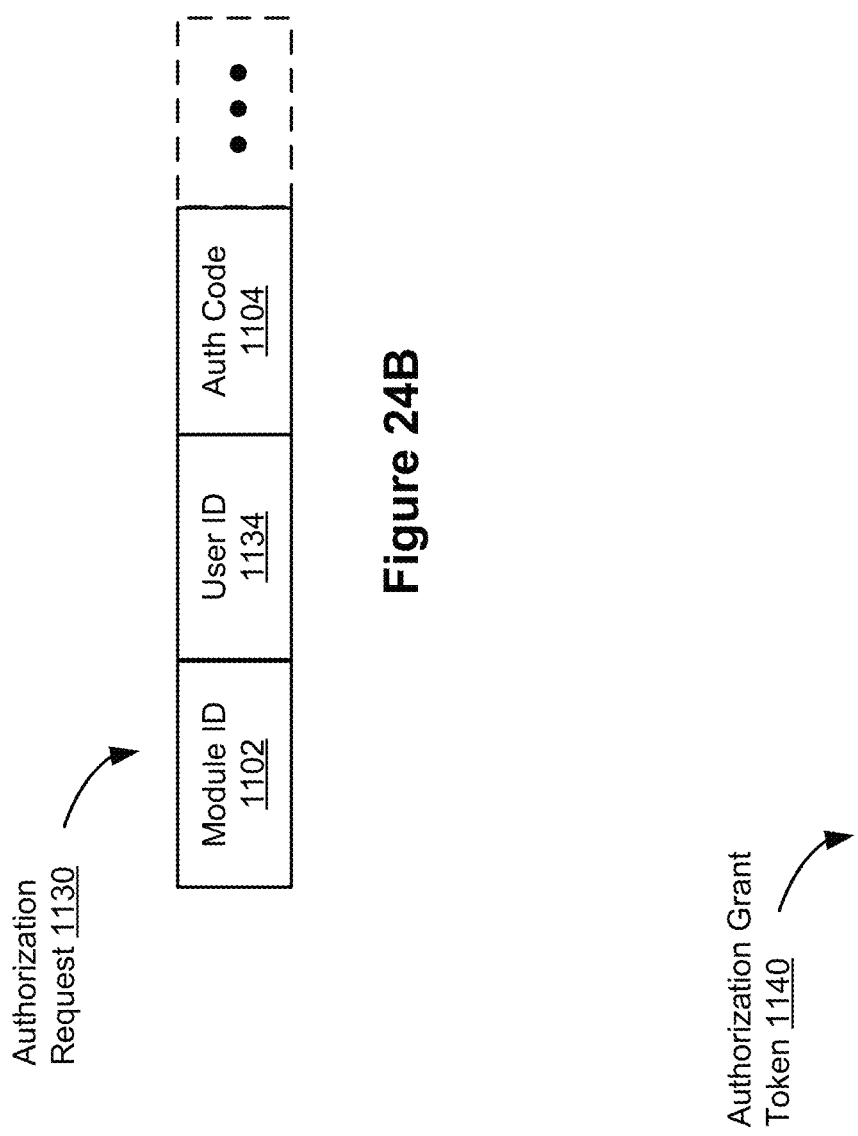

Perform as a virtual payment peripheral for the payment accepting unit by registering the device as a slave to a payment accepting unit; and ~1602

Perform as a virtual payment accepting unit for one or more payment peripherals by registering the one or more payment peripherals as a slaves to the device using the MDB protocol (A)

Registering the device as a slave to the payment accepting unit further comprises: ~1616

Identifying the device to the payment accepting unit as a cashless payment peripheral; and Accepting registration of the device with the payment accepting unit as a cashless payment peripheral Registering the device as a slave to the payment accepting unit further comprises: ~1618

Identifying the device to the payment accepting unit as a coin acceptor peripheral; and Accepting registration of the device with the payment accepting unit as a coin acceptor peripheral Registering the device as a slave to the payment accepting unit further comprises: ~1620

Identifying the device to the payment accepting unit as a bill acceptor peripheral; and Accepting registration of the device with the payment accepting unit as a bill acceptor peripheral

Figure 29D

REFUND CENTERS FOR PROCESSING AND DISPENSING VENDING MACHINE REFUNDS VIA AN MDB ROUTER

PRIORITY CLAIM AND RELATED APPLICATIONS

This application is a continuation of PCT Patent Application No PCT/US2017/015676, filed Jan. 30, 2017, which claims priority to U.S. Provisional Application No. 62/289,158, filed Jan. 29, 2016, which is incorporated herein by reference in its entirety. This application is also a continuation-in-part of U.S. patent application Ser. No. 14/641,236, filed Mar. 6, 2015, which claims priority to U.S. Provisional Application No. 62/081,492, filed Nov. 18, 2014 and is a continuation-in-part of U.S. patent application Ser. No. 14/320,534, filed Jun. 30, 2014, which is continuation-in-part of U.S. patent application Ser. No. 14/214,644, filed Mar. 14, 2014 and issued on Oct. 7, 2014 as U.S. Pat. No. 8,856,045, which claims priority to U.S. Provisional Patent Application No. 61/917,936, filed Dec. 18, 2013 and is a continuation-in-part of U.S. Design patent application Ser. No. 29/477,025, filed Dec. 18, 2013 and issued on May 3, 2016 as U.S. Pat. No. D755,183, each of which is incorporated by reference in its entirety.

FIELD OF THE INVENTION

The present application relates to processing refunds at unattended retail machines and, in particular, to refund centers for processing and dispensing vending machine refunds via a MDB router.

BACKGROUND OF THE INVENTION

Vending machines (or "automatic retailing" machines), in the broadest sense, have been around for thousands of years. The first simple mechanical coin operated vending machines were introduced in the 1880s. Modern vending machines stock many different types of products including, but not limited to drinks (e.g., water, juice, coffee, and soda) and edible food products/items (e.g., snacks, candy, fruit, and frozen meals), as well as a wide variety of non-food items. In this fast paced world, vending machines are ubiquitous.

Vending machines are one type of "payment accepting unit" (payment accepting units are also referred to herein generically as "machines"). A payment accepting unit (or machine) is equipment that requires payment for the dispensing of products and/or services. In addition to vending machines, payment accepting units can also be other machines that require payment for the dispensing of a product and/or services including, but not limited to parking meters, toll booths, laundromat washers and dryers, arcade games, kiosks, photo booths, toll booths, transit ticket dispensing machines, and other known or yet to be discovered payment accepting units.

In using a payment accepting unit, a user will (1) approach the payment accepting unit, (2) determine from the face of the payment accepting unit the product (or service) he/she desires, (3) insert payment (e.g., coins, bills, or payment cards), and (4) input his/her selection into the payment accepting unit using a user interface (e.g., a series of buttons, a key pad, touch screen, or other input mechanism using, for example, the column and row at which a product is located). Based on the user's inputted selection, technology within the payment accepting unit provides the desired product (or service) to the user.

As the number of people with Internet-connected mobile devices proliferates, so does the variety of uses for such devices. Mobile payment is a logical extension. There is a large development effort around bringing mobile payment to the retail sector in an effort to not only provide options to the user, but also increased convenience.

Additionally, processing refunds at vending machines is a very difficult problem to solve. As such, there is a pressing need for methods, systems, and devices that allow for securely and easily processing vending machine refunds.

SUMMARY

Disclosed herein is a payment processing system or, more specifically, a mobile-device-to-machine payment processing system over a non-persistent network connection with hands-free and manual (sometimes also herein called "swipe" or "swipe-to-pay" mode) modes. Also disclosed is such a payment processing system that can securely and easily provide vending machine refunds.

In some implementations, a method of retrofitting a payment accepting unit to accommodate a plurality of payment peripherals is performed at a device (e.g., the device 1300, FIG. 26A) with one or more processors, memory, a slave interface configured to couple the device with the payment accepting unit via a multi-drop bus (MDB), and one or more host interfaces configured to couple the device with one or more payment peripherals, (e.g., a coin acceptor, a bill acceptor, a cashless payment device such as a payment card reader, and the like) where a respective payment peripheral is decoupled from an MDB interface of the payment accepting unit and coupled with a respective one of the one or more host interfaces, and where the one or more payment peripherals are configured to communicate via MDB protocol. The method includes performing as a virtual payment peripheral for the payment accepting unit by registering the device as a slave to the payment accepting unit and performing as a virtual payment accepting unit for the one or more payment peripherals by registering the one or more payment peripherals as a slaves to the device using the MDB protocol. The method includes receiving a command from the payment accepting unit via the slave interface, where signals from the payment accepting unit are sent in a manner as if sent to a singular payment peripheral. In response to receiving the command from the payment accepting unit, the method includes: sending an acknowledgement to the command from the payment accepting unit via the slave interface, where signals are sent to the payment accepting unit in a manner as if originated by the device that is functioning as a singular virtual payment peripheral; and relaying the command to the respective payment peripheral via the respective one of the one or more host interfaces corresponding to the respective payment peripheral, where the device sends signals to and receives signals from the payment accepting unit asynchronous of the device sending signals to and receiving signals from the one or more payment peripherals.

In some implementations, a device (e.g., the adapter module 100 (FIGS. 5 and 20), the device 1300 (FIG. 26A), or a combination thereof) includes a slave interface, one or more host interfaces, one or more processors and memory storing one or more programs for execution by the one or more processors, the one or more programs include instructions for performing, or controlling performance of, the operations of any of the methods described herein. In some implementations, a non-transitory computer readable storage medium storing one or more programs, the one or more programs comprising instructions, which, when executed by a device (e.g., the adapter module 100 (FIGS. 5 and 20), the device 1300 (FIG. 26A), or a combination thereof) with a slave interface, one or more host interfaces, and one or more processors, cause the computer system to perform, or control performance of, the operations of any of the methods described herein. In some implementations, a device (e.g., the adapter module 100 (FIGS. 5 and 20), the device 1300 (FIG. 26A), or a combination thereof) includes means for performing, or controlling performance of, the operations of any of the methods described herein.

(A1) In some implementations, a method of retrofitting a payment accepting unit to accommodate one or more payment peripherals is performed at an electronic payment module with one or more processors, memory, a slave interface that couples the electronic payment module with the payment accepting unit via a multi-drop bus (MDB or VCCS-compliant bus), and one or more host interfaces that couple the electronic payment module with the one or more payment peripherals, wherein a respective payment peripheral of the one or more payment peripherals is not coupled with an MDB interface (or, in some instances, a VCCS interface) of the payment accepting unit and is coupled with a respective host interface of the one or more host interfaces of the electronic payment module. The method includes: performing as a virtual payment peripheral for the payment accepting unit by registering the electronic payment module as a slave to the payment accepting unit and performing as a virtual payment accepting unit for the one or more payment peripherals by registering the one or more payment peripherals as slaves to the electronic payment module. The method also includes: receiving a command from the payment accepting unit via the slave interface. In response to receiving the command from the payment accepting unit: (i) sending an acknowledgement, via the slave interface, of the command to the payment accepting unit and (ii) relaying the command to the respective payment peripheral via the respective host interface of the one or more host interfaces of the electronic payment module, the relaying of the command to the respective payment peripheral occurring asynchronously to the sending of the acknowledgement to the payment accepting unit.

(A2) In some implementations of the method of A1, the method further includes: in response to relaying the command, receiving, via the respective host interface of the one or more host interfaces of the electronic payment module, a response from the respective payment peripheral.

(A3) In some implementations of the method of any one of A1-A2, the method further includes: receiving a command from the respective payment peripheral via the respective host interface of the one or more host interfaces of the electronic payment module. In response to receiving the command from the respective payment peripheral: (i) sending an acknowledgement, via the respective host interface of the one or more host interfaces of the electronic payment module, of the command to the respective payment peripheral and (ii) relaying the command to the payment accepting unit via the slave interface, the relaying of the command to the payment accepting unit occurring asynchronously to the sending of the acknowledgement to the respective payment peripheral.

(A4) In some implementations of the method of any one of A1-A3, registering the electronic payment module as a slave to the payment accepting unit further includes: (i) identifying the electronic payment module to the payment accepting unit as a cashless payment peripheral and (ii) accepting registration of the electronic payment module with the payment accepting unit as a cashless payment peripheral.

(A5) In some implementations of the method of any one of A1-A4, registering the electronic payment module as a slave to the payment accepting unit further includes: (i) identifying the electronic payment module to the payment accepting unit as a coin acceptor peripheral and (ii) accepting registration of the electronic payment module with the payment accepting unit as a coin acceptor peripheral.

(A6) In some implementations of the method of any one of A1-A5, registering the electronic payment module as a slave to the payment accepting unit further includes: (i) identifying the electronic payment module to the payment accepting unit as a bill acceptor peripheral and (ii) accepting registration of the electronic payment module with the payment accepting unit as a bill acceptor peripheral.

(A7) In some implementations of the method of any one of A1-A6, the electronic payment module further includes: an internal payment peripheral including a short-range transceiver (e.g., a first communications unit) that is configured to communicate with one or more mobile devices, and each of the one or more mobile devices is configured with a complimentary short-range transceiver and a long-range transceiver.

(A8) In some implementations of the method of A7, the method further includes: receiving a transaction request via the short-range transceiver from a respective mobile device of the one or more mobile devices to perform a transaction with the payment accepting unit. The method also includes: validating the transaction request, wherein validation of the transaction request indicates that the respective mobile device is authorized to initiate payment for the transaction by a remote server via the long-range transceiver. In accordance with a determination that the transaction request is valid, issuing a signal to perform the transaction to the payment accepting unit via the slave interface.

(A9) In some implementations of the method of A8, the method further includes: in accordance with a determination that a command received from the respective payment peripheral corresponds to the transaction, storing transaction information associated with an identifier for the respective payment peripherals, the stored transaction information including at least a transaction cost. The method also includes: sending the transaction information to the respective mobile device of the one or more mobile devices via the short-range transceiver. The method further includes: instructing the respective mobile device to send the transaction information to the remote server via the long-range transceiver.

(A10) In some implementations of the method of any one of A1-A9, the payment accepting unit further includes one or more other payment peripherals coupled with the MDB, a respective other payment peripheral of the one or more other payment peripherals is one of a bill acceptor, coin acceptor, or payment card reader, and the electronic payment module further includes an additional interface that couples electronic payment module with the one or more other payment peripherals of the payment accepting unit.

(A11) In some implementations of the method of A10, the electronic payment module further includes a pass-through channel, the pass-through channel is configured to pass-through signals from the one or more other payment peripherals to the payment accepting unit.

(A12) In some implementations of the method of any one of A11, the respective payment peripheral of the one or more payment peripherals was not supported by the payment accepting unit before (i) coupling the slave interface of the electronic payment module with the payment accepting unit via the MDB and (ii) coupling the respective payment peripheral with the respective host interface of the one or more host interfaces of the electronic payment module.

(A13) In some implementations of the method of any one of A1-A12, the payment accepting unit supported a limited number of payment peripherals before (i) coupling the slave interface of the electronic payment module with the payment accepting unit via the MDB and (ii) coupling the respective payment peripheral with the respective host interface of the one or more host interfaces of the electronic payment module, and further wherein the payment accepting unit supports, after the coupling in (i) and (ii), an expanded number of payment peripherals that is greater than the limited number of payment peripherals.

(A14) In some implementations of the method of A13, the expanded number of payment peripherals includes at least one payment peripheral that is not MDB compliant.

(A15) In some implementations of the method of A14, each payment peripheral of the limited number of payment peripherals is MDB compliant.

(A16) In some implementations of the method of any one of A1-A15, the electronic payment module is disposed inside the payment accepting unit.

(A17) Some implementations also provide for an electronic payment module for retrofitting a payment accepting unit to accommodate one or more peripherals, the electronic payment module including: (i) a slave interface that couples the electronic payment module with the payment accepting unit via a multi-drop bus (MDB); (ii) one or more host interfaces that couple the electronic payment module with the one or more payment peripherals, such that a respective payment peripheral of the one or more payment peripherals of the electronic device is not coupled with an MDB interface of the payment accepting unit and is coupled with a respective host interface of the one or more host interfaces of the electronic payment module; (iii) one or more processors; and (iv) memory storing one or more programs to be executed by the one or more processors, the one or more programs including instructions for performing the method described in any one of A1-A16.

(A18) Some implementations also provide for a non-transitory computer readable storage medium storing one or more programs, the one or more programs including instructions, which, when executed by an electronic payment module with one or more processors, a slave interface that couples the electronic payment module with the payment accepting unit via a multi-drop bus (MDB), and one or more host interfaces that couple the electronic payment module with the one or more payment peripherals, wherein a respective payment peripheral of the one or more payment peripherals is not coupled with an MDB interface of the payment accepting unit and is coupled with a respective host interface of the one or more host interfaces of the electronic payment module, cause the electronic payment module to perform the method described in any one of A1-A16.

(A19) In some implementations, a method of processing and dispensing refunds from a payment accepting unit (e.g., an unattended vending machine) with one or more payment peripherals is performed at an electronic payment module with one or more processors, memory, a slave interface that couples the electronic payment module with the payment accepting unit via an electronic payment interface (such as a multi-drop bus (MDB)), and one or more host interfaces that couple the electronic payment module with at least one payment peripheral of the unattended payment accepting unit, the method including: performing as a virtual payment peripheral for the payment accepting unit by registering the device as a slave to the payment accepting unit; performing as a virtual payment accepting unit for the at least one payment peripheral of the payment accepting unit by registering the at least one payment peripheral as a slave to the electronic payment module; receiving, from a device that is distinct from the electronic payment module, a request to issue an approved refund of a predetermined amount and one or more criteria that must be satisfied before dispensing the approved refund of the predetermined amount; and in accordance with a determination that the one or more criteria are met, issuing (i) a signal to the payment accepting unit, via the slave interface, that the at least one payment peripheral is unavailable and (ii) a signal to the at least one payment peripheral, via the one or more host interfaces, to dispense the approved refund of the predetermined amount.

(A20) In some implementations of the method of A19, the one or more criteria include a criterion that is met when a user actuates a coin return button of the payment accepting unit within a predefined period of time relative to the receiving of the request to issue the approved refund.

(A21) In some implementations of the method of any of A19-20, the method further includes, after dispensing the approved refund of the predetermined amount, issuing a signal to the payment accepting unit, via the slave interface, that the at least one payment peripheral is available and reporting that the predetermined amount was dispensed.

(A22) In some implementations of the method of any of A19-A21, the at least one payment peripheral is a coin acceptor.

(A23) In some implementations of the method of any of A19-A22, the request is received at the electronic payment module after a user selects the payment accepting unit at which to receive the approved refund of the predetermined amount.

(A24) In some implementations of the method of any of A19-A23, the approved refund is approved by a server after the server receives a refund request from the device that is distinct from the electronic payment module.

(A25) Some implementations also provide for an electronic payment module that includes: one or more processors, memory, a slave interface that couples the electronic payment module with a payment accepting unit (such as an unattended vending machine) via an electronic payment interface (such as a multi-drop bus (MDB)), and one or more host interfaces that couple the electronic payment module with at least one payment peripheral of the payment accepting unit, wherein the memory stores one or more programs to be executed by the one or more processors, the one or more programs comprising instructions for performing the method of any one of A19-A24.

(A26) Some implementations also provide for a non-transitory computer readable storage medium storing one or more programs, the one or more programs including instructions, which, when executed by a device with one or more processors, a slave interface that couples the electronic payment module with a payment accepting unit (such as an unattended vending machine) via an electronic payment interface (such as a multi-drop bus (MDB)), and one or more host interfaces that couple the electronic payment module with at least one payment peripheral of the payment accepting unit, cause the device to perform the method of any one of A19-A24.

(A27) In some implementations, a method for processing and distributing payment accepting unit (e.g., unattended vending machine) refunds is performed at a refunds processing device that includes one or more processors, memory, the memory storing one or more programs for execution by the one or more processors to perform the method including: receiving at the refunds processing device a request for a refund for an end user transaction with a first payment accepting unit, wherein the end user has a known location; transmitting the request to a refunds authorizing server distinct from the refunds processing device; receiving from the refunds authorizing server an authorization message authorizing the refund, the message designating a specific payment accepting unit in proximity to the known location of the end user that is: a) communicatively coupled to the refunds processing device; and b) configured to provide payment of the refund; transmitting to the specific payment accepting unit an electronic command to issue the refund subject to one or more conditions; transmitting the one or more conditions to the end user to enable the end user to comply with the conditions and therefore complete the refund.

(A28) Some implementations also provide for a refunds processing device that includes: one or more processors, memory and communication capabilities configured to communicatively couple the refunds processing device to a refunds authorizing server and one or more payment accepting units, wherein the memory stores one or more programs to be executed by the one or more processors, the one or more programs comprising instructions for performing the method of A27.

(A26) Some implementations also provide for a non-transitory computer readable storage medium storing one or more programs, the one or more programs including instructions, which, when executed by a refunds processing device that includes: one or more processors, memory and communication capabilities configured to communicatively couple the refunds processing device to a refunds authorizing server and one or more payment accepting units, cause the device to perform the method of A27.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE DRAWINGS

FIG. 3 is a table that illustrates the hands-free credit or alert user principle in accordance with some implementations.

FIG. 4 is a flow chart showing the logging received signal strength indicator (RSSI) information in accordance with some implementations.

FIG. 14 is a side view of the in-line dongle adapter module of FIG. 11 in accordance with some implementations.

FIG. 15 is a first end view of a connector receptacle of the in-line dongle adapter module of FIG. 11 in accordance with some implementations.

FIG. 16 is a second end view of a connector receptacle of the in-line dongle adapter module of FIG. 11 in accordance with some implementations.

FIG. 17 is a perspective view taken from the first end of the in-line dongle adapter module of FIG. 11, the connectors and cables between which the in-line dongle adapter module is inserted being shown in broken lines for illustrative purposes in accordance with some implementations.

FIG. 24B is a block diagram of an authorization request in accordance with some implementations.

FIG. 24C is a block diagram of an authorization grant token in accordance with some implementations.

FIGS. 29A-29D illustrate a flowchart diagram of a method of retrofitting a payment accepting unit to accommodate a plurality of payment peripherals in accordance with some implementations.

Like reference numerals refer to corresponding parts throughout the several views of the drawings.

DETAILED DESCRIPTION OF THE INVENTION

Figure 2:
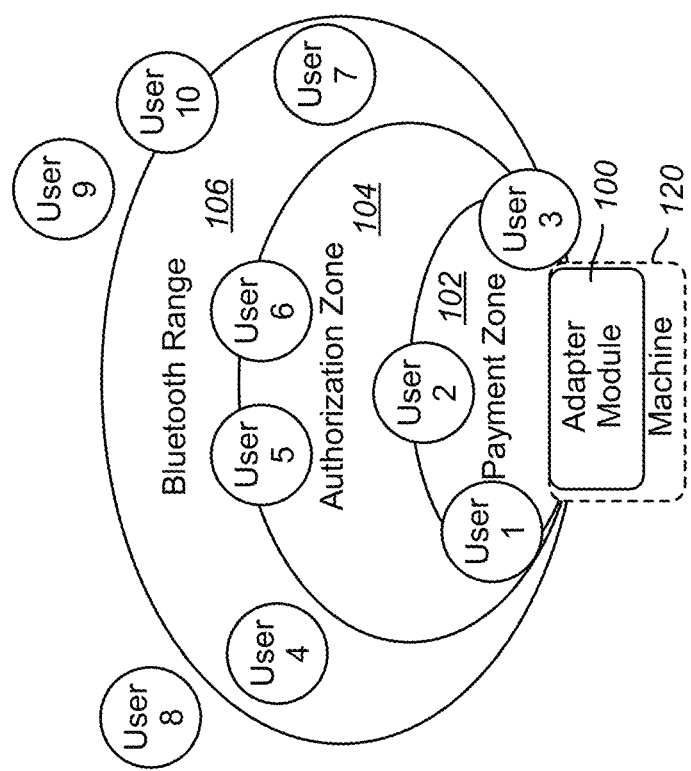
FIG. 2 is a schematic diagram that shows the three zones of FIG. 1 with multiple users therein in accordance with some implementations.

Disclosed herein is a payment processing system or, more specifically, a mobile-device-to-machine payment processing system for processing transactions over a non-persistent network connection. The mobile-device-to-machine payment processing system disclosed herein focuses on the unattended retail space (e.g., a payment accepting unit 120, sometimes also herein called a "machine 120"). More specifically, the mobile-device-to-machine payment processing system disclosed herein allows a user (having a mobile device 150 with a mobile application 140 thereon) to make a cashless purchase from a payment accepting unit 120 (having an adapter module 100 associated therewith).

The mobile-device-to-machine payment processing system described herein can be implemented with one or more of the following features: easy installation feature, a non-persistent network connection feature; a manual (swipe to pay) mode feature; a hands-free mode feature; and a multiple vending transactions (multi-vend) feature.

Easy Installation: Installation is very easy, requires no tools, requires no configuration, and takes as little as 30 seconds. This is accomplished by using an adapter module 100 (sometimes also herein called "payment module 100") such as an in-line dongle (a hardware device with software thereon) design for in-line insertion within a multi-drop bus (MDB-standard or, in some instances, VCCS-standard) of a payment accepting unit 120 (e.g., a vending machine) (sometimes also herein called 'the machine 120"). Installation is as simple as "powering down" (turning off) the machine 120, identifying the "wire" that connects with a payment receiving mechanism (e.g., the coin mechanism), disconnecting the wire (so that there are two loose ends, such as a male connection end or adapter of an MDB and a female connection end or adapter of an MDB), plugging (inserting) the adapter module 100 in serial ("in-line") with the wire (e.g., connecting the MDB female adapter to a male adapter of the adapter module 100 and connecting the MDB male adapter to a female adapter of the adapter module 100), tucking the wire and the installed adapter module 100 back into position, and "powering up" (turning on) the machine 120. Most vending machines made since 1995 have this industry standard MDB technology, allowing this easy 30-second installation. On machines without MDB technology, the adapter module 100 can be configured or designed to work with other serial protocols or activate a switch. In essence the adapter module 100 simulates establishing payment on payment accepting unit 120 in much the same manner as other alternative forms of payment (e.g., cash).

Non-persistent Network Connection: Although payment accepting units (or "machines") that accept only cash (e.g., paper currency and coins) may not require a connection (persistent or non-persistent) to a network, traditional payment accepting units that accept cashless payments (e.g., credit cards, debit cards, and alternative mobile device payment methods using, for example, smart phones) require a persistent connection to a network (wired or wireless) to facilitate the cashless payments. In other words, without a persistent (ongoing or accessible on demand) network connection, traditional payment accepting units cannot accept cashless payments. Most traditional payment accepting units that accept cashless payments include the technology to accomplish this persistent network connection that allows them to connect to a remote server. If the network connection to a traditional machine is temporarily interrupted, cashless payments will be temporarily unavailable. If the machine is located in a location where no network connection is available, cashless payments is not possible. In addition to using a mobile device 150 as an intermediary between the payment accepting units 120 and the server 130, the mobile-device-to-machine payment processing system described herein minimizes (i.e., the manual mode) or eliminates (i.e., the hands-free mode) user interaction with the mobile device 150. Further, in some implementations, the mobile-device-to-machine payment processing system described herein facilitates the acceptance of cashless payments without requiring any network connection near the payment accepting unit 120. In some implementations, when the mobile-device-to-machine payment processing system described herein is located in a remote location where network connection is unavailable, the mobile-device-to-machine payment processing system, therefore, can still accept cashless payments.

Manual (Swipe-to-Pay) Mode: Using a "swipe-to-pay" feature (or just "swipe") refers to a user's action implemented on his/her mobile device 150 where he/she quickly brushes his/her finger (or other pre-determined interaction) on the mobile device's touch screen 152 (FIGS. 10A-10D) or other input devices associated with the mobile device 150. From the user's perspective, when the user is within range, a pre-installed mobile application 140 automatically connects to the payment accepting unit 120 (e.g., a vending machine). The mobile application 140 might display (on the touch screen 152) a prepaid balance that the user "swipes" to transfer payment to the payment accepting unit 120. The user could observe the transferred funds on the touch screen 152 of the mobile device 150 and/or on the display 122, 124 (FIG. 19) of the payment accepting unit 120. The transaction is completed just as if cash was inserted in the machine 120 with the user inputting his selection on the payment accepting unit 120 and the payment accepting unit 120 dispensing the product or service. After the selection is made, the change is returned to the mobile device 150 and this may be shown on the touch screen 152 of the mobile device 150.

Hands-Free Mode: A "hands-free pay" feature (or just "hands-free") would most likely be used with "favorite" payment accepting units 120 (e.g., a frequently used vending machine at a user's work or school). From the user's perspective, he/she would approach the favorite payment accepting unit 120 and notice that the display 122, 124 (FIG. 19) of the payment accepting unit 120 shows funds available, he/she would select the product or service using the payment accepting unit's input mechanisms (e.g., buttons 126 or a touch screen display 124 shown in FIG. 19), and he/she would retrieve dispensed services or products. It would be that simple. More specifically, when the user is within range, a pre-installed mobile application 140 automatically connects to the payment accepting unit 120 (e.g., a vending machine). The user may leave the mobile device 150 in a pocket, purse, briefcase, backpack, or other carrier. As the user approaches the payment accepting unit 120 and is in approximately "arm's-length" distance (e.g., 3 to 5 feet) of the payment accepting unit 120, the user could observe the transferred funds on the display 122, 124 (FIG. 19) of the payment accepting unit 120. The transaction is completed just as if cash was inserted into the payment accepting unit 120 with the user inputting his/her selection on the payment accepting unit 120 and the payment accepting unit 120 dispensing the product or service. After the selection is made, the change is returned to the mobile device 150. FIG. 3 details when the hands-free mode would be available.

Multiple Vending Transactions (Multi-Vend): Both the manual and hands-free modes could be used multiple times in sequence (implemented, for example, as a loop) so that a user may make multiple purchases. After making his/her first selection and receiving his product (or service), the user would observe that additional funds were available on the display 122, 124 (FIG. 19) on the payment accepting unit 120. He/she could make another selection (or multiple selections) and receive additional product(s) (or service(s)). More specifically, the display 122, 124 (FIG. 19) may reset as if the transaction is complete, but then, because the user is still standing in range, the mobile application 140 would send another credit to the payment accepting unit 120, allowing for a second purchase. When the user walks away, the system clears (e.g., returns unused funds to the application 140 on the mobile device 150).

Refunds: a user can obtain cash refunds directly from payment peripherals of vending machines configured with payment modules via refund software (and user interfaces) that executes on the user's mobile device and/or a dedicated electronic device (e.g., a refund center device) and that manages the process of requesting a refund and/or redeeming a refund code to allow the user to obtain the cash refund.

The features described above, alone or in combination with other features described herein will revolutionize the hundred billion dollar automated retail industry. The hardware is very low cost and there are no reoccurring fees because no cellular connection is required on the machine 120. Using the mobile-device-to-machine payment processing system described herein, operators of machines 120 can increase frequency of visits by purchasers and items sold with each visit.

The mobile-device-to-machine payment processing system described herein may be implemented as an apparatus, system, and/or method for enabling payments to a machine 120 via a mobile device 150. The mobile-device-to-machine payment processing system may be better understood with reference to the drawings, but the shown mobile-device-to-machine payment processing system is not intended to be of a limiting nature.

Definitions

Before describing the mobile-device-to-machine payment processing system and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

Figure 1:
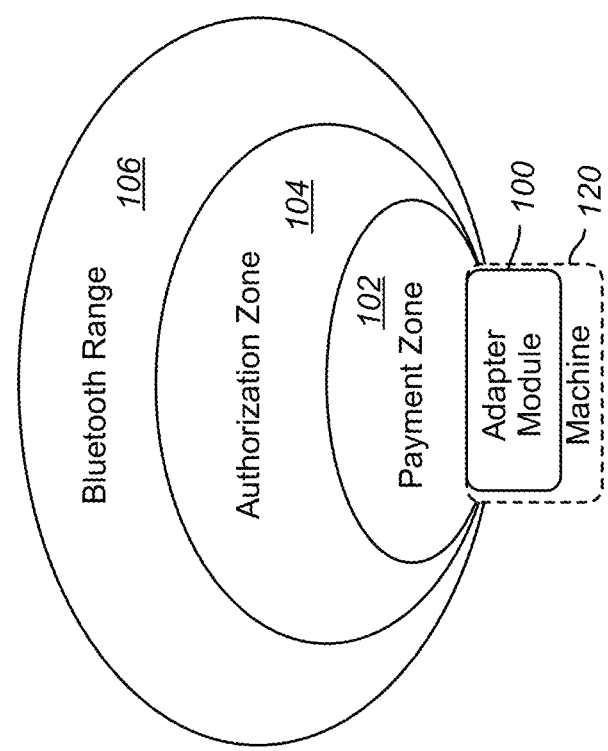
FIG. 1 is a schematic diagram that shows three zones: a "communication zone" (e.g., Bluetooth range), an "authorization zone," and a "payment zone" in accordance with some implementations.
Figure 20:
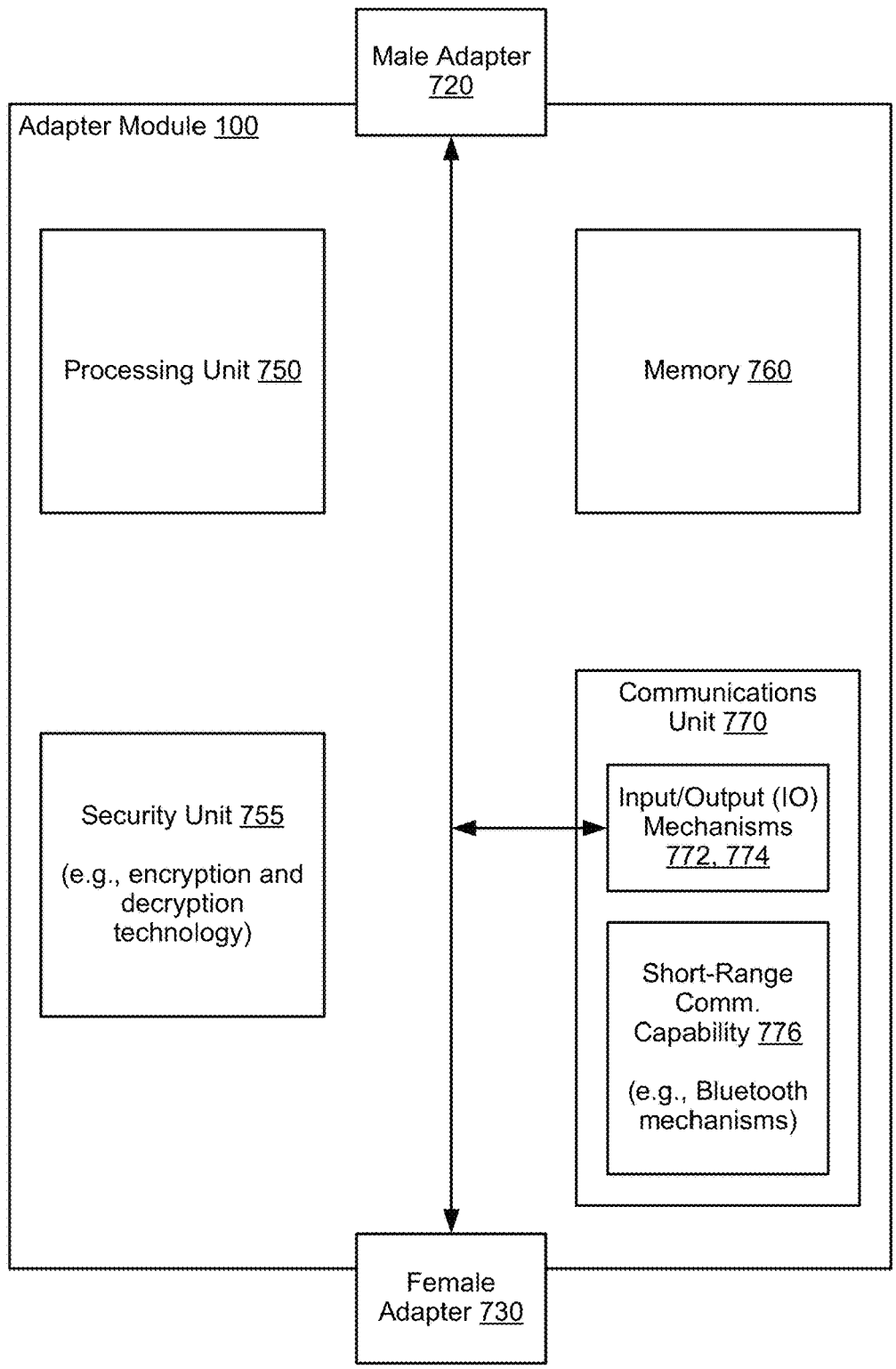
FIG. 20 is a block diagram of an adapter module in accordance with some implementations.

Adapter Module 100: As shown in FIGS. 1 and 2, the adapter module 100 (sometimes also herein called the "payment module 100") is a physical device that is installed in a machine 120 (a payment accepting unit 120). The shown adapter module 100 is an in-line dongle (a hardware device with software thereon) device that may be inserted in-line within a multi-drop bus (MDB) of a machine 120. The adapter module 100 bridges the communication between the machine 120 and a mobile device 150. Although described as a unique component, it should be noted that the adapter module 100 could be implemented as a plurality of devices or integrated into other devices (e.g., components of a machine 120). In its unique component form, the adapter module 100 can be easily inserted into a machine 120 so that the machine 120 is able to perform new features with the assistance of the adapter module 100. FIG. 20 shows components associated with the adapter module 100. As shown in FIG. 20, the communications unit 770 of the adapter module 100 includes short-range communication capability 776 (e.g., Bluetooth mechanisms). The shown example may be divided into multiple distinct components that are associated with each other or the example may be incorporated into or drawn from other technology (e.g., a computer or a payment accepting unit) as long as the components are associated with each other.

Figure 21:
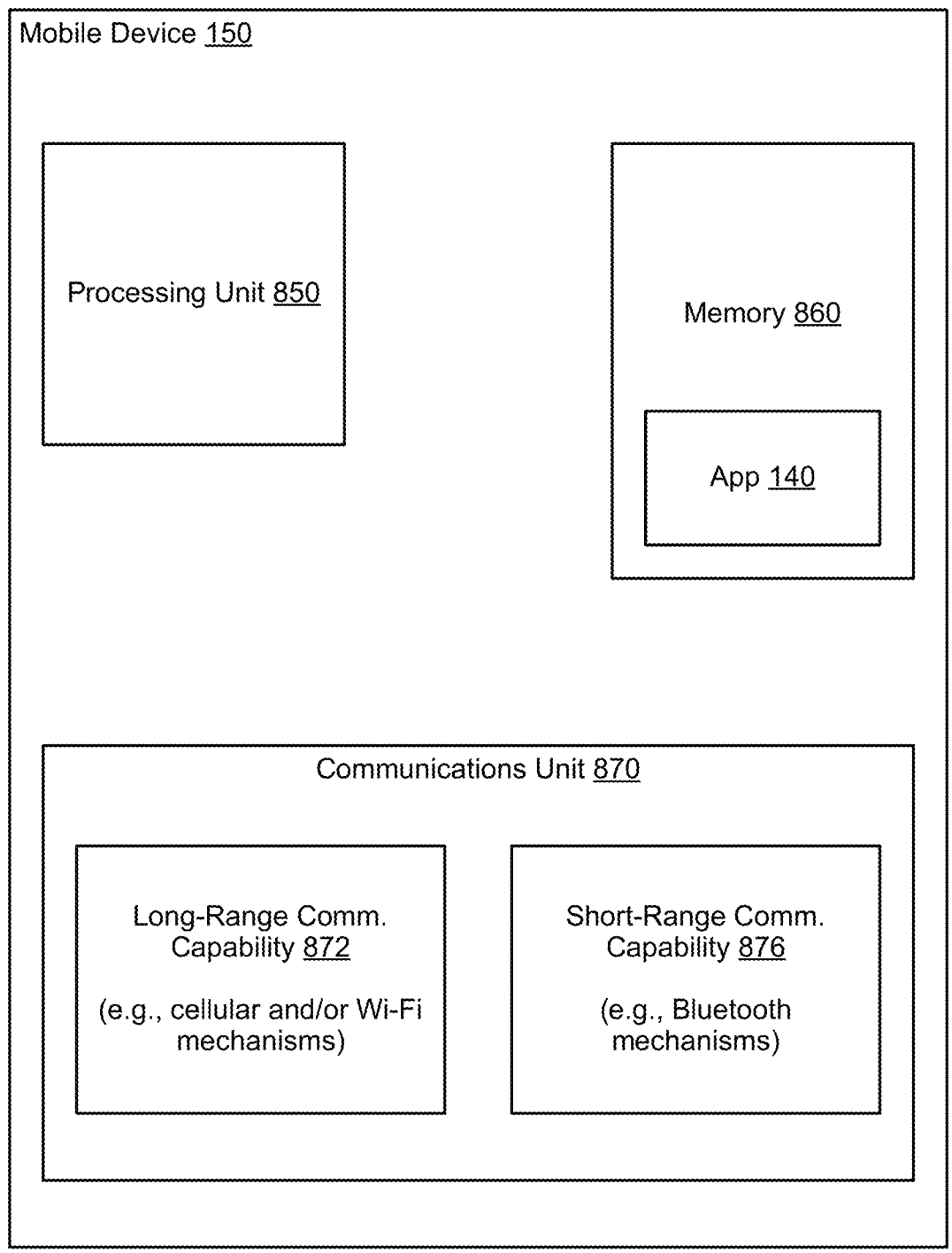
FIG. 21 is a block diagram of a mobile device in accordance with some implementations.

Mobile Device 150 and Application 140 (also referred to as a "mobile application," "mobile app," or "app"): In general, a mobile device 150 may be a user's personal mobile device 150. The mobile device 150 (with a mobile application 140 thereon) acts as a communication bridge between the adapter module 100 (associated with a payment accepting unit 120) and the server 130. The mobile device 150 and the application 140, however, are not "trusted" in that the communications (transmissions) it passes are encrypted. Encrypted (secured) communications are undecipherable (unencryptable, unreadable, and/or unusable) by the mobile device 150. This keeps the communications passed between the adapter module 100 and the server 130 secured and safe from hacking. Mobile devices include, but are not limited to smart phones, tablet or laptop computers, or personal digital assistants (PDAs), smart cards, or other technology (e.g., a hardware-software combination) known or yet to be discovered that has structure and/or capabilities similar to the mobile devices described herein. The mobile device 150 preferably has an application (e.g., the application 140) running on it. The term "app" is used broadly to include any software program(s) capable of implementing the features described herein. FIGS. 10A-10D show user interfaces for the application 140 displayed by the mobile device 150. It should be noted that the phrase "mobile device" can be assumed to include the relevant app unless specifically stated otherwise. Similarly, it should be noted that an "app" can be assumed to be running on an associated mobile device unless specifically stated otherwise. FIG. 21 shows components associated with the mobile device 150. The shown example may be divided into multiple distinct components that are associated with each other or the example may be incorporated into or drawn from other technology (e.g., the cell phone itself) as long as the components are associated with each other.

Payment Accepting Unit 120 (or Machine 120): A payment accepting unit 120 (or the machine 120) is equipment that requires payment for the dispensing of a product and/or service. Payment accepting units 120 may be vending machines, parking meters, toll booths, laundromat washers and dryers, arcade games, kiosks, photo booths, toll booths, transit ticket dispensing machines, and other known or yet to be discovered payment accepting units 120. Some payment accepting units 120 can accept cashless payments (payments other than cash (paper currency and coins)) by accepting payment from, for example, credit cards, debit cards, and mobile devices.

Network Connections: For purposes of this discussion, a persistent network connection is a wired or wireless communications connection that is ongoing (e.g., a dedicated connection, a dedicated online connection, and/or a hard-wired connection) or accessible on demand (e.g., the ability for the machine to make a temporary connection to a server or the ability for the user to contact a server from his mobile device). Typically the persistent network connection has been conducted over "long-range communication technology" or "long-range communication protocol" (e.g., hard-wired, telephone network technology, cellular technology (e.g., GSM, CDMA, or the like), Wi-Fi technology, wide area network (WAN), local area network (LAN), or any wired or wireless communication technology over the Internet that is known or yet to be discovered). Traditionally, machines that accept payment other than cash require a persistent (ongoing or accessible on demand) connection to a network to facilitate payment. This is true for machines that accept, for example, credit cards and debit cards. The payment accepting units 120 described herein do not require a traditional persistent network connection. The user's mobile device 150 acts as a communication bridge between the adapter module 100 and the server 130. Communications between user mobile devices 150 and the servers (e.g., a system management server 130 and/or a funding source server 160) take place using long-range communication technology. Communications between user mobile devices 150 and the adapter module 100 of the payment accepting unit 120 take place using "short-range communication technology" or "short-range communication protocol" (e.g., Bluetooth (such as Bluetooth 4.0, Bluetooth Smart, Bluetooth Low Energy (BLE)), near-field communication (NFC), Ultra Wideband (UWB), radio frequency identification (RFID), infrared wireless, induction wireless, or any wired or wireless technology that could be used to communicate a small distance (approximately a hundred feet or closer) that is known or yet to be discovered). Therefore, neither the adapter module 100 nor the payment accepting unit 120 requires a traditional persistent long-range wireless network connection. The communications technology shown in the figures may be replaced with alternative like communications technology and, therefore, specific shown communications technologies are not meant to be limiting. For example, Wi-Fi technology could be replaced with another long-range communication technology.

Figure 22:
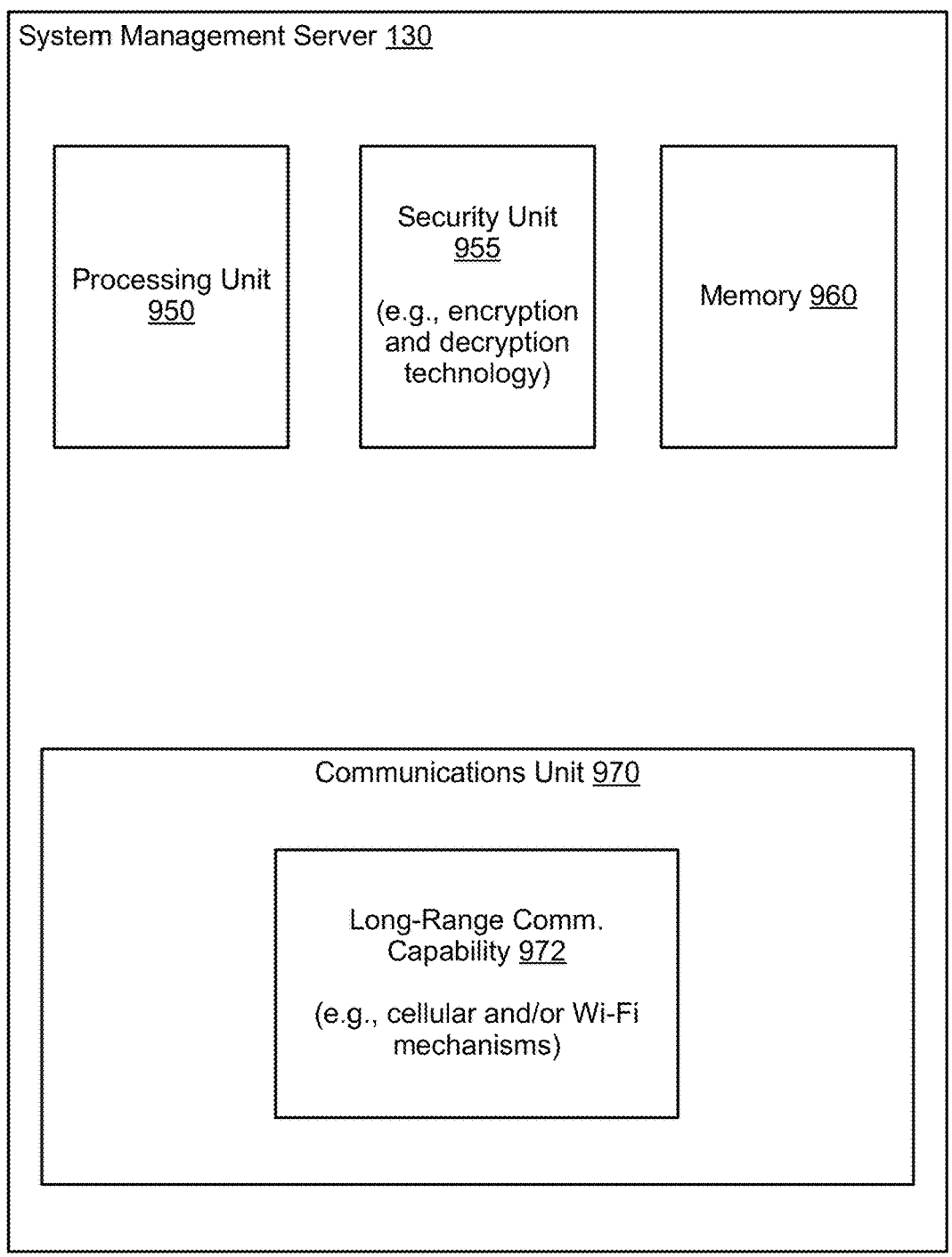
FIG. 22 is a block diagram of a server in accordance with some implementations.

Server: A server is the host processing server that may be operated by the company running the payment processing system. For each user, the server 130 preferably maintains at least one "virtual wallet" having at least one "balance" (which can be $0) of designated funds for which the server 130 keeps an accounting. The balance may represent, for example, "cash" or it may be a "promotional value" that represents funds that may be spent under certain circumstances. If these funds begin to be depleted, the user may be notified (e.g., via the application 140 on the mobile device 150) that additional funds need to be designated and/or transferred. Alternatively, funds from other sources (e.g., the funding source server 160) may be automatically transferred to restore a predetermined balance. The balance may also be increased based on a promotion (e.g., points earned or coupons). As shown in FIG. 22, the server includes appropriate processors 950, memory 960 (which would keep an accounting of the user's balance in a manner similar to a gift card), and communication systems 970. As shown in FIG. 22, the communications unit 970 of the server 130 includes long-range communication capability 972 (e.g., cellular technology and/or Wi-Fi mechanisms). The server 130 also includes a security unit 955 for encrypting and decrypting messages. The server 130 receives an authorization request (sometimes also herein called an "AuthRequest") from the adapter module 100 (via a mobile device 150) and, if funds are available, returns an authorization grant (sometimes also herein called an "AuthGrant" or an "authorization grant token") for funds. FIG. 22 shows components associated with the server 130. The shown example may be divided into multiple distinct components that are associated with each other or the example may be incorporated into or drawn from other technology (e.g., a computer or a main frame) as long as the components are associated with each other.

Advertise Presence: Each adapter module 100 advertises its presence by broadcasting signals (advertising broadcast signals) to mobile devices in the zones 102, 104, 106. Each adapter module 100 can listen to other adapter modules' advertisements.

Received Signal Strength Indicator (RSSI): The adapter module 100 may have a self-calibrating signal strength to determine zone thresholds (e.g., a payment zone threshold and an authentication zone threshold). At the time the user selects an item (product or service) from the payment accepting unit 120, the Received Signal Strength Indicator (RSSI) is logged. At this moment, it is presumed the user is within "arm's-length" (which may be a predetermined length approximating the distance of a user standing in front of a machine for the purpose of making a purchase) from the payment accepting unit 120. A mathematical computation (i.e., In-Range Heuristics) is conducted to derive the optimal RSSI threshold at which point payment should be triggered by an application 140 on a mobile device 150. The threshold may be payment accepting unit specific and can vary over a period of time. This optimal zone threshold is preferably reported to the mobile device 150 during an initial handshake.

In-Range Heuristics: A mathematical computation that determines the RSSI threshold to determine when a user is in the authorization zone 104 and/or the payment zone 102. This computation can take into consideration numerous historical data points as well as transaction specific information such as which the mobile device 150 is being used, payment accepting unit type, among other factors. Preferably the RSSI is logged while the user is making his selection (this is the one time in the entire process that the user definitely will be "in range" (e.g., they will be arm's length from the machine 120 because they are physically interacting with the machine 120). The type of user mobile device 150, accelerometer data (e.g., is the user moving or stationary), and/or other information may also be logged while the user is making his selection. The adapter module 100 can give a reference RSSI for the payment zone 102 for the machine 120, and the application 140 can make a +/−adjustment based on the specific mobile device 150 on which it is installed. Over a period of time, the payment processing system continues to improve in-range heuristics based on additional data points.

Authorization Request ("AuthRequest:): When a user enters the authorization zone 104, the mobile device 150 notifies the adapter module 100 and the adapter module 100 sends a secured authorization request (e.g., the encrypted authorization request) as a "message" (also referred to as a communication or transmission) to the server 130 via the mobile device 150. Encryption may be performed by a security unit 755 (FIG. 20) with security technology (e.g., encryption and decryption means) that may be associated with the processing unit 750 and/or the memory 760. Significantly, the AuthRequest is a request for authorization of funds, not a request for authorization of a transaction. The purpose of the funds is irrelevant to the server 130.

Authorization Grant Token ("AuthGrant"): This is a "message" (also referred to as a communication or transmission) encrypted by the security unit 955 (FIG. 22) with security technology (e.g., encryption and decryption means) of the server 130 with the unique private key corresponding to the adapter module 100. The secured authorization grant (e.g., the encrypted authorization grant) is passed from the server 130 to the adapter module 100 via the mobile device 150 in the form of a message. The mobile device 150, however, is not able to decrypt and/or read the message. The authorization grant is in response to the authorization request. The amount of the funds granted by the AuthGrant may be determined by factors including, but not limited to, the amount of funds available (or, if funds are not available, a mini-loan could be granted), a pre-authorized amount (e.g., set by the server, set by the user during set-up, set by the funding source, or a standard amount), limited by time (e.g., only a certain amount per hour, or a predetermined amount at specific times of the day), limited to the maximum amount of an item on the machine (or enough for two or three items in the machine), or one or more of these and other factors. Significantly, the AuthGrant makes the funds available, but does not authorize a transaction. The AuthGrant may have an associated expiration period in that it may expire if it is not used in a pre-determined time period. The length of time before the AuthGrant expires may be determined by factors including, but not limited to, the trustworthiness of the user (e.g., the user has a long history with the payment processing system or some known provider (e.g., credit card provider, bank, or credit union), the user has a good credit rating, or the user has a large wallet balance), a pre-authorized time period (e.g., set by the server, set by the user during set-up, set by the funding source, or a standard time period), limited by time (e.g., predetermined time periods at specific times of the day such as longer times during breakfast, lunch, and dinner), limited by the machine or the products or services sold in the machine, limited by the number of other users near the machine (e.g., if it is a crowded machine, the AuthGrant may expire faster), or one or more of these and other factors. The AuthGrant remains valid until it expires or some other event occurs to end its validity (e.g., the user cancels it). This means that under normal circumstances the mobile device 150 will hold the AuthGrant authorizing use of funds for a pre-determined time period that will allow the user sufficient time to make a purchase. The authorized amount may be considered to be the "wallet balance" that is held in a virtual "wallet."

Synchronization: Time may be synchronized to the adapter module 100 from the server 130. The server 130 sends time information with encrypted messages and the adapter module 100 uses the time encoded in the messages for synchronization.

The mobile-device-to-machine payment processing system and components thereof may have associated hardware, software, and/or firmware (a variation, subset, or hybrid of hardware and/or software). The term "hardware" includes at least one "processing unit," "processor," "computer," "programmable apparatus," and/or other known or yet to be discovered technology capable of executing instructions or steps (shown as the processing unit 750 in FIG. 20, the processing unit 850 in FIG. 21, and the processing unit 950 in FIG. 22). The term "software" includes at least one "program," "subprogram," "series of instructions," or other known or yet to be discovered hardware instructions or hardware-readable program code. Software may be loaded onto hardware (or firmware) to produce a "machine," such that the software executes on the hardware to create structures for implementing the functions described herein. Further, the software may be loaded onto the hardware (or firmware) so as to direct the mobile-device-to-machine payment processing system (and components thereof) to function in a particular manner described herein or to perform a series of operational steps as described herein. "Hardware" such as the adapter module 100, the mobile device 150, and the payment accepting unit 120 may have software (e.g., programs and apps) loaded thereon. The phrase "loaded onto the hardware" also includes being loaded into memory (shown as the memory 760 in FIG. 20, the memory 860 in FIG. 21, and the memory 960 in FIG. 22) associated with or accessible by the hardware. The term "memory" is defined to include any type of hardware (or other technology) -readable media (also referred to as computer-readable storage medium) including, but not limited to, attached storage media (e.g., hard disk drives, network disk drives, servers), internal storage media (e.g., RAM, ROM, EPROM, FLASH-EPROM, or any other memory chip or cartridge), removable storage media (e.g., CDs, DVDs, flash drives, memory cards, floppy disks, flexible disks), firmware, and/or other known or yet to be discovered storage media. Depending on its purpose, the memory may be transitory and/or non-transitory. Appropriate "messages," "communications," "signals," and/or "transmissions" (that includes various types of information and/or instructions including, but not limited to, data, commands, bits, symbols, voltages, currents, electromagnetic waves, magnetic fields or particles, optical fields or particles, and/or any combination thereof) over appropriate "communication paths," "transmission paths," and other means for signal transmission including any type of connection between two elements on the payment processing system (e.g., the adapter module 100, the mobile device 150, the payment accepting unit 120, hardware systems and subsystems, and memory) would be used as appropriate to facilitate controls and communications.

It should be noted that the terms "programs" and "subprograms" are defined as a series of instructions that may be implemented as software (i.e. computer program instructions or computer-readable program code) that may be loaded onto a computer to produce a "machine," such that the instructions that execute on the computer create structures for implementing the functions described herein or shown in the figures. Further, these programs and subprograms may be loaded onto a computer so that they can direct the computer to function in a particular manner, such that the instructions produce an article of manufacture including instruction structures that implement the function specified in the flow chart block or blocks. The programs and subprograms may also be loaded onto a computer to cause a series of operational steps to be performed on or by the computer to produce a computer implemented process such that the instructions that execute on the computer provide steps for implementing the functions specified in the flow chart block or blocks. The phrase "loaded onto a computer" also includes being loaded into the memory of the computer or a memory associated with or accessible by the computer. Separate, albeit interacting, programs and subprograms may be associated with the adapter modules 100, the server 130, and the mobile device 150 (including the mobile application 140) and these programs and subprograms may be divided into smaller subprograms to perform specific functions.

The terms "messages," "communications," "signals," and/or "transmissions" include various types of information and/or instructions including, but not limited to, data, commands, bits, symbols, voltages, currents, electromagnetic waves, magnetic fields or particles, optical fields or particles, and/or any combination thereof. Appropriate technology may be used to implement the "communications," "signals," and/or "transmissions" including, for example, transmitters, receivers, and transceivers. "Communications," "signals," and/or "transmissions" described herein would use appropriate technology for their intended purpose. For example, hard-wired communications (e.g., wired serial communications) would use technology appropriate for hard-wired communications, short-range communications (e.g., Bluetooth) would use technology appropriate for close communications, and long-range communications (e.g., GSM, CDMA, Wi-Fi, or the like) would use technology appropriate for remote communications over a distance. Appropriate security (e.g., SSL or TLS) for each type of communication is included herein. The security units 755 and 955 include technology for securing messages. The security technology may be, for example, encryption/decryption technology (e.g., software or hardware). Although encryption/decryption is discussed primarily as being performed using a unique private key, alternative strategies include, but are not limited to encryption/decryption performed using public/private keys (i.e., asymmetric cryptography), or other encryption/decryption strategies known or yet to be discovered. Appropriate input mechanisms and/or output mechanisms, even if not specifically described, are considered to be part of the technology described herein. The communications unit 770 (shown in FIG. 20) of the adapter module 100 is shown as including appropriate input and output mechanisms 772, 774 that may be implemented in association (e.g., directly or indirectly in functional communication) with male and female adapters 720, 730 of the adapter module 100. The communications unit 870 (shown in FIG. 21) of the mobile device 150 includes mechanisms for both long-range communications (shown as the long-range communication capability 872 such as cellular and/or Wi-Fi mechanisms) for communicating with the server 130 and short-range communications (shown as the short-range communication capability 876 such as Bluetooth mechanisms) for communicating with the adapter module 100.

When used in relation to "communications," "signals," and/or "transmissions," the terms "provide" and "providing" (and variations thereof) are meant to include standard means of provision including "transmit" and "transmitting," but can also be used for non-traditional provisions as long as the "communications," "signals," and/or "transmissions" are "received" (that can also mean obtained). The terms "transmit" and "transmitting" (and variations thereof) are meant to include standard means of transmission, but can also be used for non-traditional transmissions as long as the "communications," "signals," and/or "transmissions" are "sent." The terms "receive" and "receiving" (and variations thereof) are meant to include standard means of reception, but can also be used for non-traditional methods of obtaining as long as the "communications," "signals," and/or "transmissions" are "obtained."

Figure 19:
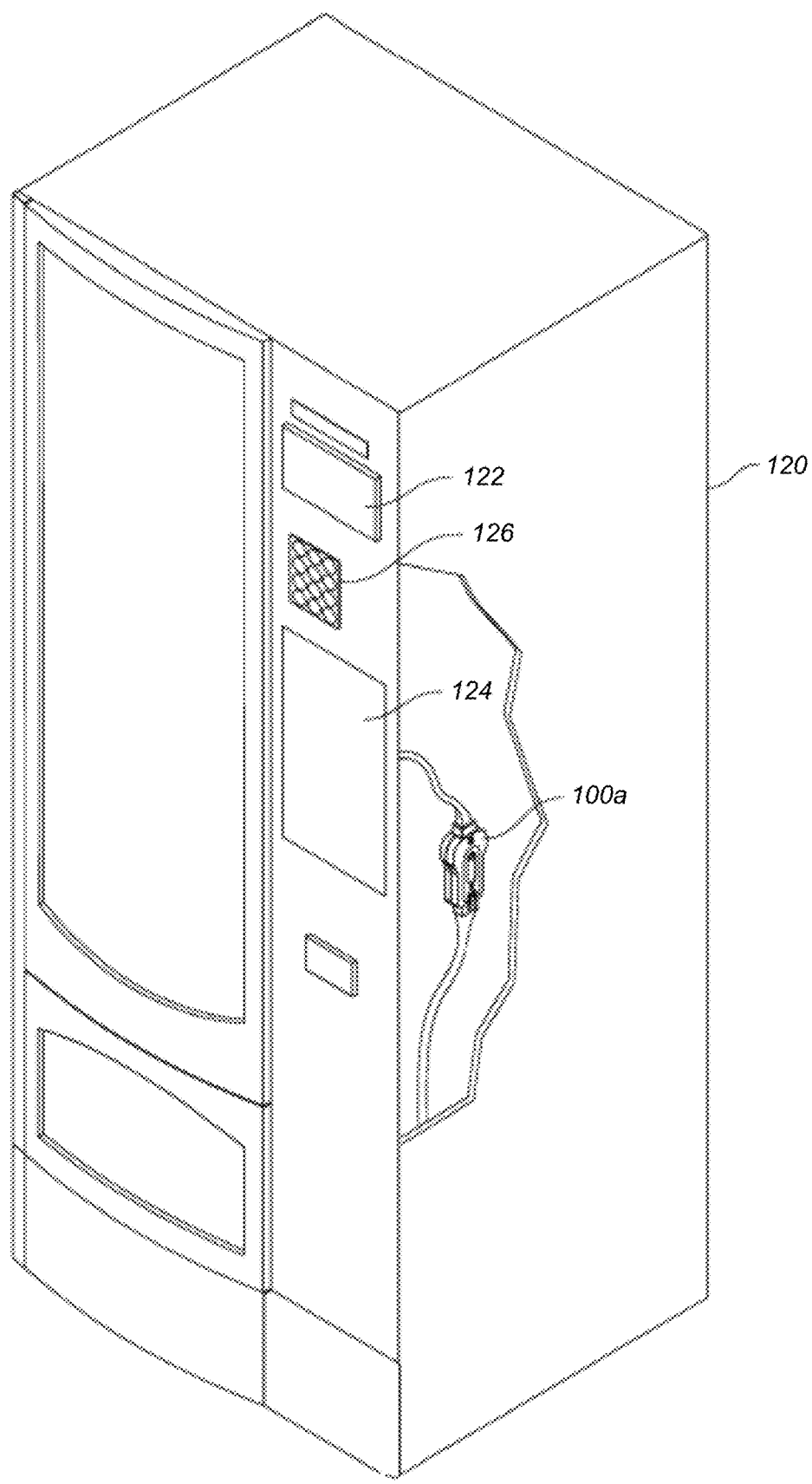
FIG. 19 is a perspective view of the in-line dongle adapter module of FIG. 11 within a vending machine in accordance with some implementations.

The term "associated" is defined to mean integral or original, retrofitted, attached, connected (including functionally connected), positioned near, and/or accessible by. For example, if the user interface (e.g., a traditional display 122 (FIG. 19), a touch screen display 124 (FIG. 19), a key pad 126 (FIG. 19), buttons 126 (FIG. 19, shown as part of the key pad 126), a keyboard (not shown), and/or other input or output mechanism) is associated with a payment accepting unit 120, the user interface may be original to the payment accepting unit 120, retrofitted into the payment accepting unit 120, attached to the payment accepting unit 120, and/or a nearby the payment accepting unit 120. Similarly, adapter modules 100 may be associated with payment accepting units 120 in that the adapter modules 100 may be original to the payment accepting unit 120, retrofitted into the payment accepting unit 120, attached to the payment accepting unit 120, and/or nearby the payment accepting unit 120.

System Overview

Figure 5:
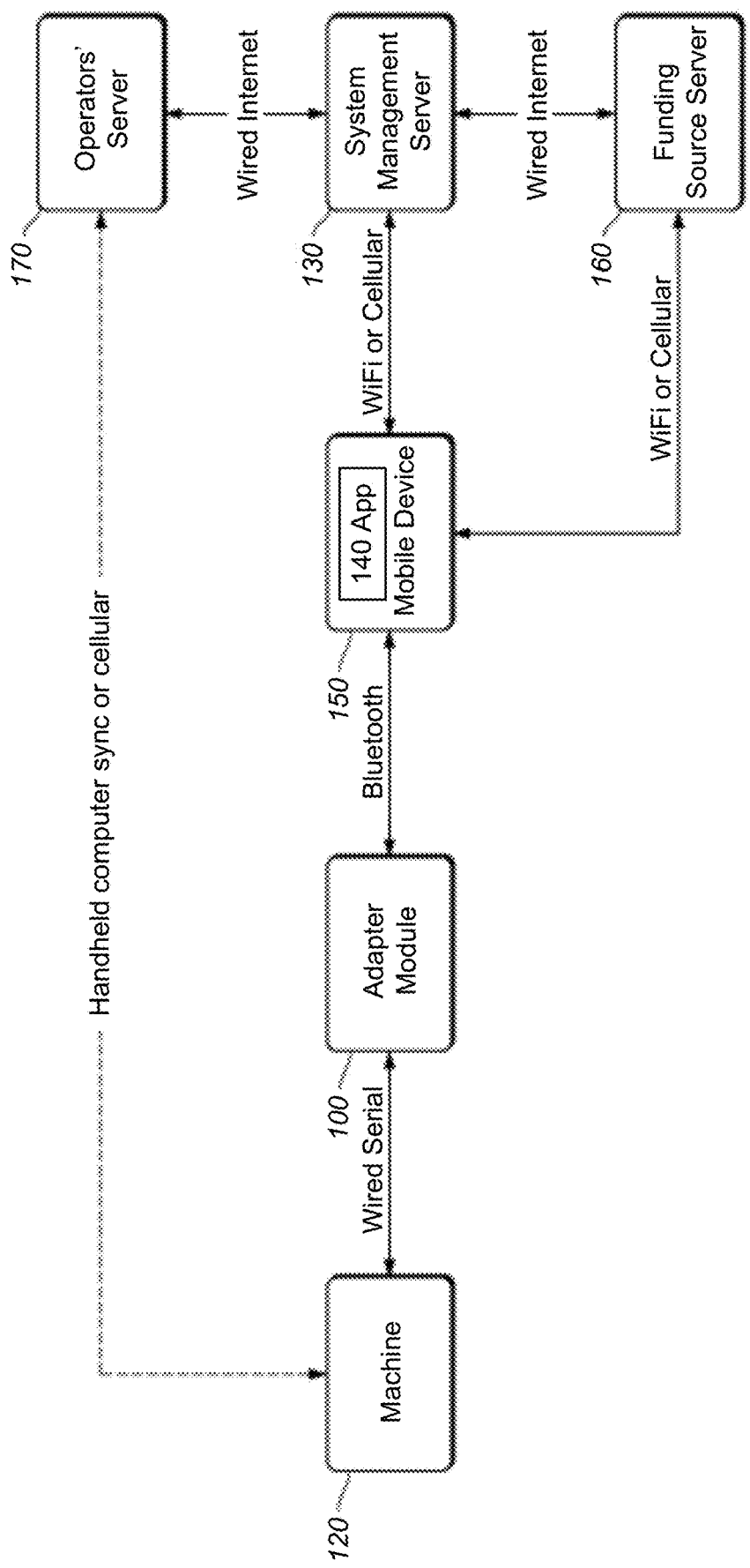
FIG. 5 is a block schematic that shows elements of the payment processing system including, but not limited to, the adapter module, the machine, the mobile device, and servers, as well as communications therebetween in accordance with some implementations.
Figure 6:
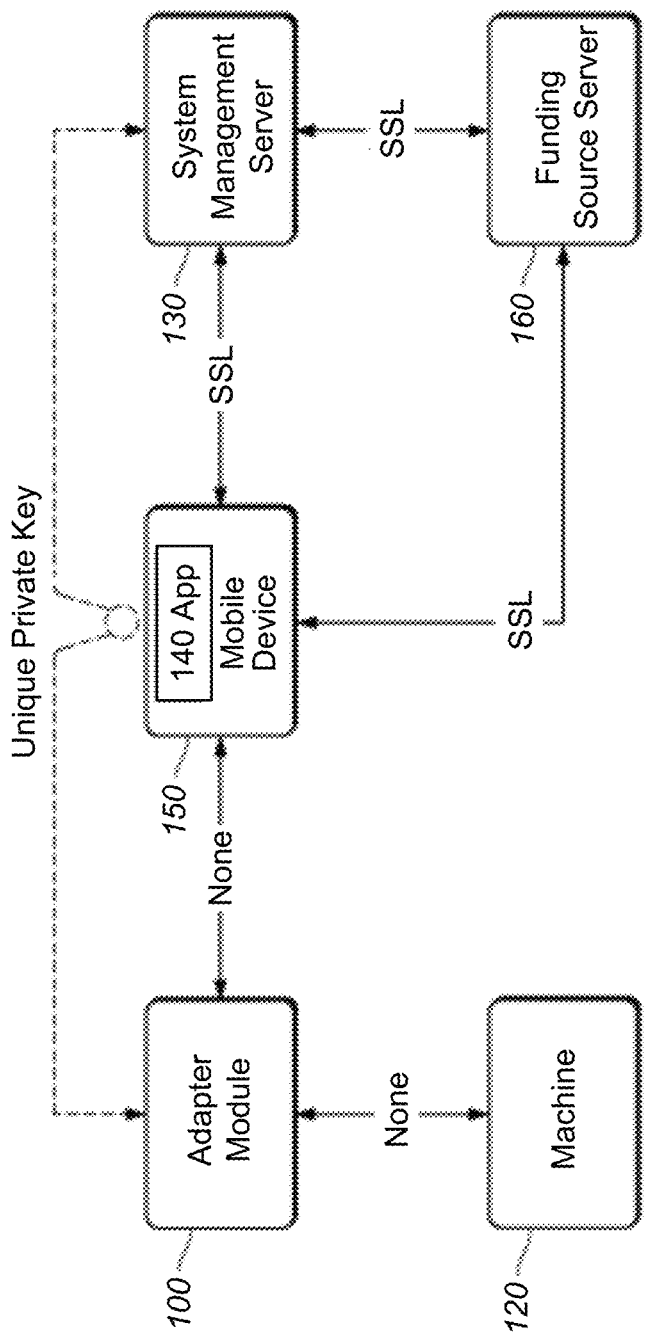
FIG. 6 is a block schematic that shows three areas of encryption used (each is bi-directional) between the adapter module, the machine, the mobile device, and/or servers in accordance with some implementations.
Figure 7:
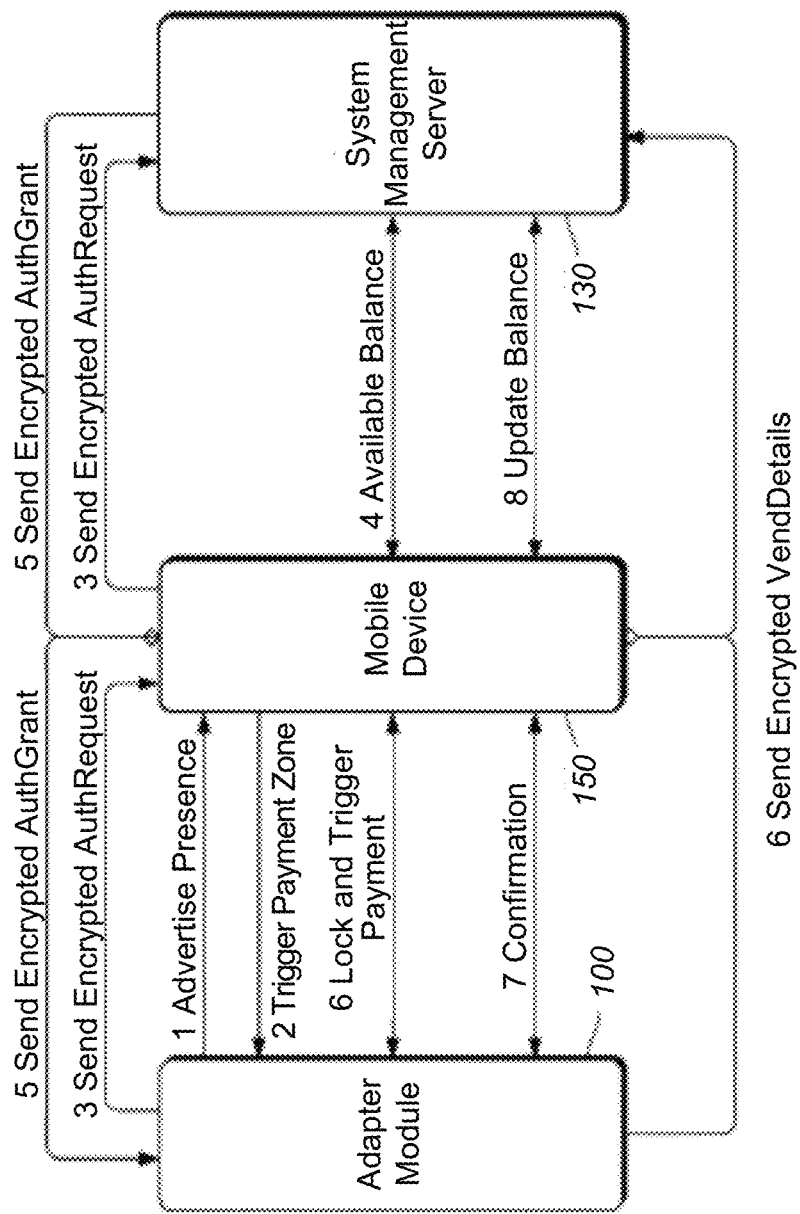
FIG. 7 is a block diagram that shows communications, messaging, vending sequence, and purchase flow between the adapter module, the mobile device, and a system management server in accordance with some implementations.

FIGS. 5, 6, and 7 together show major components of the mobile-device-to-machine payment system and the interactions there-between.

As shown, the adapter module 100 is functionally connected bi-directionally to the payment accepting unit 120 via a wired serial connection such that no security is necessary. The adapter module 100 is also functionally connected bi-directionally to the mobile device 150 (and its installed mobile application 140) via short-range communication technology (e.g., a Bluetooth connection). Because the mobile device 150 is not a "trusted" link (e.g., it could be hacked by a user), only secured communications (transmissions) are passed between the adapter module 100 and the mobile device 150. This keeps communications secured and safe from hacking. The mobile device 150 (and its installed mobile application 140) is also functionally connected bi-directionally to a system management server 130 and/or a funding source server 160 via long-range communication technology (e.g., Wi-Fi or Cellular connection) that preferably has appropriate security (e.g., SSL security). Security between the mobile device 150 and the system management server 130 has the advantage of protecting communications from the mobile device 150 to the system management server 130 that may include sensitive data and may not be encrypted. The system management server 130 and the funding source server 160 may be connected via a wired Internet connection with SSL security. The system management server 130 may be connected via a wired Internet connection with SSL security to an operators' server 170. Although not necessary to implement a purchase transaction, for other purposes (e.g., inventory), the operators' server 170 may be connected to the payment accepting unit 120 using a handheld computer sync or a cellular connection.

Also, a unique private key may be used to securely transmit encrypted messages between the adapter module 100 and the system management server 130 (although the encrypted transmissions would most likely be routed through the mobile device 150). The server 130 stores a private key for each adapter module 100, and this key is only known to the adapter module 100 and the server 130. No intermediary is privy to this key (especially not the mobile device 150). When the adapter module 100 and the server 130 communicate messages (e.g., AuthRequest and AuthGrant), the security unit 755 of the adapter module 100 encrypts the message with its private key and passes the message to the mobile device 150. The mobile device 150 (which preferably cannot decrypt the message) passes the encrypted message to the server 130. The server 130 is able to decrypt the message using the security unit 955 of the adapter module 100 and the unique private key. The security unit 955 of the server 130 uses this same unique private key to encrypt messages to the adapter module 100 and sends the message to the mobile device 150 to relay to the adapter module 100 that is able to decrypt the message using the security unit 755 of the adapter module 100 and the unique private key.

FIG. 7 shows specific communications and messaging with a vending sequence (the numbers to the left of the communications and messaging) between the adapter module 100, the mobile device 150, and the system management server 130. These communications are discussed in more detail in the discussion pertaining to the schematic flow diagrams (FIGS. 8A-8G) and the flow charts (FIGS. 9A-9E).

It should be noted that FIGS. 5, 6, and 7 are examples, and are meant to help in the understanding of the mobile-device-to-machine payment system. For example, the shown long-range communications technology may be replaced with alternative long-range communications technology known or yet to be discovered, the shown short-range communication technology may be replaced with alternative short-range communication technology known or yet to be discovered, and the shown security may be replaced with alternative security known or yet to be discovered. The shown connections are meant to be examples, and there may be intermediaries that are not shown. The shown components have been simplified in that, for example, only one mobile device 150 (or machine 120, adapter module 100, or server 130) is shown where many may be included. Finally, the order of the steps may be changed and some steps may be eliminated.

Adapter Module

FIGS. 11-18 show views of adapter module 100a (referred to generally as adapter module 100). Adapter module 100 is a relatively low cost hardware component that is pre-configured to work with the industry standard multi-drop bus (MDB). On machines without MDB technology, the adapter module 100 can be configured or designed to work with other serial protocols or activate a switch. In essence the adapter module 100 simulates establishing payment on payment accepting unit 120 in much the same manner as other alternative forms of payment (e.g., cash).

Figure 18:
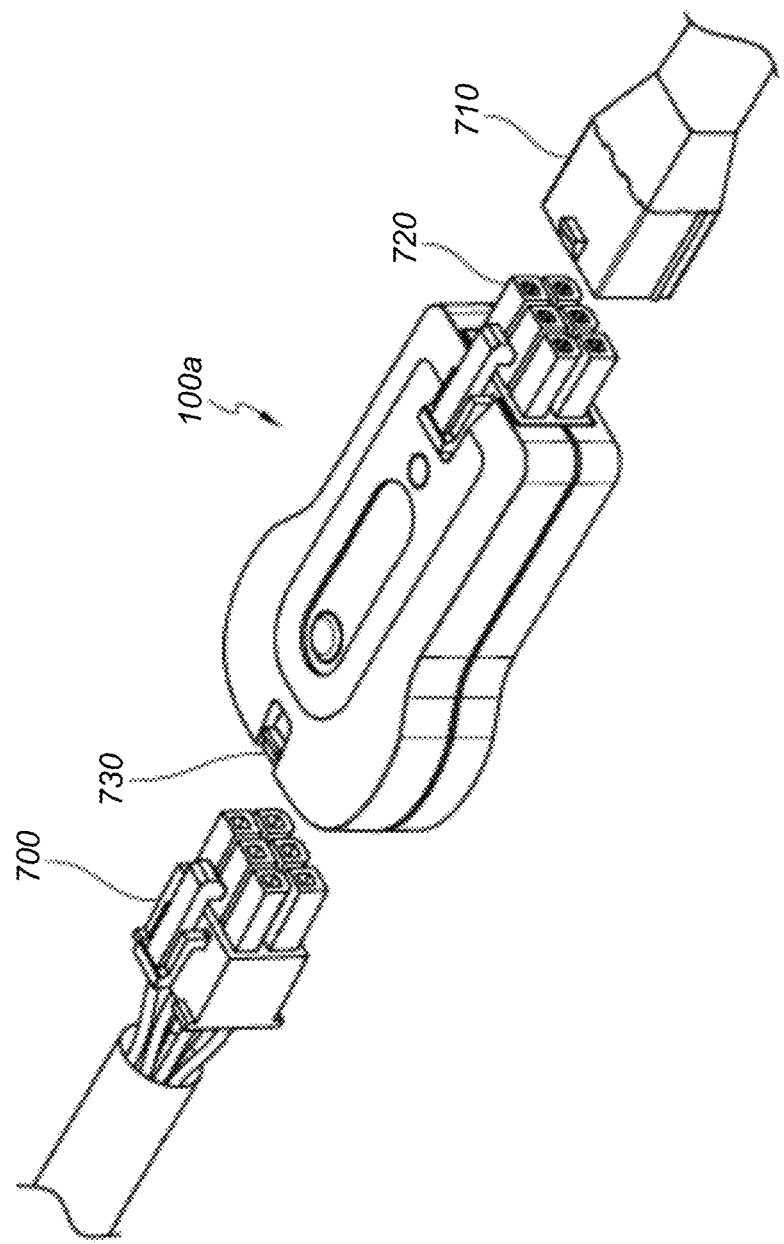
FIG. 18 is a perspective view taken from the second end of the in-line dongle adapter module of FIG. 11, the connectors and cables between which the in-line dongle adapter module is inserted being shown in broken lines for illustrative purposes in accordance with some implementations.

The shown adapter modules 100 are preferably designed to be used as an in-line dongle for in-line insertion within, for example, a MDB of a machine 120. The wire used in MDB technology uses male and female connection ends or adapters to allow the attachment of peripherals. In the case of a vending machine, the wire with the connection ends or adapters would be present to allow the attachment of a payment receiving mechanism (e.g., a coin mechanism). The MDB male and female adapters 700, 710 may be separated (as shown in FIGS. 17-18). The adapter module 100a in FIGS. 11 and 17-18 has a male adapter 720 and a female adapter 730. The adapter module 100a may be plugged (inserted) in serial ("in-line") with the wire. For example, the MDB female adapter 710 may be connected to the male adapter 720 of the adapter module 100 and the MDB male adapter 700 may be connected to the female adapter 730 of the adapter module 100. The resulting in-line configuration is shown in FIG. 19. It should be noted that the adapter modules 100 are designed to allow pass-through communications so that if the mobile-device-to-machine payment processing system is not enabled (e.g., for a particular purchase or simply turned off) the MDB functions as though the adapter module 100 is not there and the machine 120 can function normally.

Hands-Free Mode

Summarily, if it is available, a hands-free mode, from the user's perspective, would allow the user to approach a favorite payment accepting unit 120 and notice that the display (e.g., the displays 122 or 124 shown in FIG. 19) associated with the payment accepting unit 120 shows funds available (e.g., the wallet balance), he would select the product or service using input mechanisms (e.g., buttons 126 or a touch screen display 124 shown in FIG. 19) associated with the payment accepting unit 120, and he would retrieve his dispensed services or products.

During an initial handshake with the mobile device 150 (when the user is within range), the adapter module 100 reports to the mobile device 150 whether or not hands-free mode is available. If it is available, the installed mobile application 140 automatically connects to the payment accepting unit 120 without the user having to interact with the mobile device 150. The user observes that funds are available on the display 122, 124 of the payment accepting unit 120 and completes the purchase transaction as if cash was inserted in the machine 120 by inputting his selection on the payment accepting unit 120. The payment accepting unit 120 dispenses the product or service. After the selection is made, the change is returned to the mobile device 150.

Whether hands-free payment is available is determined by factors including, but not limited to whether other mobile devices 150 are in range, if other adapter modules 100 are in range, if there are any alerts, if the payment trigger threshold is having wide variances and so deemed unstable, or if the payment accepting unit operator (e.g., a vending machine operator) has opted to disable hands-free mode for the payment accepting unit 120. In the latter instance, operators can disable via a maintenance mobile device 150, as well as through the operators' server 170 and/or the system management server 130.

FIG. 3 is a table that shows considerations, conditions, or factors that may be used to determine whether the hands-free pay feature is available. Starting at the "Favorite?" column, this indicates whether the payment accepting unit 120 is a favorite machine. Preferably the hands-free pay feature is only available for use with "favorite" payment accepting units 120 (e.g., a vending machine at work or school). The "Alert" column has to do with whether there is some reason (e.g., there are too many users in range) that the hands-free pay feature should not work and, if there is such a reason, the user will be notified (alerted) and may be able to use the manual mode to resolve the alert and/or complete the transaction. FIG. 3 shows situations in which a user is or is not able to make hands-free purchases from a machine 120 using a mobile application 140 on his mobile device 150. It should be noted that the shown interface is an example. For example, some of the features could be automated or pre-selected. (It should be noted that the left hand column, the "Tab" column, relates to whether the selected tab on the mobile application 140 is "all" or "favorite." FIGS. 10A-10D all show these tabs. Unlike the other columns in FIG. 3, this column has more to do with the functionality and view of the application 140 than specifically with the hands-free feature. The tabs would allow a user to select whether he wanted to be alerted when he was in range of all payment accepting units 120 or just "favorite" payment accepting units 120 and the application 140 would show the appropriate view.)

Balance Display: An optional feature of the mobile-device-to-machine payment system that is particularly helpful in the hands-free mode (although it may be available in the manual mode and/or in a multiple-vend scenario) is when the user's mobile device 150 sends "credit" to the payment accepting unit 120 (either via hands-free payment or through a manual swipe), the wallet balance is sent to the payment accepting unit 120 that is then displayed to the user on a display 122, 124 of the machine 120. This is particularly beneficial during hands-free mode when the user does not retrieve the mobile device 150 and, therefore, may not know the balance. Also, in a multiple-vend scenario the user would not have to calculate a remaining balance.

An example of a hands-free, multiple-vend scenario where a balance is displayed by the payment accepting unit 120, follows: The user has $5.00 in his/her virtual wallet as that is the amount that has been authorized (the AuthGrant being stored on the mobile device 150). The user walks up to the payment accepting unit 120 and $5.00 is displayed on the display 122, 124 of the payment accepting unit 120 since hands-free mode was enabled and credit was sent (e.g., via the short-range communication capability) to the payment accepting unit 120. The user makes a selection of $1.50 by interacting (e.g., pressing buttons) with the machine 120. The item (product or service) is dispensed and the "change" is "returned" (e.g., via the short-range communication capability) to the virtual wallet. But since the user is still standing in the payment zone 102, the remaining wallet balance of $3.50 is sent to the payment accepting unit 120 and displayed so that the user can now see that he/she has a $3.50 balance. (It should be noted that the authorized funds may remain on the machine 120 and not be transferred back to the mobile device 150 between transactions.) The user decides to purchase a $1.50 item, and the transaction is completed as usual (e.g., by interacting with the machine 120). Now the user is still standing in the payment zone 102 and he/she sees the wallet balance of $2.00 on the display 122, 124 of the payment accepting unit 120. The user decides that he/she does not wish to purchase anything else and simply walks away. As he/she walks out of the payment zone 102, the credit is cleared from the machine 120, but he/she is left with the knowledge that his wallet balance is $2.00 even though he/she never touched the mobile device 150. Communications between the payment accepting unit 120 and the adapter module 100 (via the mobile device 150) handle the accounting incidental to the transaction. The remaining balance ($2.00) is technically stored on the server 130, and may be reflected on the application 140 on the mobile device 150.

Multiple Distinct Zones

As shown in FIGS. 1-2, the functions performed by the adapter module 100 can be divided into distinct zones: a first "communication zone" (e.g., "Bluetooth range" 106), a second "authorization zone" 104, and a third "payment zone" 102. The payment zone 102 is smaller than or equal to (overlapping completely) the authorization zone 104. Put another way, the payment zone 102 is within or coextensive with the authorization zone 104. The payment zone 102 is a subset of the authorization zone 104 with a ratio of the payment zone 102 to the authorization zone 104 ranging from 0.01:1 to 1:1. It is not necessarily a fixed ratio and can vary between different payment accepting units 120, different mobile devices 150, different users, and over time. While the zones 102, 104, 106 are depicted as having a uniform shape, the zones may not necessarily be uniform (or constant over time) in that the shape can vary. For example, the shape of the Bluetooth range 106 may vary depending on environmental conditions such as obstacles in the room and payment accepting unit 120 door/wall materials.

Bluetooth Range 106 (sometimes also herein called the "communication zone"): The outermost range is the Bluetooth range 106 (shown in FIGS. 1-2). This is the area in which the adapter module 100 is able to broadcast its presence. In most situations, the Bluetooth range 106 is a passive range in that no actual data is exchanged between the mobile device 150 and the adapter module 100. While in the Bluetooth range 106, the mobile device 150 monitors the RSSI (Received Signal Strength Indicator).

Authorization Zone 104: The middle region is the authorization zone 104 (shown in FIGS. 1-2). This is a computed area based on the RSSI. As mentioned, the mobile device 150 monitors the RSSI while it is in the Bluetooth range 106. When the RSSI reaches a certain predetermined threshold based on In-Range Heuristics, the mobile device 150 can be considered to be in the authorization zone 104. In the authorization zone 104 the mobile device 150 establishes a connection to the adapter module 100 (e.g., a Bluetooth connection (FIG. 5) with SSL protection (FIG. 6)) and informs the adapter module 100 of its presence. After a successful handshake with the adapter module 100, the mobile device 150 registers the adapter module 100 and the adapter module 100 requests an authorization to the server 130 via the mobile devices' network connection (e.g., a Wi-Fi or cellular connection (FIG. 5) with SSL protection (FIG. 6)). It is important to note the mobile device 150 and the adapter module 100 have a non-exclusive relationship at this point. The adapter module 100 may collect registrations for all mobile devices 150 that are within the authorization zone 104.

An authorization occurs in preparation for when the user enters the payment zone 102 (shown in FIGS. 1-2). An authorization expires in a set period of time (for example, five minutes), so if the mobile device 150 is still in the authorization zone 104 at the time of expiration, the adapter module 100 submits for and receives another authorization. This will continue for a set number of times (for example, the limit may be three times to limit cases of numerous authorizations for a mobile device that may remain in the authorization zone 104 for an extended period of time without completing a transaction). Should authorization fail (for instance if the limit had been reached) prior to the user entering the payment zone 102, the adapter module 100 will request authorization when the mobile device 150 enters the payment zone 102 (which adds a few seconds to the experience).

Payment Zone 102: As a user enters the payment zone 102, the mobile device 150 establishes exclusive control of the adapter module 100. Once established, any other user in the payment zone 102 is put into a "waiting" status.

In the payment zone 102, the payment can be triggered automatically if the payment processing system has and is in hands-free mode. In such instances, the mobile device 150 is running the application 140 in background mode and will send credit to the payment accepting unit 120 without any explicit user interaction. The user completes the transaction on the payment accepting unit 120 in much the same manner as if cash had been inserted into the payment accepting unit 120 to establish credit. After the user completes the transaction (that may include one or more purchases), details of the transaction are preferably returned to the mobile device 150 and server 130 in separate messages. The message to the server 130 is preferably encrypted with the adapter module's 100 private key (FIG. 6) to ensure data integrity. As shown in FIG. 7, the "private key" coded message (Encrypted VendDetails) is preferably sent via the mobile device 150. The message to the mobile device 150 may be sent solely for the purpose of closing the transaction. The transaction history and balance are updated server-side via the encrypted message sent to the server 130.

The other mode of operation is manual mode. In manual mode, the user launches the mobile device 150 and is able to swipe to send payment to the payment accepting unit 120. The user can also swipe back to cancel the payment. Like in hands-free mode, the purchase transaction is completed on the payment accepting unit 120 in the same manner as if cash were inserted into the payment accepting unit 120. The mobile device 150 is only used to send payment. Selection is made directly on the payment accepting unit 120.

Self-Calibrating Zone Threshold: A key, but optional feature, of the payment processing system is a self-calibrating payment zone RSSI threshold. Because RSSI can vary machine to machine, environment to environment, and device to device, having a fixed threshold at which payment is triggered can be problematic. The approach suggested herein is the creation of a self-calibrating threshold. When the user is interacting with the payment accepting unit 120 (such as when he makes his selection on the payment accepting unit 120), the payment accepting unit 120 notifies the adapter module 100 and the adapter module 100 logs the conditions such as RSSI, type of user mobile device 150, accelerometer data, and other information. It is at this point that it can be ascertained safely that the user is within arm's-length from the payment accepting unit 120 (by necessity the user is arm's-length because he is making some physical interaction with the payment accepting unit 120). This is the only point in the entire transaction in which it can be certain that the user is within arm's-length from the payment accepting unit 120.

FIG. 4 shows a simplified set of steps involved when users enter the payment zone 102. Specifically, FIG. 4 shows that credit is established 200 (this may have been done in the authorization zone 104, but if not it would be handled in the payment zone 102), that the user makes a selection using the machine 202, that the machine notifies the adapter module of the selection 204, that the adapter module (optionally) logs the RSSI 206, and that the purchase process(es) continues 208. Using the historically logged RSSI data, the adapter module 100 calculates one of several "average" RSSI using various mathematical models. This "average" could be a traditional average, a moving average, a weighted average, a median, or other similar summary function. The adapter module 100 could pre-process the historical data before running the function, such as to eliminate top and bottom data points, suspect data points, etc.

Optionally, during the handshake between the mobile device 150 and the adapter module 100, the information transmitted to the adapter module 100 may include, for example, the model of the mobile device 150. Using the received information pertaining to the mobile device models, the adapter module 100 can create multiple payment thresholds, one for each mobile device model. This allows for variances that may be inherent in different types of Bluetooth radios. An alternative to this method is for the adapter module 100 to broadcast a baseline payment zone threshold, and the mobile device 150 can use an offset from this baseline based on its specific model type. The payment zone thresholds (or baseline offsets) can be unique to specific types of mobile devices (e.g., by manufacturer, operating system, or component parts), models of mobile devices, or individual mobile devices (unique to each user).

In a typical scenario in which the payment zone threshold has been calibrated, the adapter module 100 advertises its presence along with the threshold at which it considers any mobile device 150 to be in the authorization zone 104. This is a one-way communication from adapter module 100 to mobile device 150. Once the mobile device 150 enters the authorization zone 104, there is a handshake that is established between the adapter module 100 and the mobile device 150. During this handshake, the mobile device 150 can share its model information with the adapter module 100, and the adapter module 100 can return the payment zone 102 threshold for that specific model.

Optionally, in addition to calibrating the payment zone threshold, the adapter module 100 can apply the self-calibrating model to the authorization zone 104 to calibrate the authorization zone threshold. As with the payment zone thresholds, the authorization zone thresholds can be unique to specific types of mobile devices, models of mobile devices, or individual mobile devices. In this scenario, the adapter module 100 would broadcast multiple thresholds by device type and the mobile device 150 would determine which threshold to apply (or alternatively broadcast a baseline and the mobile device 150 uses an offset based on its device model). Even in this scenario, the authorization zone 104 is a one-way communication.

Optionally, along with the threshold that is calculated (in the payment and/or the authorization zone(s)), a safety margin can be added to minimize scenarios in which a user is within range, but the mobile-device-to-machine payment processing system does not recognize it because the threshold may not have been reached. For example, if the calculated RSSI for an iPhone™ 5 on machine 4567 is −68 db, the mobile-device-to-machine payment processing system may add a safety margin of −5 db, and establish the threshold at −73 db. So when a user's phone is communicating with the adapter module 100 at an RSSI of −73 db or better, the mobile-device-to-machine payment processing system will allow the mobile device 150 to credit the payment accepting unit 120. The safety margin can be set on the server 130 and downloaded to the adapter module 100, or set on the mobile device 150, or set on the adapter module 100 itself.

Optionally, in the payment zone threshold, the mobile device 150 can use other data to determine when to cancel the exclusive control of the payment accepting unit 120, to identify when the user is moving out of the payment zone 102. External data could include accelerometer data from the mobile device 150. Using that data, the mobile device 150 can determine whether the user is standing relatively still in front of the payment accepting unit 120, or if the user is in motion—effectively walking away from the payment accepting unit 120.

Signal Availability Adaptation

The mobile-device-to-machine payment processing system described herein uses a mobile device's 150 short-range communication technology (e.g., Bluetooth mechanisms) (shown as short-range communication capability 876 in FIG. 21) and a mobile device's 150 long-range communications technology (e.g., cellular and/or Wi-Fi mechanisms) (shown as long-range communication capability 872 in FIG. 21). The short-range communication capability 876 communicates with the adapter module's 100 short-range communication technology (e.g., Bluetooth mechanisms) (shown as short-range communication capability 776 in FIG. 20). The long-range communication capability 872 communicates with the server's 130 long-range communications technology (e.g., cellular and/or Wi-Fi mechanisms) (shown as long-range communication capability 972 in FIG. 22). The mobile device 150 (with a mobile application 140 thereon) acts as a communication bridge between the adapter module 100 (associated with a payment accepting unit 120) and the server 130. This process is described herein and works properly if there is cellular or Wi-Fi coverage within the payment zone 102.

One option if there is no cellular or Wi-Fi coverage within the payment zone 102 is to determine whether there is cellular or Wi-Fi coverage within the authorization zone 104 or the Bluetooth range 106. If there is, then the sizes of the zones 102, 104, 106 could be adapted and the timing could be adapted. For example, if the mobile devices 150 detected problems with the cellular or Wi-Fi coverage within the payment zone 102, the user could carry his mobile device 150 into the other zones (or the mobile device 150 could use short-range communication technology to communicate with other mobile devices 150 within the authorization zone 104 or the Bluetooth range 106) to determine whether the zones have cellular or Wi-Fi coverage. If they do have coverage, communication between the mobile device 150 and the server 130 can be advanced (conducted earlier when the mobile device 150 is further from the machine 120) or delayed (conducted later when the mobile device 150 is further from the machine 120). This can be thought of as changing the size or shapes of the zones 102, 104, 106. The timing would also have to be adjusted so that the authorization of funds (AuthGrant) does not expire before the user has a chance to make a purchase. It also means that balance updates to the server 130 may happen after the user has moved away from the machine 120 and has cellular or Wi-Fi coverage again.

Another option if there is no cellular or Wi-Fi coverage within any of the zones 102, 104, 106 is for the user to obtain authorization while outside of the zones in a place with cellular or Wi-Fi coverage. This may occur, for example, if a user knows that he will be going to a place with a payment accepting unit 120 equipped with an adapter module 100 (perhaps to a favorite payment accepting unit 120) that does not have (or rarely has) cellular or Wi-Fi coverage. A user may also use the mobile application 140 to query payment accepting units 120 in a given range (e.g., within 50 miles) or at a given location (e.g., at a campground or in a particular remote city) to determine whether there is cellular or Wi-Fi coverage within the zones 102, 104, 106. The user can then obtain pre-authorization from the server 130 using the mobile application 140. Again, the timing would also have to be adjusted so that the authorization of funds (AuthGrant) does not expire before the user has a chance to make a purchase. It also means that balance updates to the server 130 may happen after the user has moved away from the machine 120 and has cellular or Wi-Fi coverage again. A mobile-device-to-machine payment system having the ability to implement this option would be able to accept cashless payments without requiring any network connection near the payment accepting unit 120. In some implementations, the mobile-device-to-machine payment processing systems described herein is located in a remote location where no signal is available, but can still accept cashless payments.

As an example of a situation in which there might be no cellular or Wi-Fi coverage within any of the zones 102, 104, 106 of a particular payment accepting unit 120, the user (a teenager) may be traveling to a remote location to attend summer camp where there is no cellular or Wi-Fi coverage. The camp may have several payment accepting units 120 (e.g., a machine that creates a dedicated "hot spot" that requires payment for use, vending machines, or machines for renting equipment such as bikes, kayaks, or basketballs). The camp facility might notify parents that the mobile-device-to-machine payment system is available. The parents, while at home, could obtain authorization for a particular amount (that could be doled out a certain amount per day or limited to type of machine or location) to be authorized and "loaded" into the user's mobile device 150 and specify that the authorization will not expire for a certain period or until a certain date. Thereafter, while at camp, the user could use the mobile application 140 on his mobile device 150 in a manner similar to those discussed elsewhere herein. Short-range communications may be used for communications between the adapter modules 100 (associated with the machines 120) and users' mobile devices 150.

One subtle but powerful component of the payment processing system described herein is that it requires a long-range communication capability (e.g., an Internet or cellular network connection) only in the authorization zone 104 and only for the time period required to send the AuthRequest and receive the AuthGrant. Once a valid AuthGrant is received by the mobile device 150, the long-range communication capability (e.g., an Internet or cellular network connection) is not required by either the mobile device 150 or the adapter module 100 in the payment zone 102 as long as the AuthGrant is valid (unexpired). This mechanism allows the system to seamlessly handle authenticated transactions in (temporary) offline mode, with the deferred acknowledgement and transaction messages performing the bookkeeping and cleanup when network connection is regained. The alternatives described above provide a unique way to artificially extend the authorization zone to include any location where the mobile device 150 can communicate with the server 130.

Multiple User Resolution

As shown in FIG. 2, in one practical scenario, multiple users are in the zones 102, 104, 106. As shown in FIG. 2, users 1, 2, and 3 are in the payment zone 102 near the machine 120; users 5 and 6 are shown as positioned between the authorization zone 104 and the Bluetooth range 106; users 4 and 7 are in the Bluetooth range 106, user 10 is positioned on the edge of the Bluetooth range 106; and users 8 and 9 are positioned outside of Bluetooth range 106. In some implementations, the mobile-device-to-machine payment processing system manages and resolves issues pertaining to multiple users.

Users 4 and 7 are within the Bluetooth range 106 and the user 10 is either entering or leaving the Bluetooth range 106. Within the Bluetooth range 106 the users' mobile devices 150 are able to see the adapter module's 100 advertisement. In this zone, the mobile device 150 preferably does not initiate a connection. The adapter module 100 is preferably unaware of the users in the Bluetooth range 106. All the adapter module 100 is doing is advertising its presence to any multitude of users that may be in Bluetooth range 106.

The adapter module 100 begins to log users as the users (and their respective mobile devices 150) enter the authorization zone 104 (shown in FIG. 2 as users 5 and 6). At this point, there is a non-exclusive connection initiated by the mobile device 150 to the adapter module 100. It does a handshake (e.g., to exchange information needed to obtain authorization and, optionally, to log information needed for a self-calibrating authorization zone threshold) and the mobile device 150 contacts the server 130 for an authorization (e.g., sending an AuthRequest and receiving an AuthGrant). The adapter module 100 registers all mobile devices 150 that have requested and received AuthGrants. The adapter module 100 continues communicating with any other mobile device 150 that enters the authorization zone 104. After initial contact, the adapter module 100 may provide the mobile device 150 with a deferral delay of when to check back in with the adapter module 100 allowing opportunity for other mobile devices 150 to communicate with the adapter module 100.

If there is only one user in the payment zone 102, a purchase transaction may be performed. If there are multiple users in the payment zone 102, the mobile-device-to-machine payment system must handle the situation.

One optional solution for handling the situation of the multiple users in the payment zone 102 is queuing users in the payment zone 102. Once any mobile device 150 enters the payment zone 102, it establishes exclusivity to a particular mobile device 150 (e.g., in a first-come-first-serve manner). Technically, however, the adapter module 100 is not establishing an exclusive connection to the mobile device 150. The adapter module 100 can still perform a round-robin poll and communicate with and advertise to other mobile devices 150. Instead, the adapter module 100 establishes a queue prioritized by RSSI and time (e.g., who was first and whether the authorization has expired) and it notifies (e.g., alerts) other mobile devices 150 to wait. The earliest valid (unexpired) authorization takes precedence when there is any tie in the RSSI. Otherwise, for example, the strongest average RSSI takes priority. Preferably the queue is not a static measure of the RSSI but an averaged measure over the period of time in the queue. This compensates for a scenario in which a user may be walking around in the queue and then shows up at the payment accepting unit 120 just as the previous user is finishing. If another user was also in the payment zone 102 and stood there the entire time, but may have newer authorization, he could win out.

Anytime that the adapter module 100 cannot determine exactly which user is in the payment zone 102 in front of the payment accepting unit 120, the adapter module 100 will disable hands-free payment. The mobile device 150 will send an alert to the user and he can use swipe to pay (manual mode). All users in payment zone 102 will show "Connected" and the first to swipe payment to the payment accepting unit 120 then locks out other users.

Multiple Module Resolution

In the scenario where there are multiple modules present, determining which payment accepting unit 120 a user is in front of can be a challenge. In some implementations, the mobile-device-to-machine payment processing system described herein allows adapter modules 100 to communicate to other adapter modules 100 in range via Bluetooth. Each user receives authorization grants for specific payment accepting units 120. This means if there are multiple adapter modules 100 within the same authorization zone 104, there will be multiple authorization grants for the user. When the user enters the payment zone 102, it can be difficult to differentiate which payment accepting unit 120 the user is in front of if the payment zones 102 overlap.

To solve this problem, when the user enters the payment zone 102, the adapter modules 100 communicate with each other to determine the RSSI for the particular user (based on the signal from his mobile device 150) to triangulate which adapter module 100 (and the associated payment accepting unit 120) is closer to the user. Optionally, the inter-module communications can restrict the user to establishing an exclusive connection with only one payment accepting unit 120.

Optionally, when the user connects to a payment accepting unit 120, the mobile device 150 can send a communication to the payment accepting unit 120 for momentary display to the user on the display 122, 124 of the payment accepting unit 120. For example, the mobile device 150 can send a communication (e.g., "connected" or "Fred's Mobile Device Connected") to the payment accepting unit's display 122, 124 for a predetermined period of time (e.g., 1-3 seconds) so when the user is in payment zone 102, it is clear which payment accepting unit 120 the user is connected to prior to making a purchase (either in hands-free or manual mode).

In addition, when the user is in manual mode, the mobile device 150 can display (e.g., on the touch screen 152 as shown in FIGS. 10A-10D) a visual indication of the payment accepting unit 120 (e.g., a picture and/or a payment accepting unit ID of the payment accepting unit 120) for visual confirmation. If the user is in manual mode, the user can manually change the payment accepting unit 120.

Descriptive Scenario

FIG. 7, FIGS. 8A-8G, and 9A-9E (as well as other figures) can be used to understand a detailed scenario of the mobile-device-to-machine payment processing system described herein. A flow of communications and steps are loosely described below with reference to these (and other figures). It should be noted that alternative scenarios could include, for example, a modified order of the steps performed.

Prior to vending transactions, a user downloads a mobile application 140 onto his mobile device 150, creates an account, and configures a funding source via, for example, a funding source server 160. A funding source may be, for example, a debit card, a credit card, campus cards, rewards points, bank accounts, payment services (e.g., PayPal™) or other payment option or combination of payment options known or yet to be discovered. The funding sources may be traditional and/or nontraditional payment sources that are integrated into the ecosystem described herein and then used indirectly as a source of funds. Funds from the funding source are preferably held on the server 130 such that when an AuthRequest is received by the server 130, the server 130 can send an AuthGrant authorizing funds for a purchase.

The user can specify one or more "favorite" adapter module(s) 100 (that has a one-to-one relationship to the payment accepting unit 120) that he may visit regularly, such as a vending machine at school or work. Favorite adapter modules 100 appear on a pre-filtered list and allow for additional rich features such as hands-free payment.

Figure 8A:
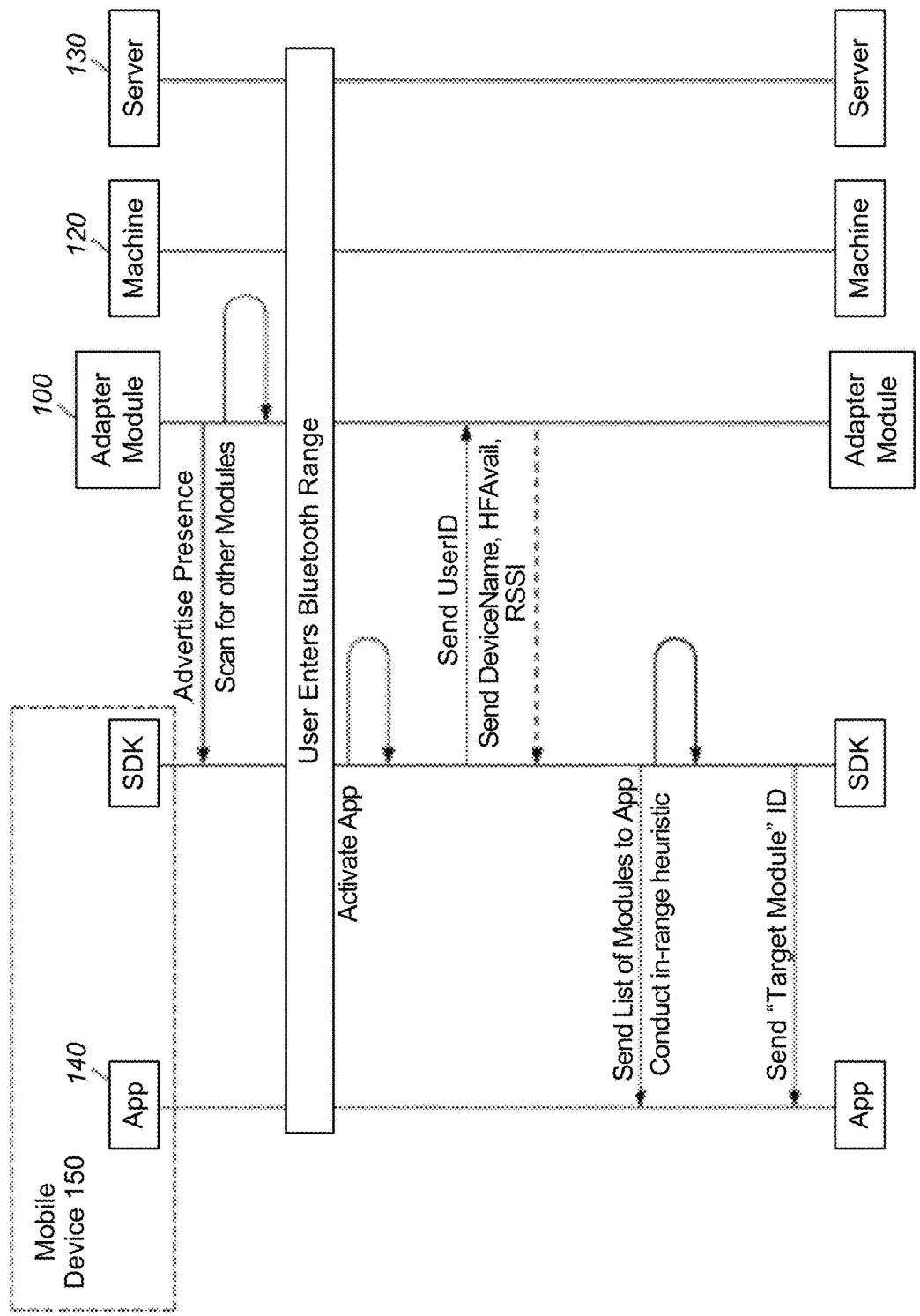
FIG. 8A is a schematic process flow diagram that shows additional elements and features of the payment processing system (e.g., communications, messaging, vending sequence, and purchase flow) when the user enters the "communication zone" (e.g., Bluetooth range) in accordance with some implementations.

The payment accepting unit 120 may be equipped with an adapter module 100 that is constantly advertising its availability via Bluetooth (or other "signals," "communications," and/or "transmissions"). This ongoing advertising and scanning for adapter modules is shown in FIG. 8A. As shown, the mobile device 150 is continuously scanning for any adapter module 100 within Bluetooth (or other "signal," "communication," and/or "transmission") range. When the user is within range of that adapter module 100, the mobile device 150 tracks and monitors the signal strength until a predetermined "authorization zone" threshold is achieved.

Figure 8B:
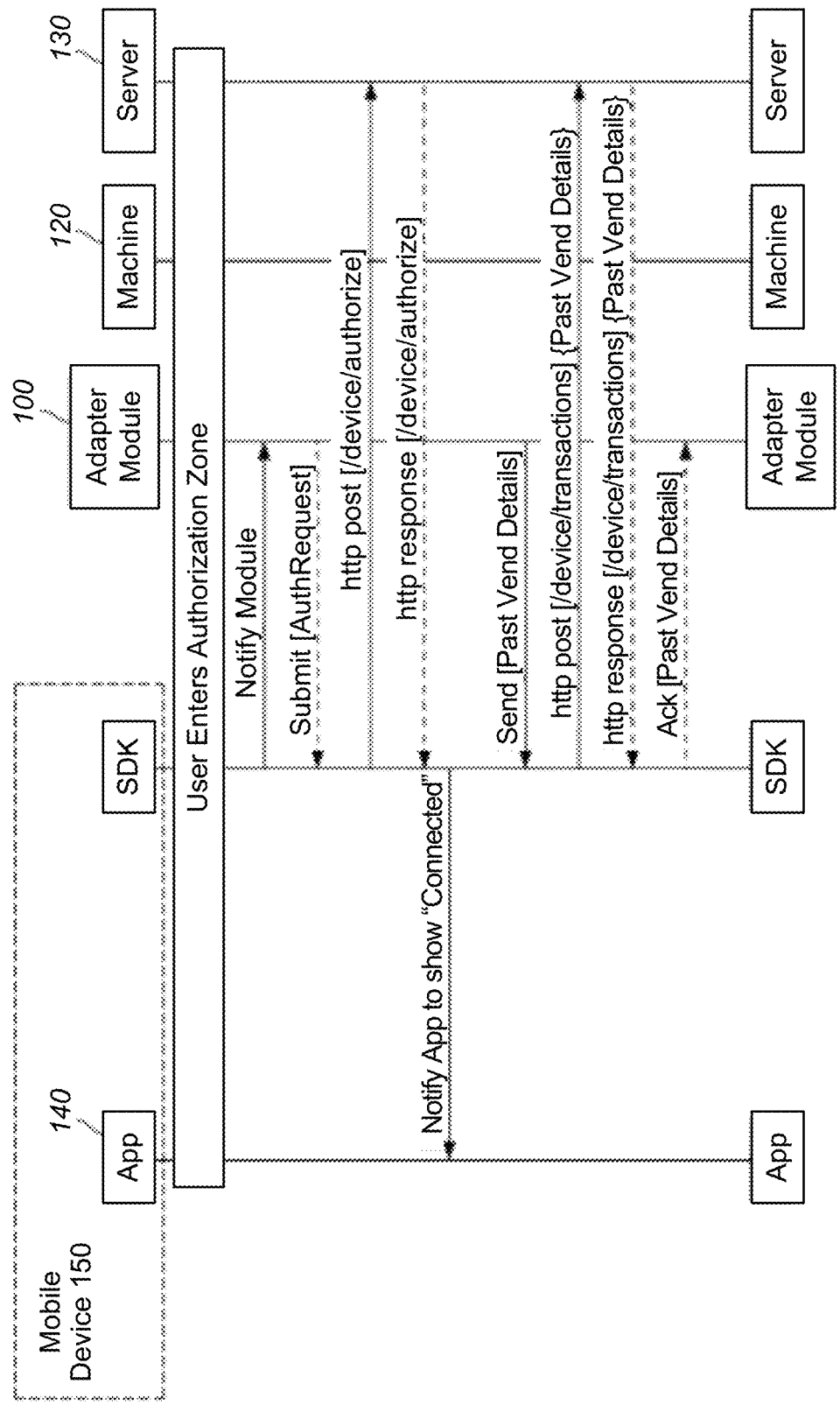
FIG. 8B is a schematic process flow diagram that shows additional elements and features of the payment processing system (e.g., communications, messaging, vending sequence, and purchase flow) when the user enters the "authorization zone" in accordance with some implementations.
Figure 9A:
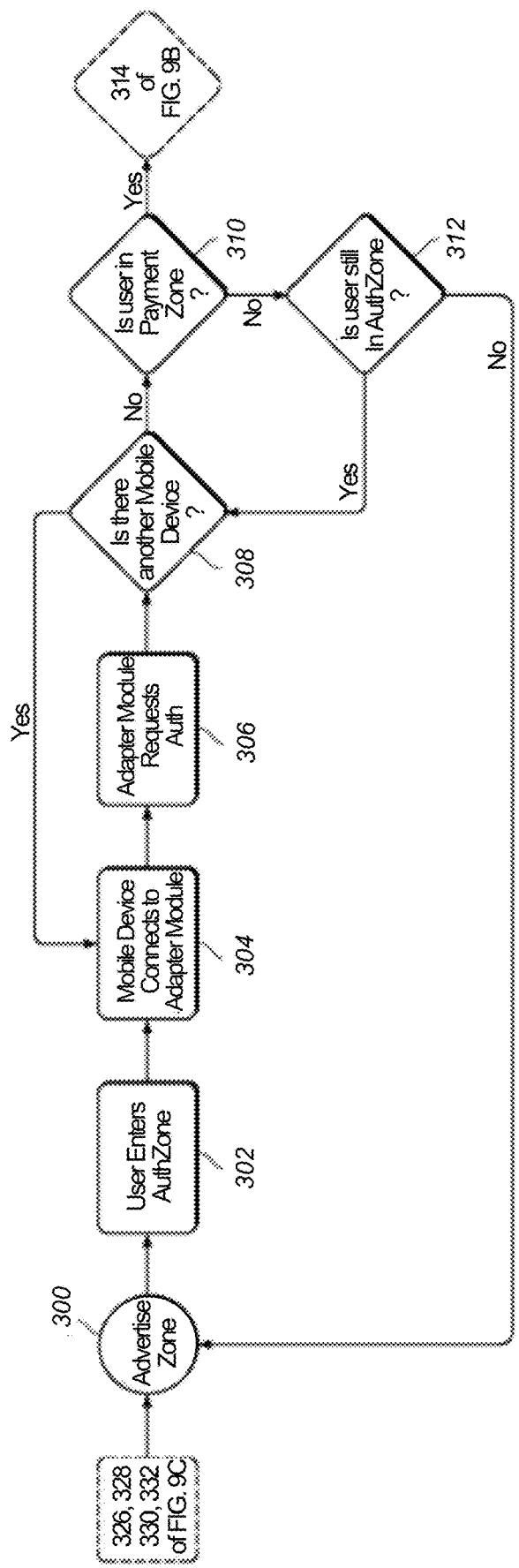
FIGS. 9A-9E are flow charts that show example steps and features of the payment processing system (e.g., communications, messaging, vending sequence, and purchase flow) in accordance with some implementations.

FIGS. 8B and 9A generally show that when the authorization zone threshold is reached, the mobile device 150 enters the authorization zone (block 302) and registers the adapter module 100. The mobile device 150 connects to the server 130 (block 304). The application 140 on the mobile device 150 creates a request for authorization (AuthRequest) and passes the AuthRequest to the server 130 using appropriate communication technology (e.g., GSM, CDMA, Wi-Fi, or the like) (block 306). The server 130 responds with an authorization grant (AuthGrant) encrypted with the specific adapter module's private key (block 306). This authorization token may minimally include the User identifier (ID), Apparatus ID (for the adapter module 100), authorization amount, and expiration time. The mobile device 150 receives the AuthGrant from the server 130, and retains it until the mobile device 150 is ready to issue payment to an adapter module 100. The mobile device 150 collects all pending AuthGrants that may be one or more depending on how many adapter modules 100 are in-range. Unused AuthGrants that expire are purged from the mobile device 150 and the server 130. It is important to note that the mobile device 150 is unable to read the AuthGrant because it is encrypted with the adapter module's unique private key that is only known to server 130 and adapter module 100. This provides a preferred key element of security in the system as the adapter module 100 only trusts AuthGrants that are issued by the server 130, and the AuthGrants cannot be read or modified by the mobile device 150 or any other party in between the server and the adapter module 100. Additional mobile devices 150 may enter the authorization zone 104 (block 308).

As the user approaches a specific adapter module 100, the user enters the payment zone 102 and an event threshold is triggered based on heuristics performed by the mobile device 150. Blocks 310 and 312 show the loop steps of waiting for a mobile device 150 from the authorization zone 104 to enter the payment zone 102. If the user leaves the authorization zone 104 without entering the payment zone 102, the adapter module 100 returns to advertising its presence (block 300).

Figure 8C:
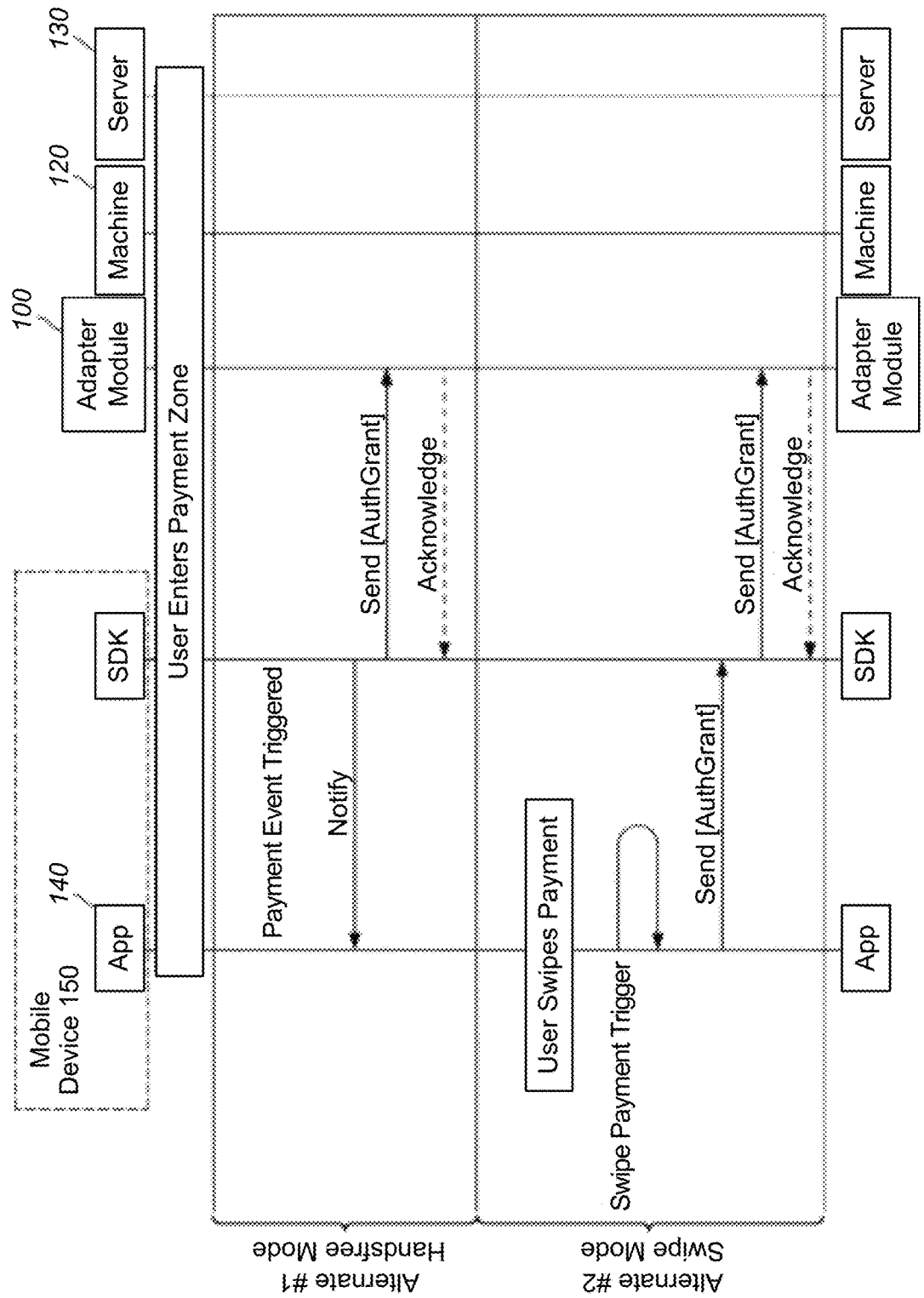
FIG. 8C is a schematic process flow diagram that shows additional elements and features of the payment processing system (e.g., communications, messaging, vending sequence, and purchase flow) when the user enters the "payment zone" and, in particular, detailing a hands-free mode embodiment and a swipe mode embodiment in accordance with some implementations.
Figure 9B:
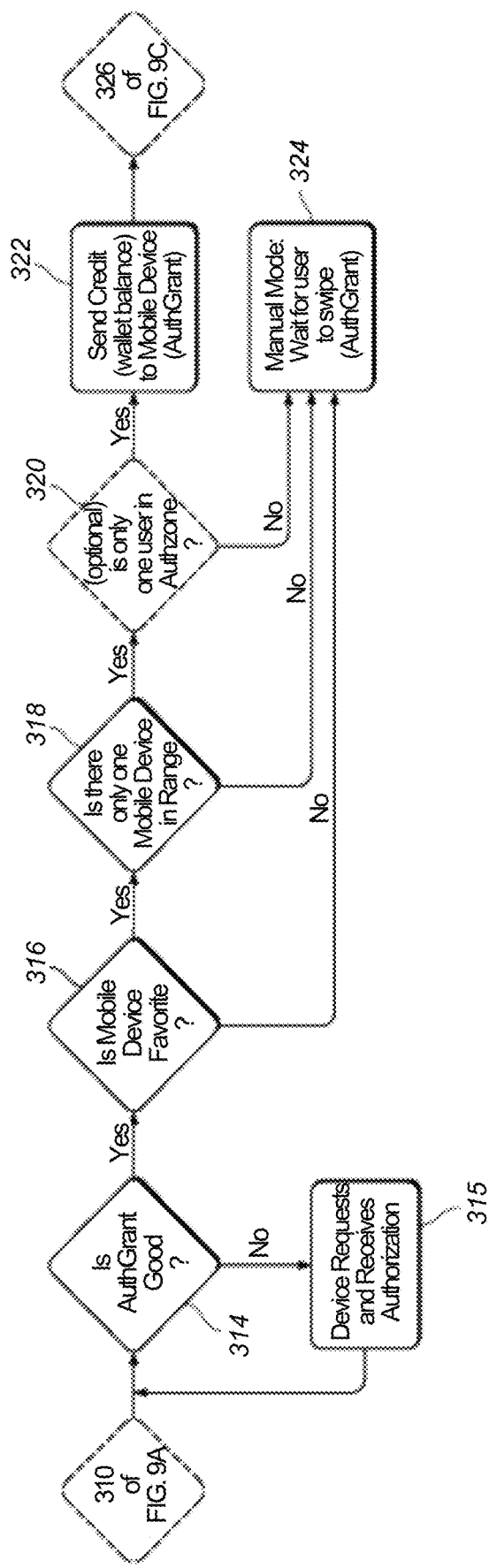

FIGS. 8C and 9B generally show the user entering the payment zone. The mobile device 150 verifies that it has an unexpired and valid AuthGrant. If the AuthGrant is not good, it may be requested again, repeating the Authorization Request process (block 315). If the AuthGrant is good, the mobile device 150 sends the valid AuthGrant (including the wallet balance (block 322)) to the adapter module 100 to initiate a transaction. The mobile device 150 may issue the AuthGrant automatically without specific user interaction if the hands-free mode is supported (and the device is a favorite (block 318), there is only one device in the payment zone 102 (block 318), and (optionally) there is only one user in the authorization zone 104 (block 320)). If any of these factors are not present, the mobile device 150 will prompt and/or wait for the user to begin the transaction manually (block 324).

Figure 8D:
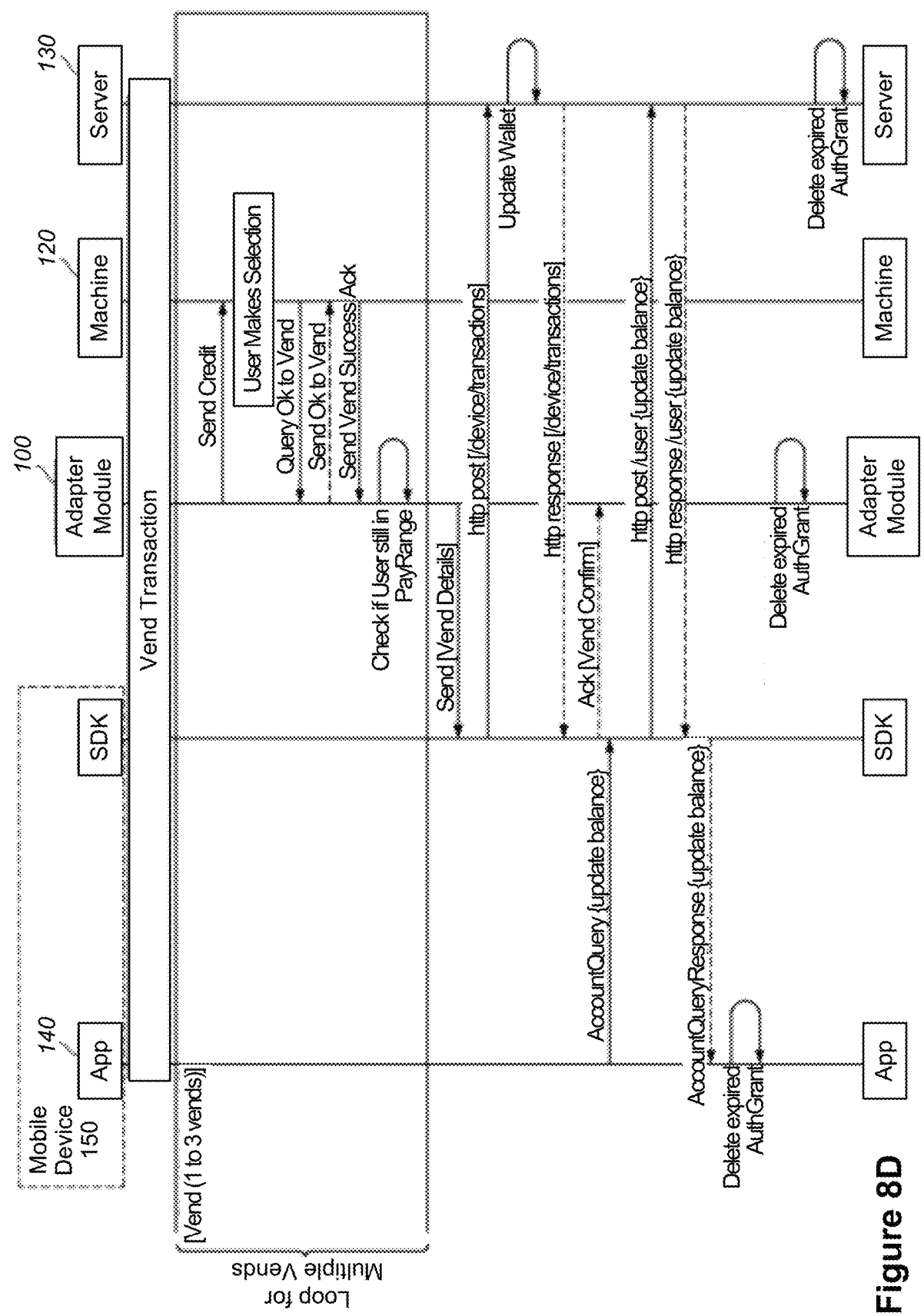
FIG. 8D is a schematic process flow diagram that shows additional elements and features of the payment processing system (e.g., communications, messaging, vending sequence, and purchase flow) in a vending transaction including a loop for multiple transactions in accordance with some implementations.
Figure 9C:
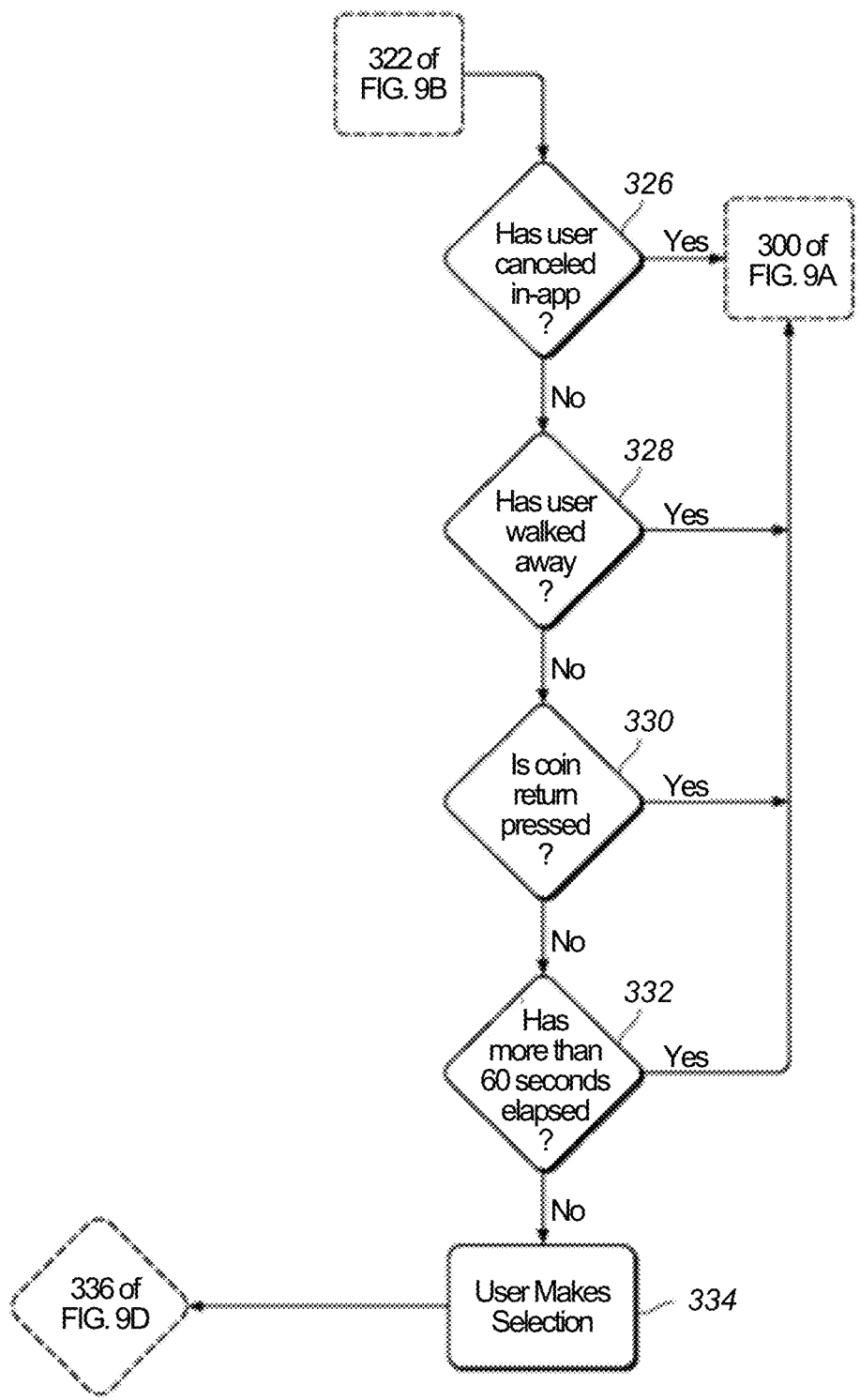
Figure 9D:
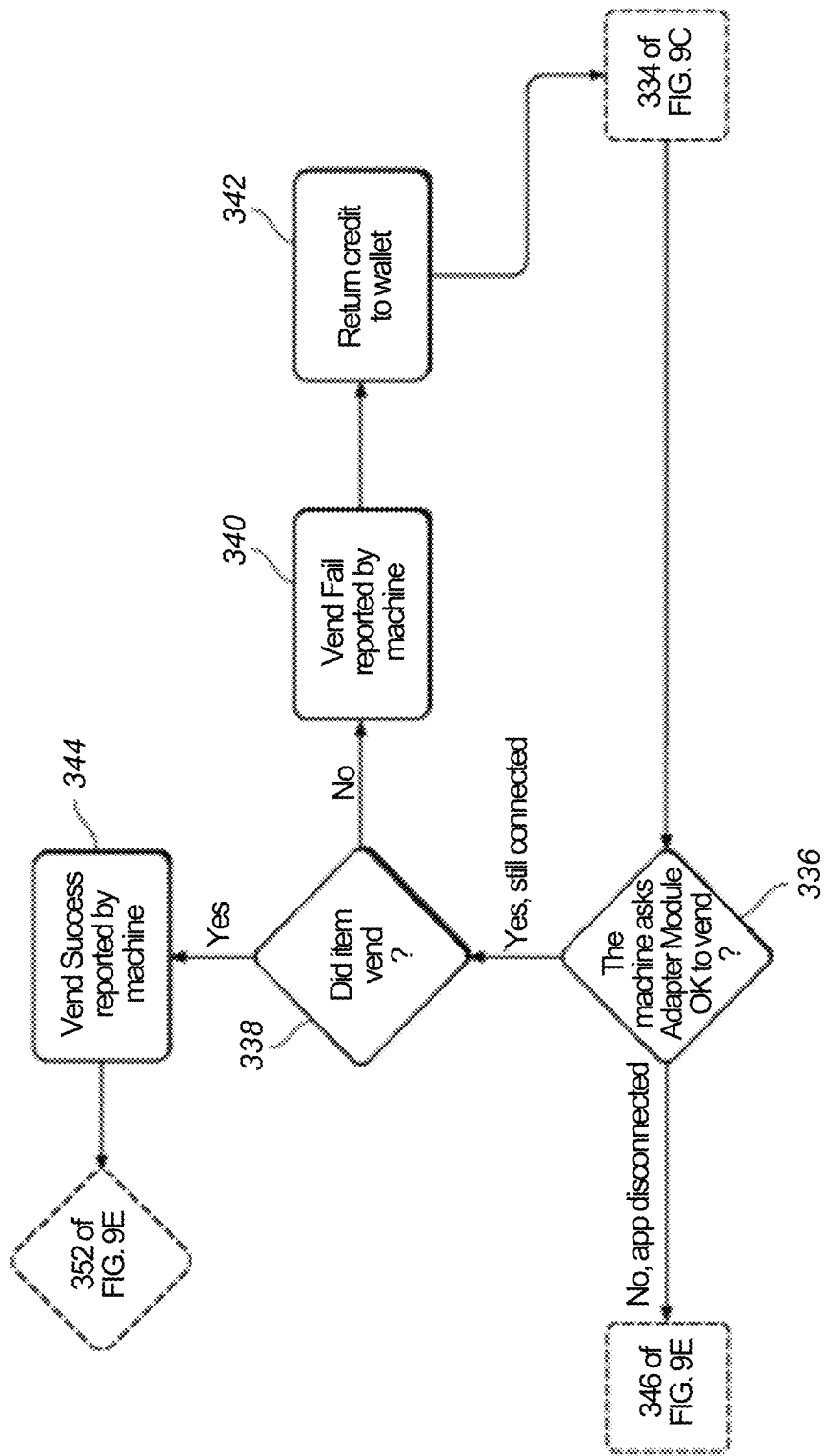

FIGS. 8D, 9C, and 9D generally show the transaction process. As shown in FIG. 9C, the adapter module 100 runs through a series of questions to determine if there are any issues that would prevent vending including: has the user canceled in-app? (block 326), has the user walked away? (block 328), is the coin return pressed? (block 330), has more than a predetermined period of time elapsed? (block 332). If the answer to any of these questions is "yes," the transaction does not proceed. If the answers to all of these questions is "no," the user makes a selection (block 334) on the payment accepting unit 120 in the same or similar manner as compared to if cash or credit were presented to the payment accepting unit 120. If the machine 120 is able to vend (block 336), it attempts to release the product. If the vend fails (block 338) it is reported by the machine (block 340) and a credit is returned to the virtual wallet (block 342). If the vend is successful (block 338) it is reported by the machine (block 344). Put another way, after the transaction is complete, the adapter module 100 returns to the mobile device 150 the details of the transaction as well as an encrypted packet containing the vend details to be sent to the server 130 via the mobile device 150. Optionally, the adapter module 100 can pass additional information not directly related to the transaction such as payment accepting unit health, sales data, error codes, etc.

Figure 9E:
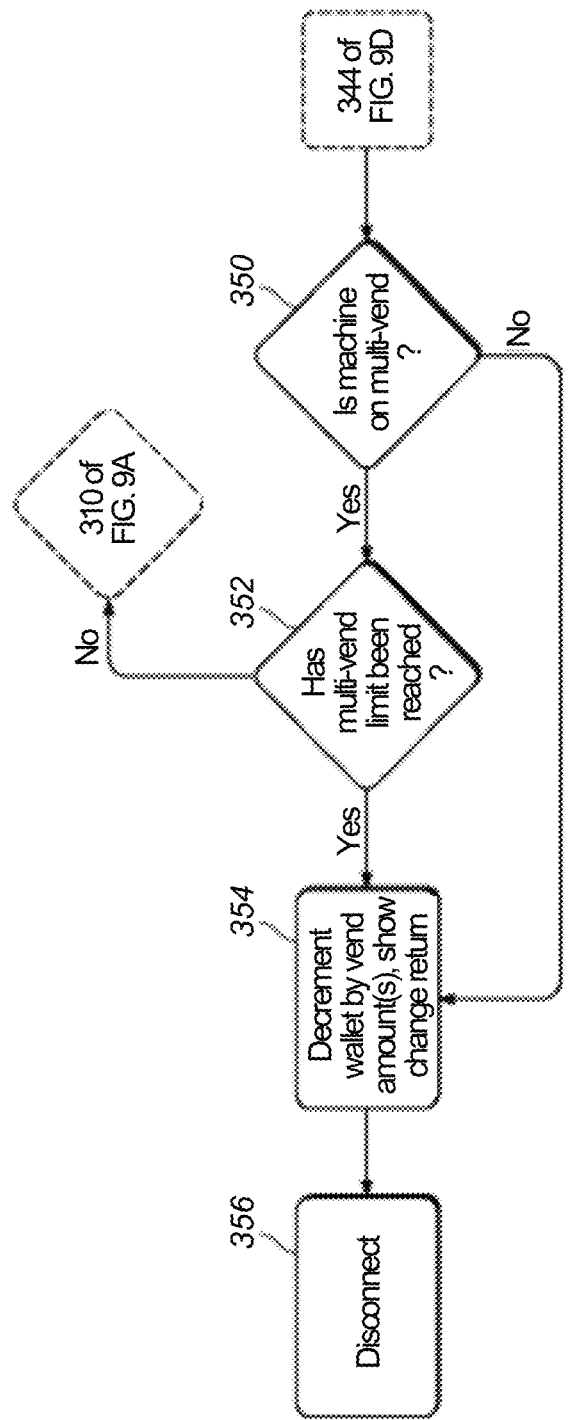
Figure 10A:
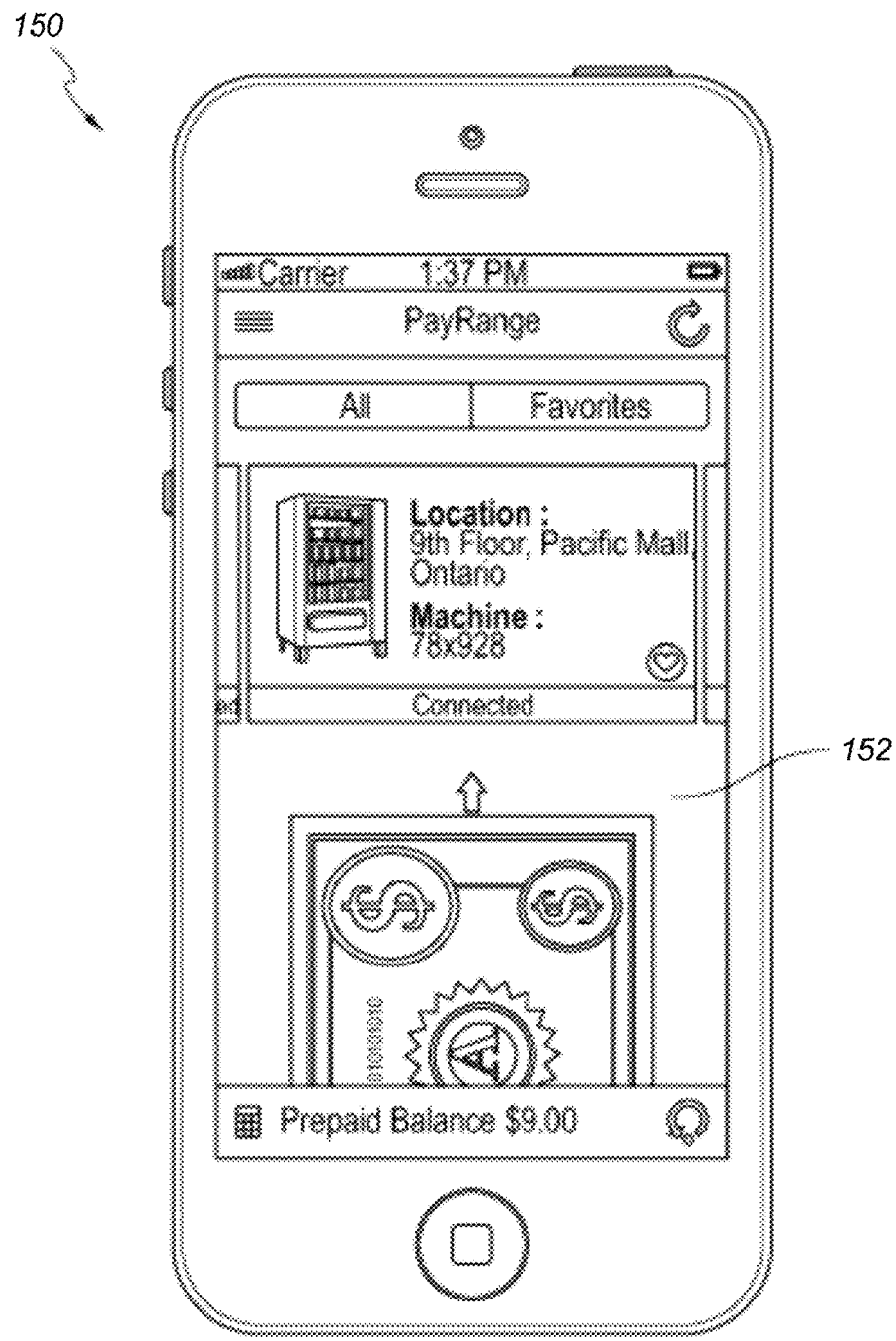
FIGS. 10A-10D show a mobile device with a graphical representation of a mobile application shown thereon, the mobile application being used as part of the mobile-device-to-machine payment processing system in accordance with some implementations.
Figure 10B:
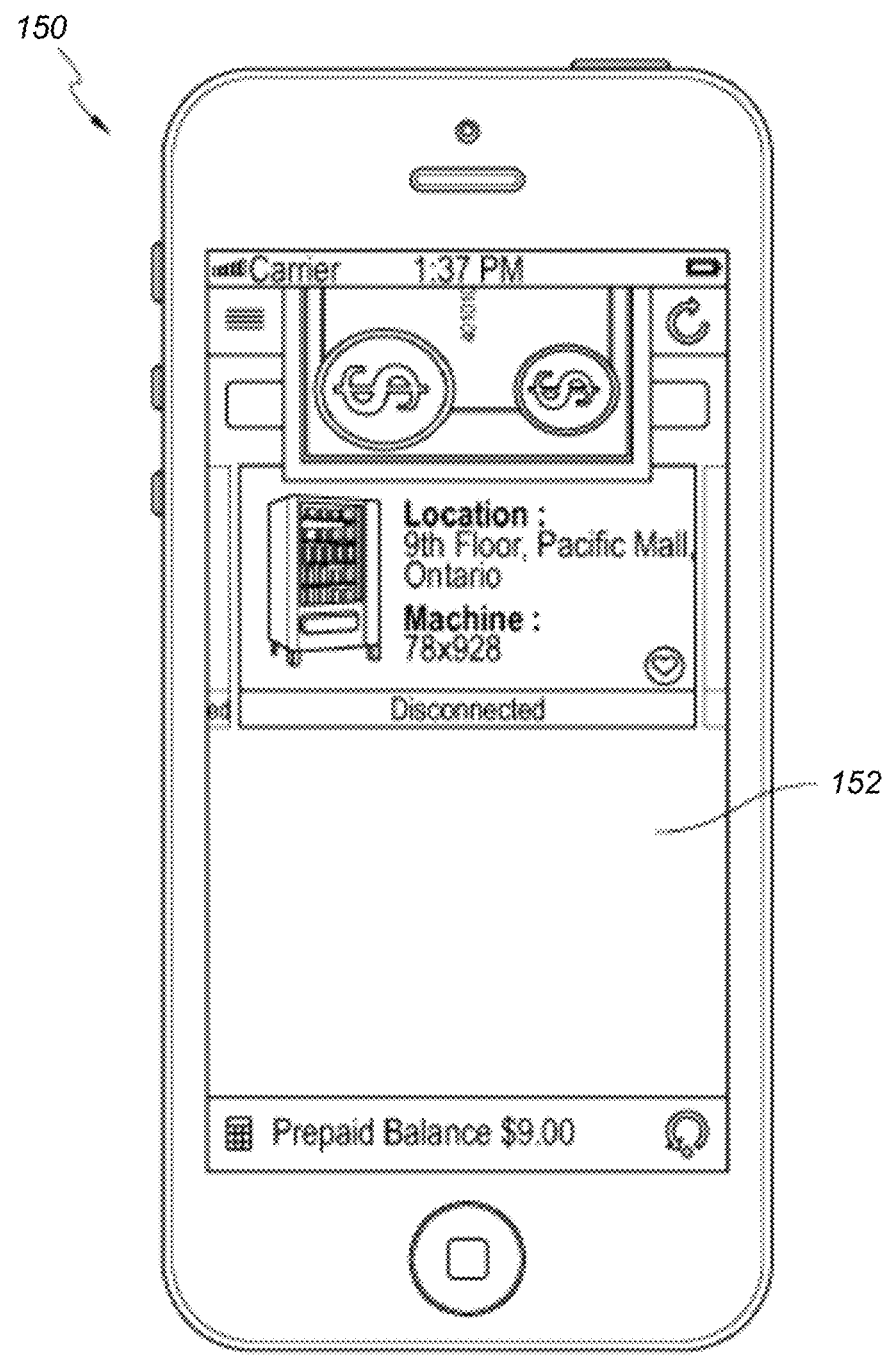
Figure 10C:
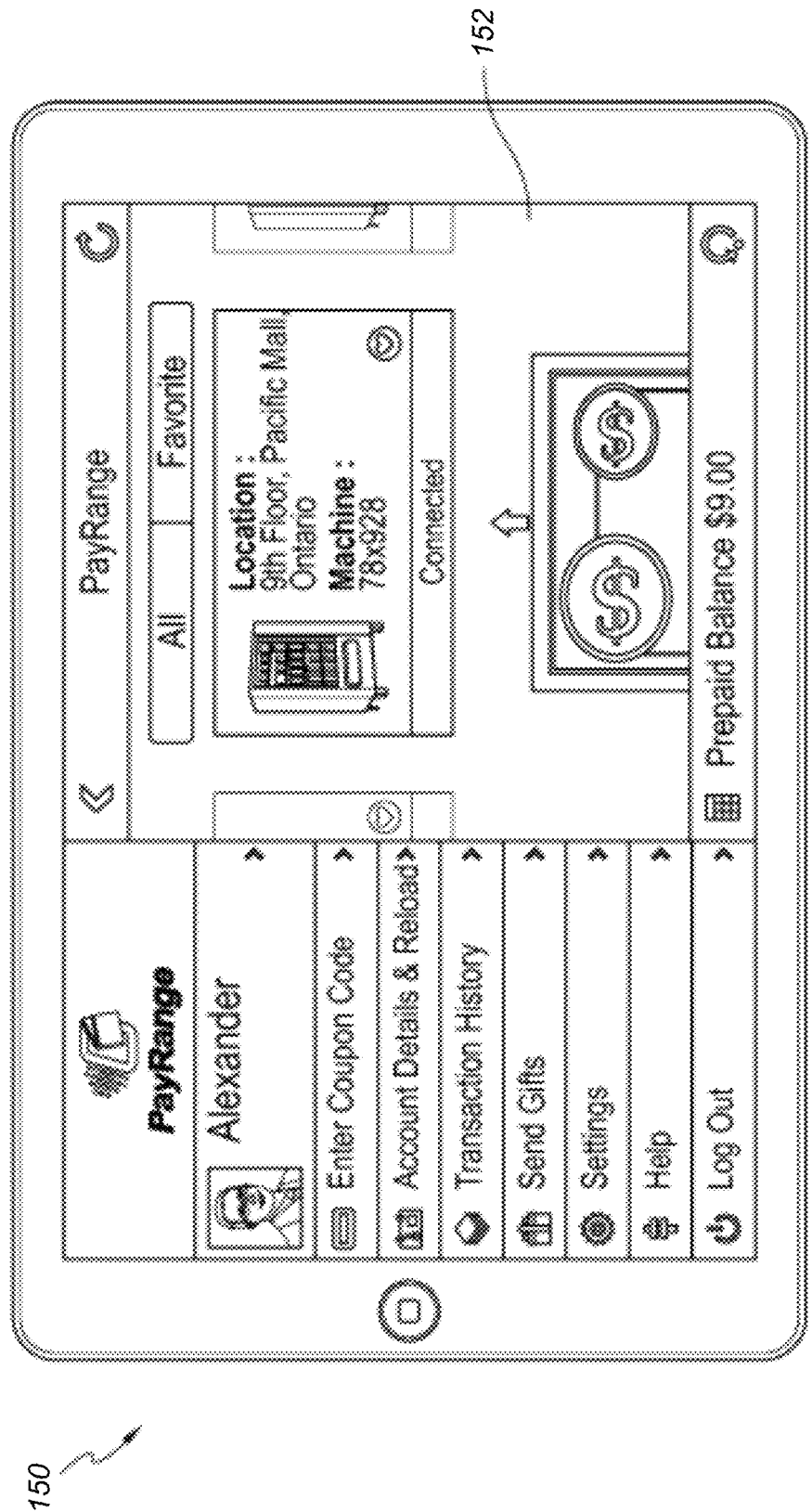
Figure 10D:
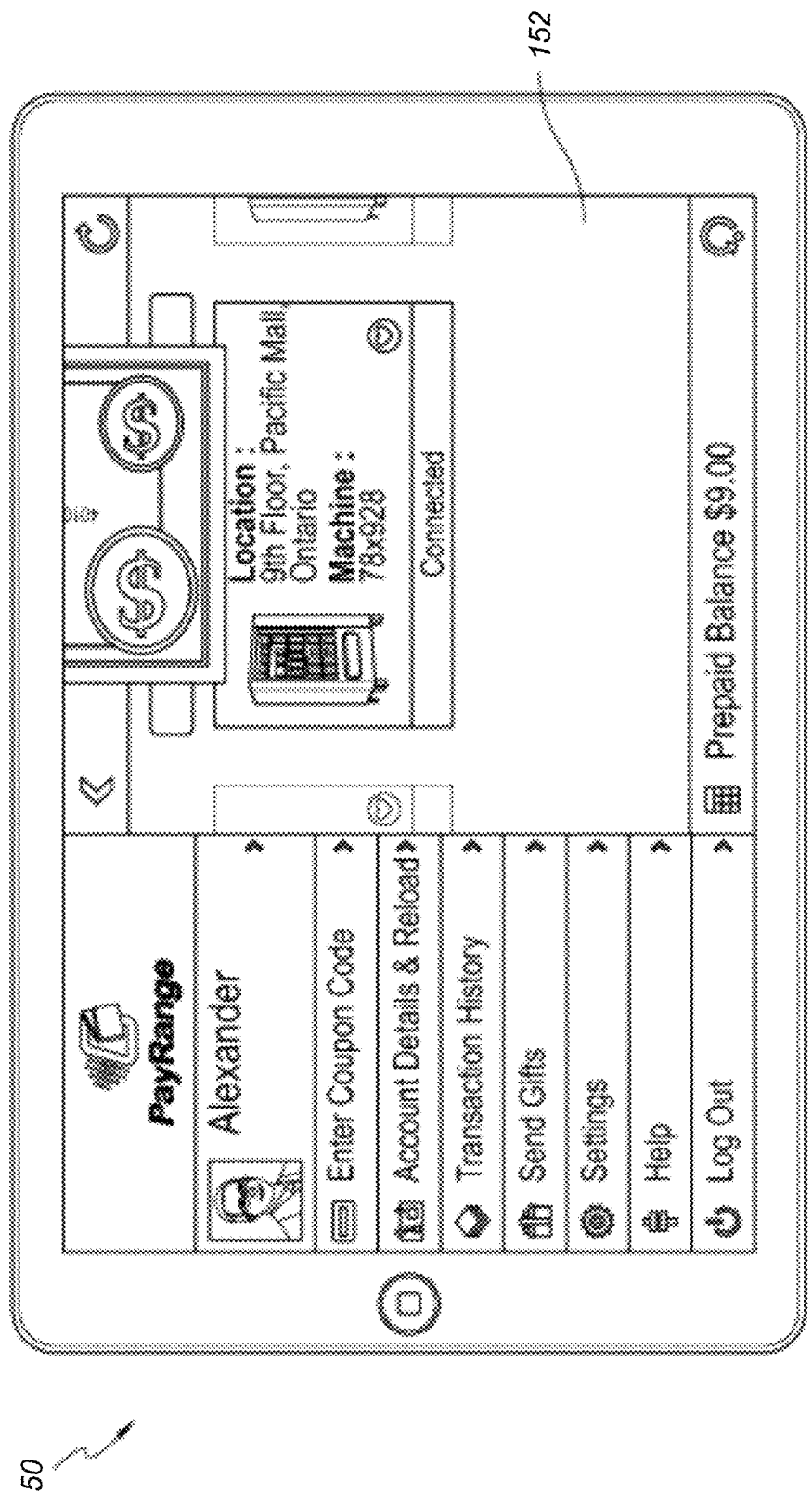
Figure 12:
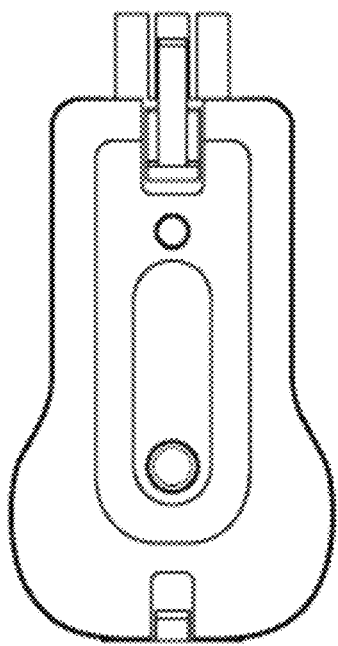
FIG. 12 is a front plan view of the in-line dongle adapter module of FIG. 11 in accordance with some implementations.
Figure 13:
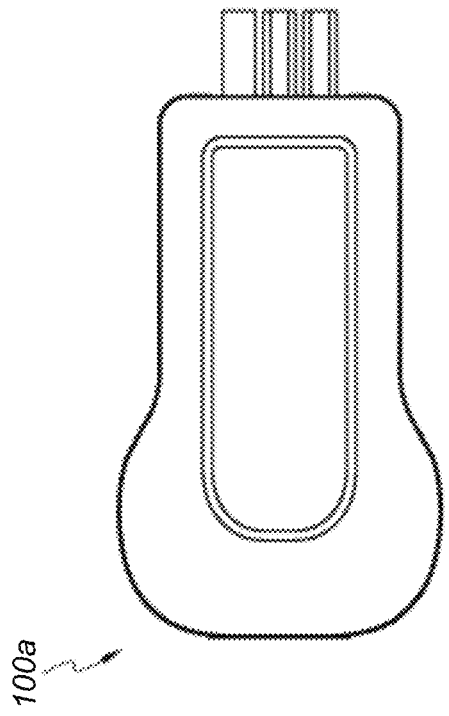
FIG. 13 is a back plan view of the in-line dongle adapter module of FIG. 11 in accordance with some implementations.
Figure 11:
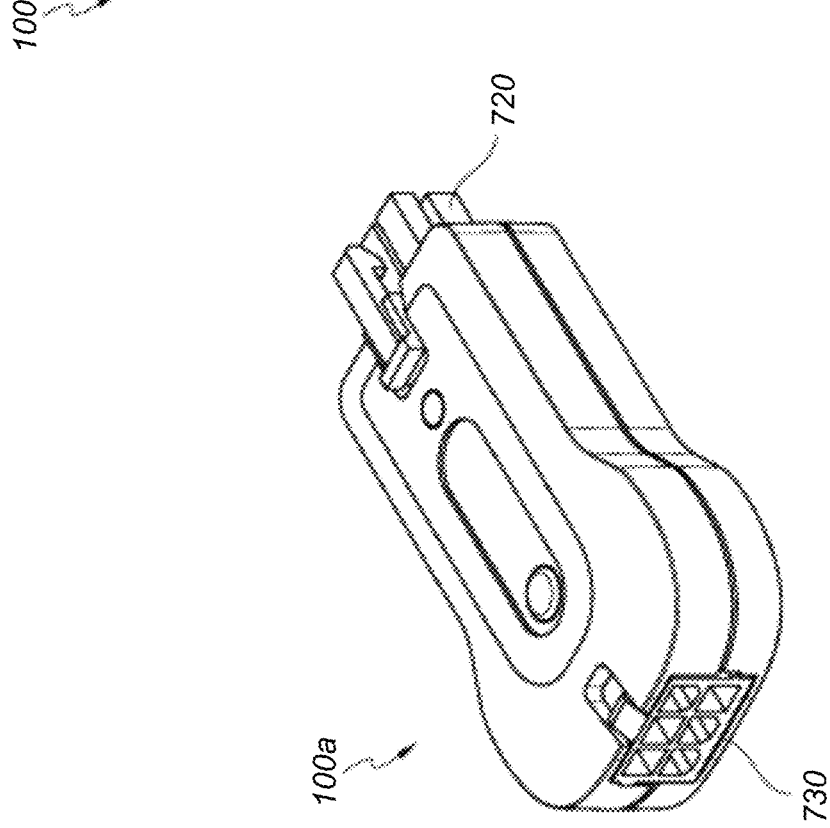
FIG. 11 is a perspective view of the in-line dongle adapter module in accordance with some implementations.

FIGS. 8D and 9E generally show the multi-vend function. If the machine has enabled multi-vend capabilities (block 350) and the multi-vend limit has not been reached, the process returns to the question of whether the user is in the payment zone (block 310 of FIG. 9A). If the machine does not have enabled multi-vend capabilities (block 350) or the multi-vend limit has been reached, the wallet is decremented by the vend amount(s) and "change" is returned to the virtual wallet (block 354) and the process ends (block 356).

Figure 8E:
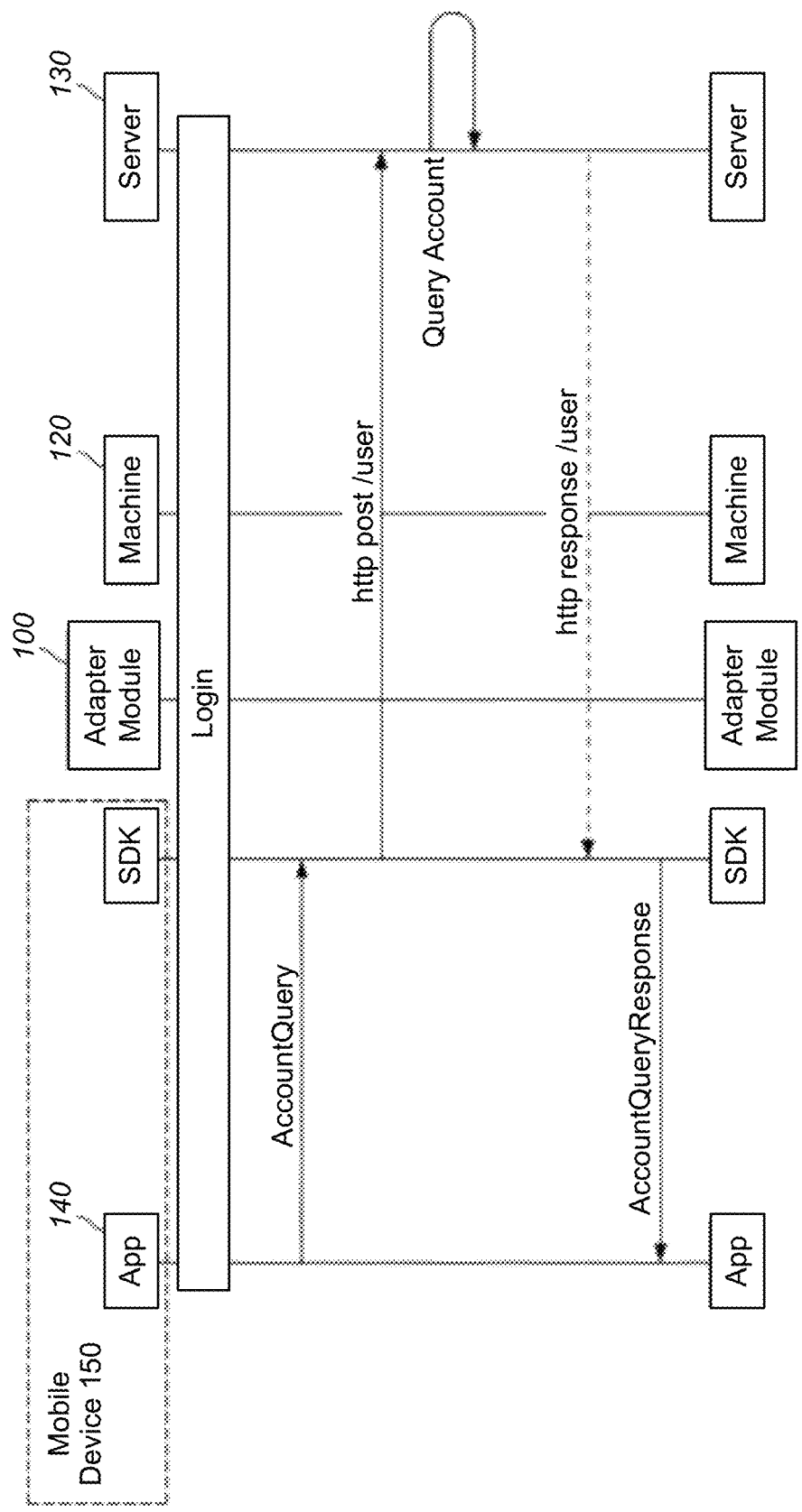
FIG. 8E is a schematic process flow diagram that shows additional elements and features of the payment processing system (e.g., communications, messaging, vending sequence, and purchase flow) in the login mode in accordance with some implementations.
Figure 8F:
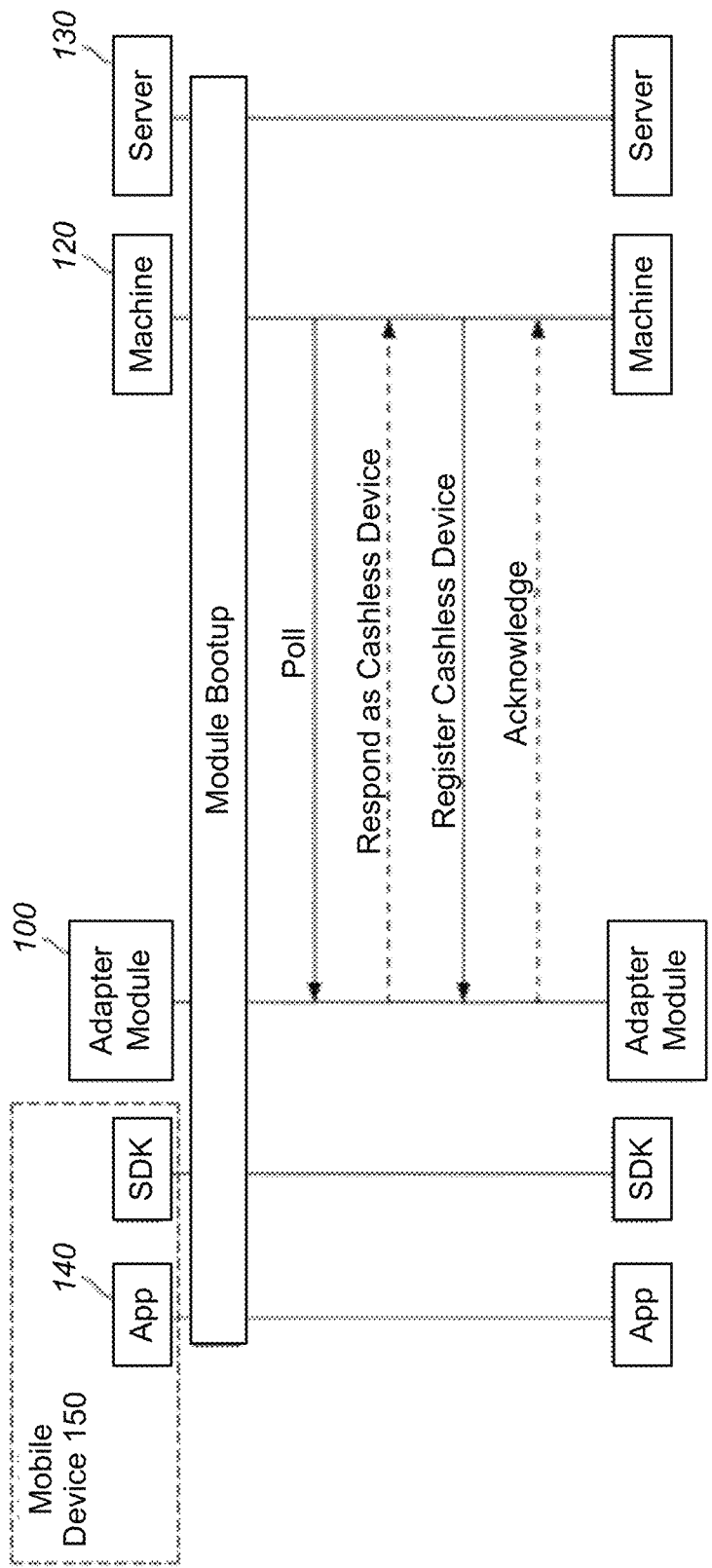
FIG. 8F is a schematic process flow diagram that shows additional elements and features of the payment processing system (e.g., communications, messaging, vending sequence, and purchase flow) during boot-up of the adapter module in accordance with some implementations.
Figure 8G:
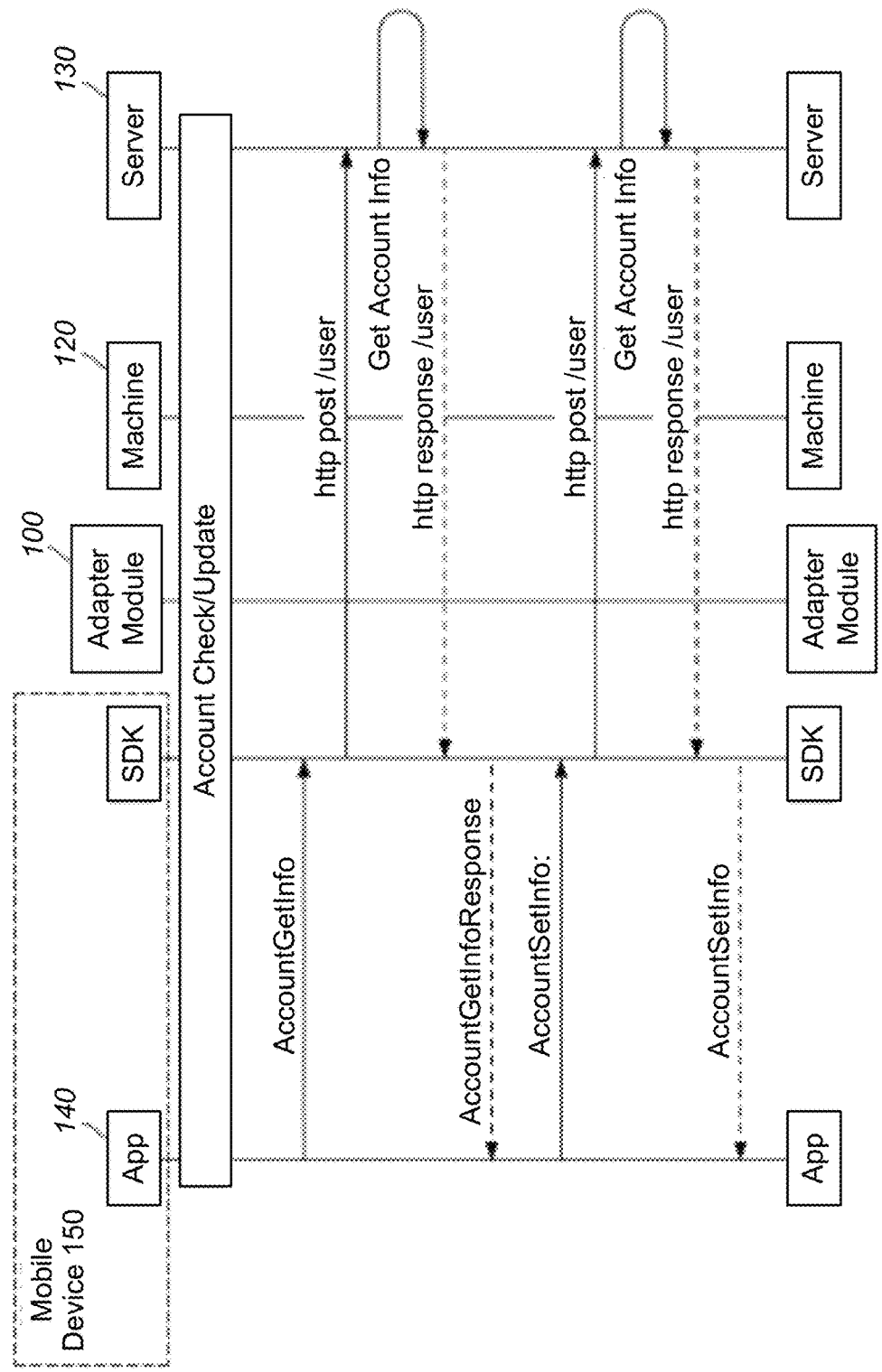
FIG. 8G is a schematic process flow diagram that shows additional elements and features of the payment processing system (e.g., communications, messaging, vending sequence, and purchase flow) during an account check/update process in accordance with some implementations.

FIG. 8E is a schematic flow diagram of an example login process. FIG. 8F is a schematic flow diagram of an example boot-up process. FIG. 8G is a schematic flow diagram of an example account check/update process.

Several of the figures are flow charts (e.g., FIGS. 9A-9E) illustrating methods and systems. It will be understood that each block of these flow charts, components of all or some of the blocks of these flow charts, and/or combinations of blocks in these flow charts, may be implemented by software (e.g., coding, software, computer program instructions, software programs, subprograms, or other series of computer-executable or processor-executable instructions), by hardware (e.g., processors, memory), by firmware, and/or a combination of these forms. As an example, in the case of software, computer program instructions (computer-readable program code) may be loaded onto a computer to produce a machine, such that the instructions that execute on the computer create structures for implementing the functions specified in the flow chart block or blocks. These computer program instructions may also be stored in a memory that can direct a computer to function in a particular manner, such that the instructions stored in the memory produce an article of manufacture including instruction structures that implement the function specified in the flow chart block or blocks. The computer program instructions may also be loaded onto a computer to cause a series of operational steps to be performed on or by the computer to produce a computer implemented process such that the instructions that execute on the computer provide steps for implementing the functions specified in the flow chart block or blocks. Accordingly, blocks of the flow charts support combinations of steps, structures, and/or modules for performing the specified functions. It will also be understood that each block of the flow charts, and combinations of blocks in the flow charts, may be divided and/or joined with other blocks of the flow charts without affecting the scope of the invention. This may result, for example, in computer-readable program code being stored in whole on a single memory, or various components of computer-readable program code being stored on more than one memory.

Additional Implementations

Figure 23:
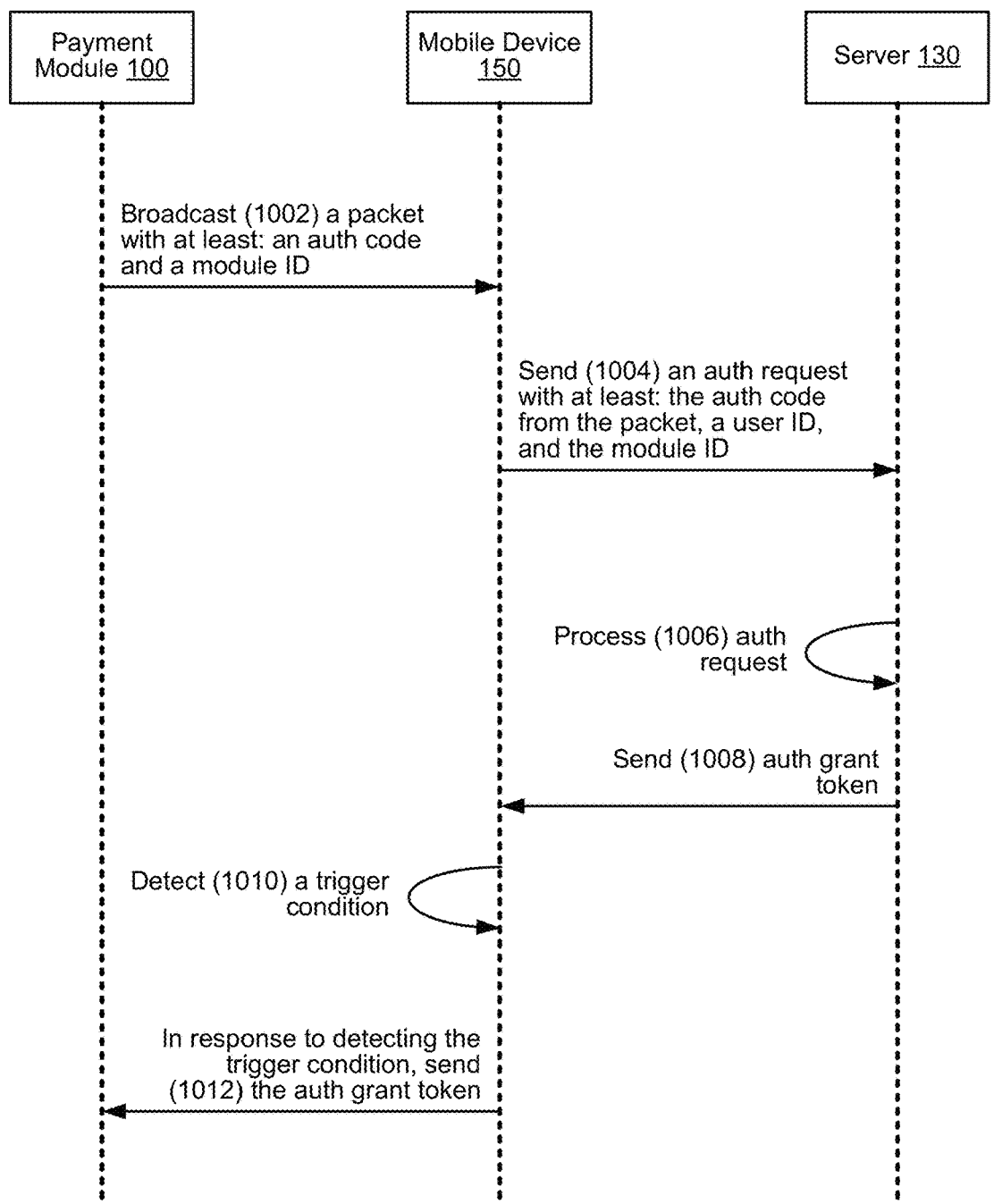
FIG. 23 is a schematic flow diagram of a process for authenticating a user to perform a transaction in the payment processing system in accordance with some implementations.

FIG. 23 illustrates a schematic flow diagram of a process 1000 of authenticating a user to perform a transaction in the payment processing system in accordance with some implementations. In some implementations, the payment processing system includes one or more payment modules 100 (e.g., each associated with a respective payment accepting unit 120 such an automatic retailing machine for dispensing goods and/or services), one or more mobile devices 150 (e.g., each executing the application 140 for the payment processing system either as a foreground or background process), and the server 130. The server 130 manages the payment processing system and, in some cases, is associated with an entity that supplies, operates, and/or manufactures the one or more payment modules 100. For brevity, the process 1000 will be described with respect to a respective payment module 100 and a respective mobile device 150 in the payment processing system.

The payment module 100 broadcasts (1002), via a short-range communication capability (e.g., BLE), a packet of information (sometimes also herein called "advertised information"). The packet of information at least includes an authorization code and an identifier associated with the payment module 100 (module ID). In some implementations, the packet of information further includes a firmware version of the payment module 100 and one or more status flags corresponding to one or more states of the payment module 100 and/or the payment accepting unit 120. The information included in the packet broadcast by the payment module 100 is further discussed below with reference to FIG. 24A.

In some implementations, the payment module 100 sends out a unique authorization code every X seconds (e.g., 100 ms, 200 ms, 500 ms, etc.). In some implementations, the unique authorization codes are randomly or pseudo-randomly generated numbers. In some implementations, the payment module 100 stores broadcasted authorization codes until a received authorization grant token matches one of the stored authorization codes. In some implementations, the payment module 100 stores broadcasted authorization codes for a predetermined amount of time (e.g., Y minutes) after which time an authorization code expires and is deleted. In some implementations, the authorization code is encrypted with a shared secret key known by the server 130 but unique to the payment module 100. In some implementations, the payment module 100 initializes a random number and then the authorization codes are sequential counts from this random number. In such implementations, the payment module 100 stores the earliest valid (unexpired) counter without a need to store every valid authorization code. In some implementations, the authentication code included in the broadcast packet of information is a hash value of the randomly or pseudo-randomly generated number or the sequential number.

The mobile device 150 receives the broadcasted packet of information, and the mobile device 150 sends (1004), via a long-range communication capability (e.g., GSM, CDMA, Wi-Fi, or the like), an authorization request to the server 130. For example, an application 140 that is associated with the payment processing system is executing as a foreground or background process on the mobile device 150. In this example, the application 140 receives the broadcasted packet of information when the mobile device 150 is within the communication zone of the payment module 100 (i.e., BLE range) and either automatically sends the authorization request to the server 130 or sends the authorization request to the server 130 when the mobile device 150 is within the authorization zone of the payment module 100. In some implementations, the broadcasted packet of information includes a baseline authorization zone threshold (i.e., an authorization zone criterion) indicating a baseline RSSI that the mobile device 150 (or the application 140) is required to observe before being within the authorization zone of the payment module 100. In some implementations, the mobile device 150 (or the application 140) offsets the baseline authorization zone threshold based on the strength and/or reception of the short-range communication capability (e.g., BLE radio/transceiver) of the mobile device 150. In some implementations, the authorization request at least includes the authorization code which was included in the broadcasted packet of information, an identifier associated with the user of the mobile device 150 or the user account under which the user of the mobile device 150 is logged into the application 140 (user ID), and the identifier associated with the payment module 100 (module ID). In some implementations, the authentication code included in authorization request is the hash value in cleartext. The authorization request is further discussed below with reference to FIG. 24B.

After receiving the authorization request, the server 130 processes (1006) the authorization request. In some implementations, the server 130 decrypts the authorization code included in the authorization request with the shared secret key corresponding to the payment module 100. In some implementations, the server 130 determines whether the user associated with the user ID in the authorization request has sufficient funds in his/her account for the payment processing system to perform a transaction at the machine 120 that is associated with the payment module 100 corresponding to the module ID in the authorization request.

The server 130 sends (1008), via a long-range communication capability (e.g., GSM, CDMA, Wi-Fi, or the like), an authorization grant token to the mobile device 150. In some implementations, the server 130 does not send the authorization grant token if the authorization code in the authorization request cannot be decrypted with the shared secret key corresponding to the payment module 100 (e.g., the authorization code is corrupted or hacked). In some implementations, the server 130 does not send the authorization grant token if the user associated with the user ID in the authorization request does not have sufficient funds in his/her account. In some implementations, in addition to the authorization grant token, the server 130 sends a message directly to the mobile device 150 which is not encrypted with the shared secret key corresponding to the payment module 100. After receiving the message, the mobile device 150 displays an appropriate message to the user such as insufficient balance or declined authorization. In some implementations, the server 130 sends an authorization grant token for an amount equal to zero; in which case, the payment module 100 interprets this as a declined or failed authorization which can result for any number of reasons including, but not limited to, insufficient balance or credit.

The mobile device 150 receives the authorization grant token, and, subsequently, the mobile device 150 detects (1010) a trigger condition. In some implementations, the mobile device 150 (or the application 140) detects the trigger condition via the hand-free mode (e.g., upon entrance into the payment zone of the payment module 100) or manual mode (e.g., interacting with the user interface of the application 140 to initiate a transaction with the payment accepting unit associated with the payment module 100).

In some implementations, unused authorization grants (e.g., if there was no trigger condition or it expired) are canceled by the mobile device 150 by sending a cancellation message to the server 130 corresponding to the unused authorization grant. In some implementations, the server 130 denies or limits the number of authorization grants sent to the mobile device 150 until it has received transaction information or cancellation of authorization outstanding authorization grants sent to the mobile device 150.

In response to detecting the trigger condition, the mobile device 150 sends (1012), via a short-range communication capability (e.g., BLE), the authorization grant token to the payment module 100. Subsequently, the machine 120 displays credit to the user (e.g., via one of the displays 122 or 124 shown in FIG. 19) and the user interacts with the input mechanisms of the machine 120 (e.g., via the buttons 126 or a touch screen display 124 shown in FIG. 19) to purchase products and/or services.

Figure 24A:
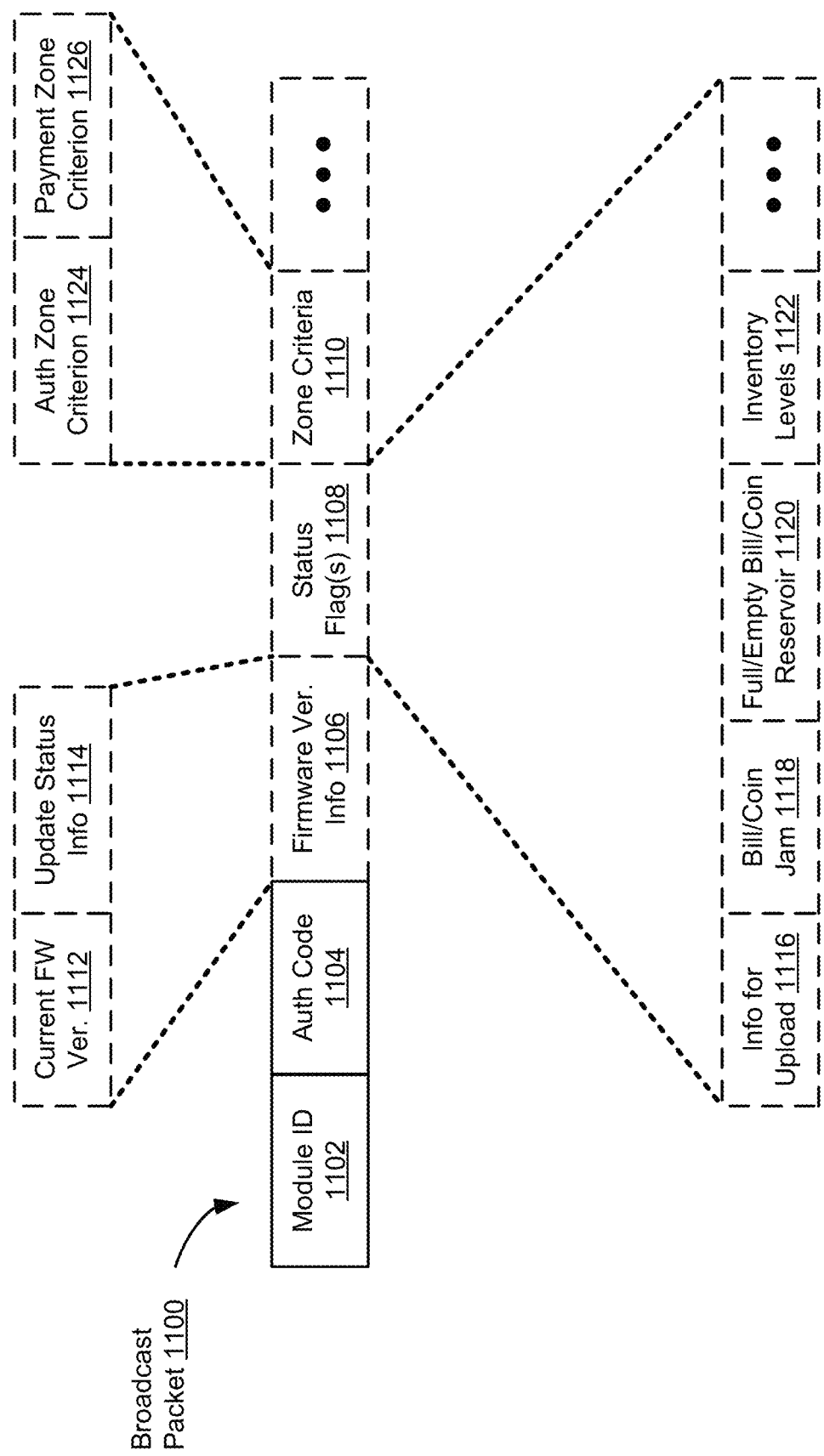
FIG. 24A is a block diagram of a packet of information broadcast by the payment module (sometimes also herein called the "adapter module") in accordance with some implementations.

FIG. 24A illustrates a block diagram of a packet 1100 of information broadcast by the payment module 100 (e.g., in step 1002 of the process 1000 in FIG. 23) in accordance with some implementations. In some implementations, the packet 1100 at least includes: module ID 1102 and authorization code 1104. In some implementations, the packet 110 additional includes: a firmware version 1106 and one or more status flags 1108.

In some implementations, the module ID 1102 is a unique identifier corresponding to the payment module 100 (sometimes also herein called the "adapter module 100") that broadcast the packet 1100.

In some implementations, the authorization code 1104 is a hash value in cleartext. In some implementations, the payment module 100 randomly or pseudo-randomly generates a number or determines a sequential number (See step 1002 of process 1000 in FIG. 23) and performs a predetermined hash function (e.g., SHA-256) on the number to produce the hash value as the authorization code 1104. In some implementations, the authorization code 1104 is a unique code that is encrypted with a secret encryption key corresponding to the payment module 100. The secret encryption key is shared with the server 130, which enables the server 130 to decrypt the authorization code 1104 and encrypt the authorization grant token but not the mobile device 150. In some implementations, the encryption between server 130 and payment module 100 is accomplished by two pairs of public/private keys.

In some implementations, the firmware version information 1106 identifies a current firmware version 1112 of the payment module 100. In some implementations, the firmware version information 1106 also includes update status information 1114 indicating one or more packets received by the payment module 100 to update the firmware or one or more packets needed by the payment module 100 to update the firmware. See FIGS. 26A-26B and 30A-30D and the accompanying text for further discussion regarding updating the firmware of the payment module 100.

In some implementations, the one or more status flags 1108 indicate a state of the payment module 100 and/or the payment accepting unit 120 associated with the payment module 100. In some implementations, the one or more status flags 1108 indicate a state of the payment module 100 such upload information indicator 1116 indicating that that the payment module 100 has information to be uploaded to the server 130 (e.g., transaction information for one or more interrupted transactions). In some implementations, upload information indicator 1116 triggers the mobile device 150 to connect to payment module 100 immediately (e.g., if it has interrupted transaction information to be uploaded to the server 130). See FIGS. 25A-25B and 29A-29C and the accompanying text for further discussion regarding interrupted transactions. In some implementations, the one or more status flags 1108 indicate a state of the payment accepting unit 120 including one or more of an error indicator 1118 (e.g., indicating that a bill and/or coin acceptor of the payment accepting unit 120 is experiencing a jam, error code, or malfunction), a currency level indicator 1120 (e.g., indicating that the level of the bill and/or coin acceptor reservoir of the payment accepting unit 120 is full or empty), and/or inventory level(s) indicator 1122 (e.g., indicating that one or more products of the payment accepting unit 120. In some implementations, the one or more status flags 1108 are error codes issued by payment accepting unit 120 over the MDB.

In some implementations, the zone criteria information 1110 specifies an authorization zone criterion 1124 (e.g., a baseline authorization zone threshold indicating a baseline RSSI that the mobile device 150 (or the application 140) is required to observe before being within the authorization zone of the payment module 100) and/or a payment zone criterion 1126 (e.g., a baseline payment zone threshold indicating a baseline RSSI that the mobile device 150 (or the application 140) is required to observe before being within the payment zone of the payment module 100). In some implementations, the baseline authorization zone threshold and the baseline payment zone threshold are default values determined by the server 130 or stored as variables by the application 140, in which case the authorization zone criterion 1124 and payment zone criterion 1126 are offsets to compensate for the strength and/or reception of the short-range communication capability (e.g., BLE radio/transceiver) of the payment module 100. Alternatively, zone criteria information 1110 includes a spread between the baseline authorization zone threshold and the baseline payment zone threshold. Thus, the mobile device 150 (or the application 140) determines the baseline authorization zone threshold and the baseline payment zone threshold based on the spread value and a default value for either the baseline authorization zone threshold or the baseline payment zone threshold. For example, the spread indicates −10 db and the default baseline payment zone threshold is −90 db; thus, the baseline authorization zone threshold is −80 db. Continuing with this example, after determining the baseline authorization zone threshold and the baseline payment zone threshold, the mobile device 150 (or the application 140) may further adjust the authorization zone threshold and/or the payment zone threshold based on the strength and/or reception of its short-range communication capability (i.e., BLE radio/transceiver).

FIG. 24B is a block diagram of an authorization request 1130 sent by the mobile device 150 to the server 130 (e.g., in step 1004 of the process 1000 in FIG. 23) in accordance with some implementations. In some implementations, the authorization request 1130 at least includes: a module ID 1102, a user ID 1134, and an authorization code 1104.

In some implementations, the module ID 1102 is a unique identifier corresponding to the payment module 100 that broadcast the 1100 that included the authorization code 1104.

In some implementations, the user ID 1134 is an identifier associated with the user of the mobile device 150 sending the authorization request 1130 to the server 130. In some implementations, the user ID 1134 is associated with the user account under which the user of the mobile device 150 is logged into the application 140.

In some implementations, the authorization code 1130 includes the authorization code 1104 included in the packet 1100 of information that was broadcast by the payment module 100.

FIG. 24C is a block diagram of an authorization grant token 1140 sent by the server 130 to the mobile device 150 (e.g., in step 1008 of the process 1000 in FIG. 23) in accordance with some implementations. In some implementations, in accordance with a determination that the authorization code 1136 included in the authorization request 1130 from the mobile device 150 is valid and that the user associated with the mobile device 150 has sufficient funds in his/her account for the payment processing system, the server 130 generates the authorization grant token 1140. In some implementations, the authorization grant token 1140 at least includes: a module ID 1102, a user ID 1134, an authorized amount 1146, (optionally) an expiration period offset 1148, and (optionally) the authorization code 1104.

In some implementations, the module ID 1102 is a unique identifier corresponding to the payment module 100 that broadcast the packet 1100 that included the authorization code 1104.

In some implementations, the user ID 1134 is an identifier associated with the user of the mobile device 150 that sent the authorization request 1130 to the server 130.

In some implementations, the authorized amount 1146 indicates a maximum amount for which the user of the mobile device 150 is authorized for a transaction using the authorization grant token 1140. For example, the authorized amount 1146 is predefined by the user of the mobile device 150 or by the server 130 based on a daily limit or based on the user's total account balance or based on a risk profile of the user correspond to the user ID 1134.

In some implementations, the expiration period 1148 offset indicates an offset to the amount of time that the payment module 100 holds the authorization grant token 1140 valid for initiation of a transaction with the machine 120 associated with the payment module 100. For example, the expiration period offset 1148 depends on the history and credit of the user of mobile device 150 or a period predefined by the user of mobile device 150.

In some implementations, the authorization grant token 1140 further includes the authorization code 1104 that was included in the authorization request 1130. In some implementations, when the authorization code 1104 is the hash value, the server 130 encrypts the authorization grant token 1140 including the hashed value with the shared secret encryption key associated with payment module 100. Subsequently, when mobile device 150 sends the authorization grant token 1140 to payment module 100 after detecting a trigger condition, the payment module 100 decrypts the authorization grant token 1140 using the secret key known only to server 130 and payment module 100 (which authenticates the message and the authorization grant), and then matches the hash value included in the decrypted authorization grant token 1140 to previously broadcast valid (unexpired) hash values (i.e., auth codes) to determine validity of the (which was known only by payment module 100).

Figure 24D:
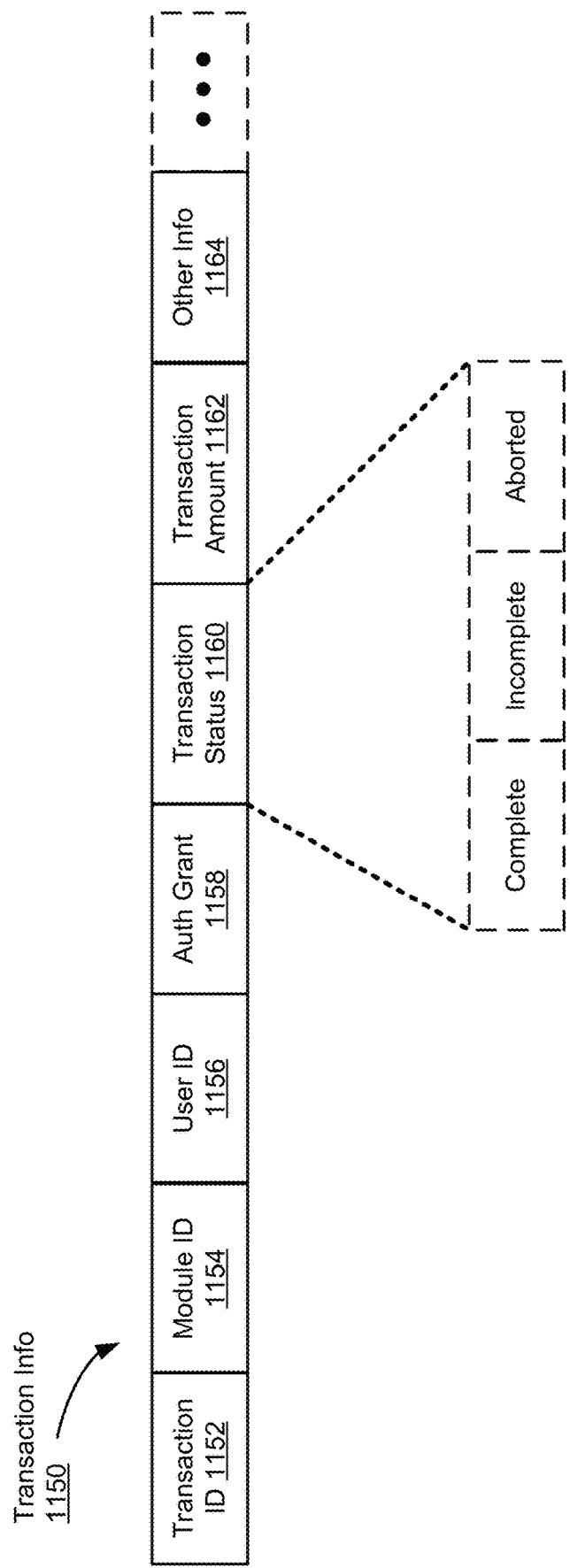
FIG. 24D is a block diagram of transaction information generated by the payment module in accordance with some implementations.

FIG. 24D illustrates a block diagram of transaction information 1150 generated by the payment module 100 (e.g., in step 1204 of the process 1200 in FIG. 25A) in accordance with some implementations. In some implementations, the transaction information 1150 includes: a transaction ID 1152 for the respective transaction, a module ID 1154, a user ID 1156, (optionally) the authorization code 1158, transaction status information 1160, the transaction amount 1162, and other information 1164.

In some implementations, the transaction ID 1152 is a unique identifier corresponding to the respective transaction. In some implementations, the transaction ID 1152 is encoded based on or associated with the time and/or date on which and the location at which the respective transaction took place.

In some implementations, the module ID 1154 is a unique identifier corresponding to the payment module 100 that performed the respective transaction.

In some implementations, the user ID 1156 is an identifier associated with the user of the mobile device 150 that initiated the respective transaction.

In some implementations, the authorization code 1158 corresponds to the original authorization code (e.g., auth code 1104, FIGS. 24 A-24C) and/or authorization grant token (e.g., auth grant token 1140, FIG. 24C) that was used to initiate the respective transaction. In some implementations, the authorization code 1156 is encrypted with a unique encryption key corresponding to the payment module 100.

In some implementations, the transaction status information 1160 includes an indication whether the respective transaction was completed, not-completed, or aborted. For example, the respective transaction is incomplete if a jam occurred at the payment accepting unit 120 and the user did not receive the product associated with the respective transaction. For example, if the user walks away from the payment accepting unit 120 after money was credited for the respective transaction, the respective transaction is aborted. In another example, if respective transaction times out after a predetermined time period because the user failed to select a product at the payment accepting unit 120, the respective transaction is aborted. In another example, if the user actuates a bill or coin return mechanism of the payment accepting unit 120, the respective transaction is aborted.

In some implementations, the transaction amount 1162 indicates the amount of the respective transaction or the amount of each of multiple transactions (e.g., in a multi-vend scenario). In some implementations, the transaction amount 1162 is encrypted with a unique encryption key corresponding to the payment module 100.

In some implementations, the other information 1164 includes other information related to the respective transaction such as the items dispensed by the payment accepting unit 120 and the type of transaction (e.g., coins, bills, credit card, manual mode, hands-free mode, etc.). In some implementations, the other information 1164 includes other information related to the payment module 100 and/or the payment accepting unit 120 associated with the payment module 100. For example, the other information 1164 includes a verification request to the server 130 in order to implement new firmware. See FIGS. 26A-26B and the accompanying text for further discussion of the verification request. In another example, the other information 1164 includes transaction information from one or more previous interrupted transactions. In another example, the other information 1164 includes transaction information for one or more transactions paid via bills and/or coins. In another example, the other information 1164 includes inventory information as to one or more products of the payment accepting unit 120.

Figure 25:
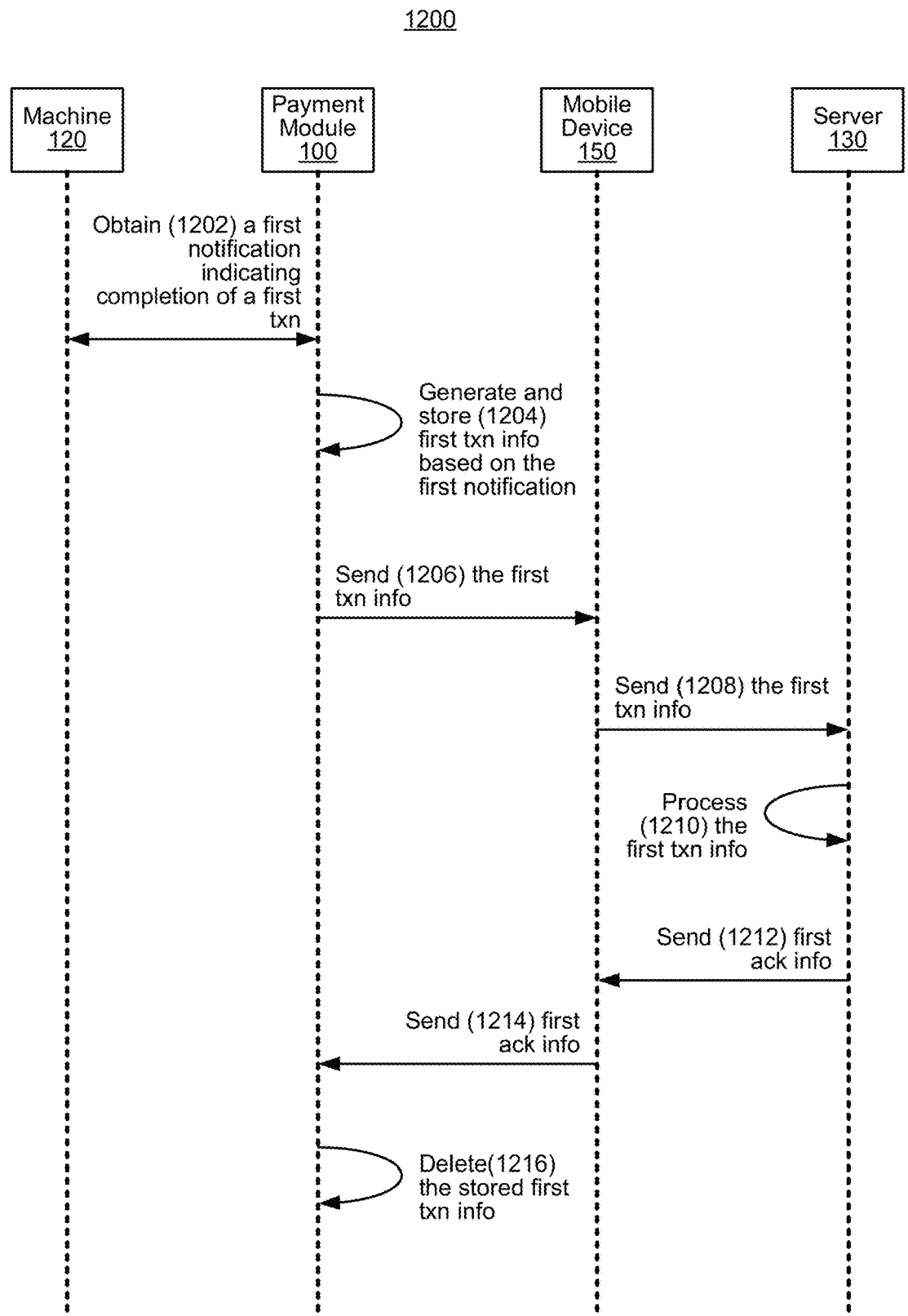
FIG. 25 is a schematic flow diagram of a process for processing acknowledgment information in the payment processing system in accordance with some implementations.

FIG. 25 illustrates a schematic flow diagram of a process 1200 of processing acknowledgement information in accordance with some implementations. In some implementations, the payment processing system includes one or more payment modules 100 (e.g., each associated with a respective payment accepting unit 120 such an automatic retailing machine for dispensing goods and/or services), one or more mobile devices 150 (e.g., each executing the application 140 for the payment processing system either as a foreground or background process), and the server 130. The server 130 manages the payment processing system and, in some cases, supplies, operates, and/or manufactures the one or more payment modules 100. For brevity, the process 1200 will be described with respect to a respective payment module 100 associated with a respective payment accepting unit 120 (machine 120) and a respective mobile device 150 in the payment processing system. In the process 1200, the payment module 100 receives first acknowledgment information for a first transaction via the mobile device 150 that initiated the first transaction.

The payment module 100 obtains (1202) a first notification indicating completion of a first transaction from the machine 120. For example, after the process 1000 in FIG. 23, the user of the mobile device 150 selects a product to purchase from the machine 120 by interacting with one or more input mechanisms of the machine 120 (e.g., buttons 126 or a touch screen display 124 shown in FIG. 19), and the machine 120 dispenses the selected product. Continuing with this example, after the product is dispensed, the transaction is complete and the payment module 100 obtains a notification from the machine of the completed transaction. In some implementations, the notification includes the amount of the transaction and (optionally) machine status information associated with the machine 120 such as inventory information as to one or more products of the payment accepting unit 120 and/or the like.

After obtaining the first notification, the payment module 100 generates (1204) first transaction information based on the first notification, and the payment module 100 stores the first transaction information. In some implementations, the transaction information includes a transaction ID for the first transaction, a module ID corresponding to payment module 100, a user ID corresponding to the mobile device 150, transaction status information indicating that the first transaction is complete, and the transaction amount indicated by the first notification. In some implementations, the payment module 100 retains the authorization code included in the original broadcasted packet and/or the authorization grant token and includes the authorization code in the first transaction information. In some implementations, the authorization code is encrypted with a secret key corresponding to the payment module 100, which is shared with the server 130 but not the mobile device 150. In some implementations, the first transaction information further includes other information such as the machine status information included in the first notification or transaction information corresponding to previous interrupted transaction(s). See FIG. 24D and the accompanying text for further discussion regarding transaction information 1150.

The payment module 100 sends (1206), via a short-range communication capability (e.g., BLE), the first transaction information to the mobile device 150.

The mobile device 150 sends (1208), via a long-range communication capability (e.g., GSM, CDMA, Wi-Fi, or the like), the first transaction information to the server 130.

The server 130 processes (1210) the first transaction information. For example, the server 130 debits the account of the user associated with the user ID in the first transaction information in the amount indicated by the first transaction information.

The server 130 sends (1212), via a long-range communication capability (e.g., GSM, CDMA, Wi-Fi, or the like), first acknowledgment information to the mobile device 150. In some implementations, the first acknowledgment information acknowledges that the server 130 received the first transaction information. In some implementations, the first acknowledgment information includes the user ID, the module ID, the transaction ID, and (optionally) the authorization grant included in the transaction information (e.g., auth grant 1158, FIG. 24D).

After receiving the first acknowledgement information, the mobile device 150 sends (1214), via a short-range communication capability (e.g., BLE), the first acknowledgment information to the payment module 100.

After receiving the first acknowledgment information, the payment module 100 deletes (1216) the stored first transaction information.

Figure 26A:
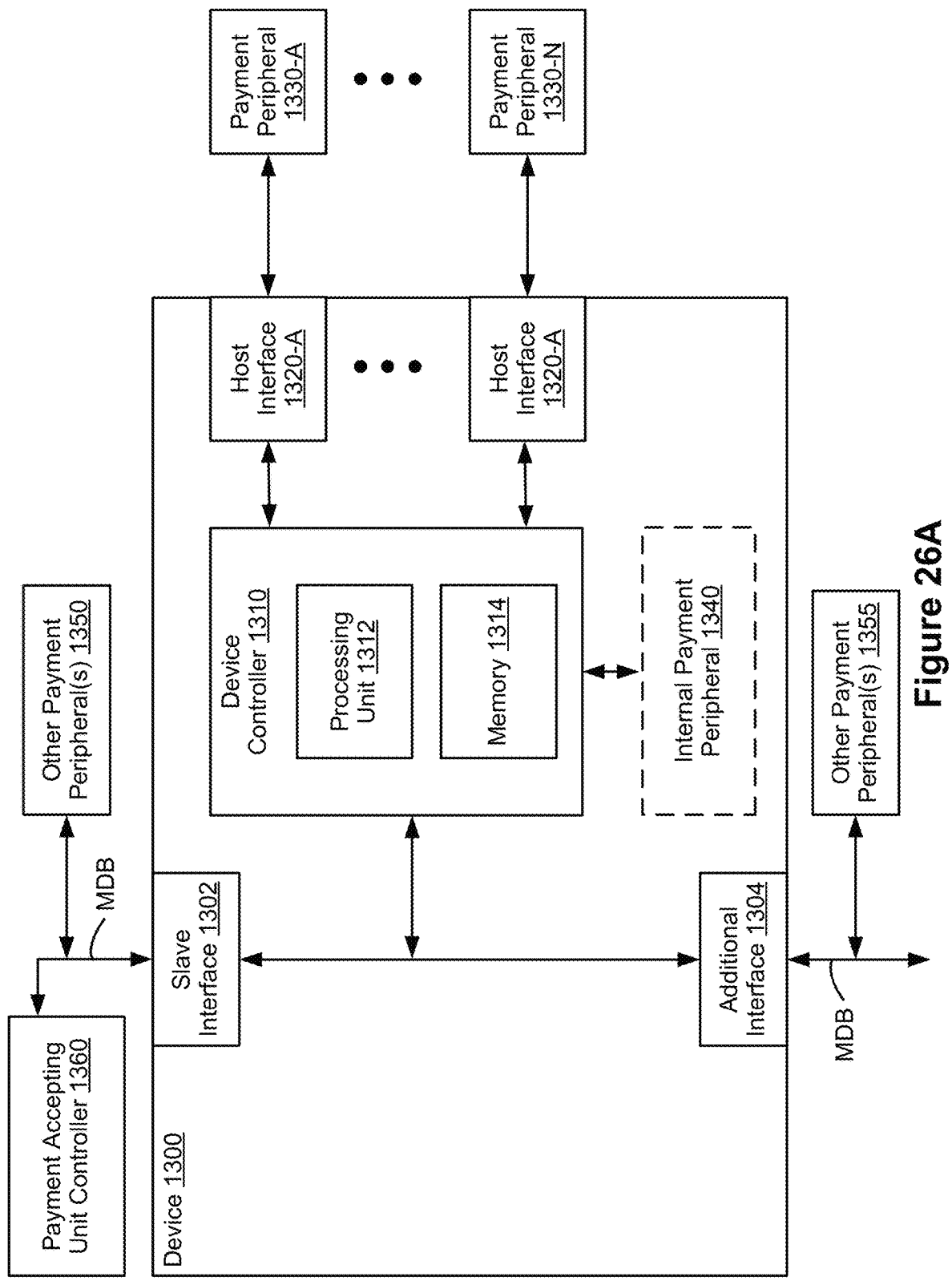
FIG. 26A is a block diagram of a device for retrofitting a payment accepting unit (e.g., machine 120) to accommodate a plurality of payment peripherals in accordance with some implementations.

FIG. 26A is a block diagram of a device 1300 for retrofitting the payment accepting unit 120 (sometimes also herein called "machine 120") to accommodate a plurality of payment peripherals 1330 in accordance with some implementations. The device 1300 is similar to and adapted from adapter module 100 (sometimes also herein called "payment module 100") as shown in FIG. 20 in that the device 1300 connects to a multi-drop bus (MDB) of payment accepting unit 120 and, optionally, provides the payment processing functionalities discussed in FIGS. 7, 8A-8G, 9A-9E, and 23 (e.g., via the internal payment peripheral 1340).

In some implementations, during normal operation, the payment accepting unit 120 includes a multi-drop bus (MDB) connecting a payment accepting unit controller 1360 of the payment accepting unit 120 with payment peripherals (e.g., other payment peripheral(s) 1350, 1355 including coin acceptors, bill acceptors, cashless payment devices such as a payment card reader, and/or the like). In some implementations, the device 1300 is connected in-line to the MDB as shown in FIGS. 17 and 18. In some implementations, the MDB protocol or the payment accepting unit 120 is configured to support a limited number of payment peripherals or does not support particular payment peripherals. For example, in some circumstances, the payment accepting unit 120 supports a maximum of two cashless payment devices, or the payment accepting unit 120 only supports a bill acceptor and a coin acceptor but not cashless payment devices or other payment peripherals. The device 1300 expands the number of payment peripherals connected to the payment accepting unit 120 beyond this limited number and enables support for a plurality of payment peripherals, which may or may not be compliant with the payment accepting unit 120 and/or the MDB protocol.

In FIG. 26A, the device 1300 is configured to perform as a virtual payment peripheral of the payment accepting unit 120 and to perform as a virtual payment accepting unit for the one or more payment peripherals 1330. As such, in some implementations, the payment accepting unit controller 1360 views the device 1300 as another payment peripheral connected to the MDB, where the device 1300 sends signals to the payment accepting unit controller 1360 in a manner as if originated by the device 1300 that is functioning as a singular virtual payment peripheral. Moreover, in some implementations, the one or more payment peripherals 1330 view the device 1300 as the payment accepting unit controller 1360, where signals are sent to the one or more payment peripherals 1330 in a manner as if originated by the payment accepting unit 120. To accomplish this, the device 1300 manages and hosts the one or more payment peripherals 1330. Additionally, the device 1300 translates addresses and modifies the communications as necessary to ensure the payment accepting unit 120 understands the traffic that is coming through to it as a singular virtual payment peripheral.

In FIG. 26A, the device 1300 includes a slave interface 1302 (e.g., the male adapter 720, FIG. 20) and an additional interface 1304 (e.g., the female adapter 730, FIG. 20) for connecting the device 1300 to the MDB. In some implementations, the device 1300 includes a pass-through channel to enable signals from the payment accepting unit controller 1360 to reach other payment peripheral(s) 1355 and to enable signals from the other payment peripheral(s) 1355 to reach the payment accepting unit controller 1360. In FIG. 26A, the device 1300 also includes a device controller 1310 with a processing unit 1312 (e.g., including one or more processors, cores, microcontrollers, microprocessors, or the like) and memory 1314 storing one or more programs for execution by the processing unit 1312. In some implementations, the one or more programs cause the device 1300 to perform as a virtual payment peripheral of the payment accepting unit 120 and to perform as a virtual payment accepting unit for the one or more payment peripherals 1330. In FIG. 26A, the device 1300 also includes one or more host interfaces 1320 (e.g., MDB ports or non-MDB ports) for connecting the device 1300 with one or more payment peripherals 1330 (e.g., payment peripherals 1330-A to 1330-N).

In some implementations, device 1300 optionally includes internal payment peripheral 1340 with hardware, software, firmware, or a combination thereof for providing the payment processing functionalities discussed in FIGS. 7, 8A-8G, 9A-9E, and 23 (e.g., including the security unit 755 and the communications unit 770 shown in FIG. 20).

Figure 26B:
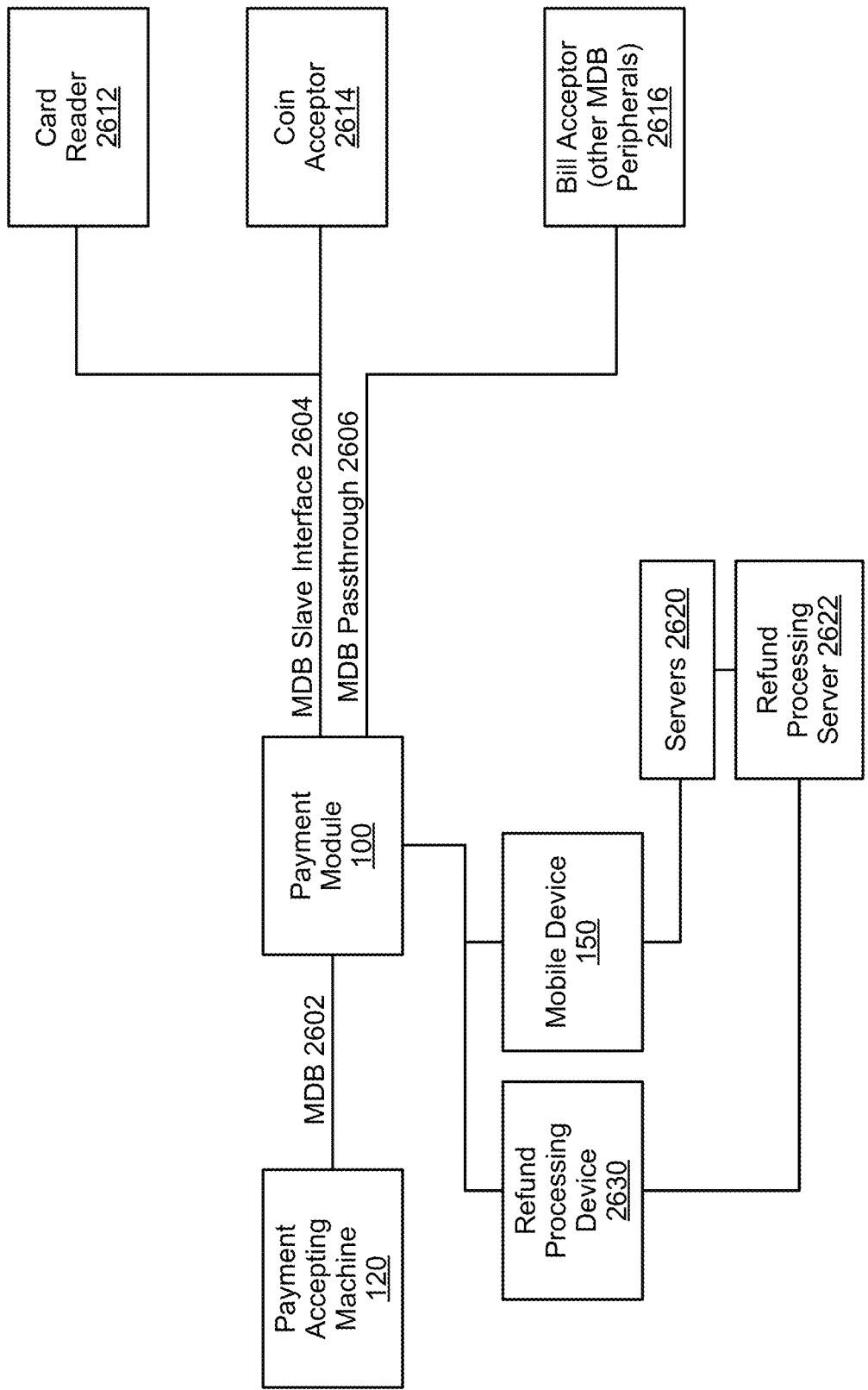
FIG. 26B is a block diagram showing connections between an adapter module and a payment accepting unit (e.g., through MDB, MDB slave interface, and MDB pass-through interfaces) in accordance with some embodiments.

FIG. 26B is a block diagram showing connections between an adapter module and a payment accepting unit (e.g., through MDB, MDB slave interface, and MDB pass-through interfaces described herein with reference to other figures—e.g., FIGS. 26A, 27, 28A-B and 29A-D)) in accordance with some embodiments.

As shown in FIG. 26B, the payment module 100 (corresponding in some implementations to the device 1300 of FIG. 26A) is coupled with an unattended machine (e.g., payment accepting unit) 120 via a MDB bus 2602, and the payment module 100 is also coupled with one or more payment peripherals (e.g., a card reader 2612 and a coin acceptor 2614) (corresponding in some implementations to the payment peripherals 1300 of FIG. 26A) via one or more MDB slave interfaces 2604. Additionally, the payment module 100 is coupled with additional payment peripherals (e.g., a bill acceptor 2616) or other MDB-compliant peripherals) (corresponding in some implementations to the other payment peripherals 1355 of FIG. 26A) via an MDB pass-through. As described above (see discussion of "Network Connections") the payment module 100 includes communication capabilities (e.g., Bluetooth (such as Bluetooth 4.0, Bluetooth Smart, Bluetooth Low Energy (BLE)), near-field communication (NFC), Ultra Wideband (UWB), radio frequency identification (RFID), cellular wireless, infrared wireless, induction wireless, or any wired or wireless technology that could be used to communicate a small distance) that enable it to connect via a mobile device 150 (e.g., a mobile device of a user performing a vending transaction) to one or more servers 2620 (e.g., servers 130 or 160) that implement, process and/or record vending transactions of users with the payment accepting unit 120 that are performed via the payment module 100.

In some implementations, the one more servers 2620 include a refund processing server 2622 that performs operations to process user requests for refunds for failed or unsatisfactory vending transactions for which the user was charged (whether paid for using physical currency—e.g., coins or bills—or via an online transaction performed via the mobile device 150 as described herein). In some implementations, the payment module 100 is communicatively coupled with a refund processing device 2630 (such as a tablet-like device, console or control panel) that a user can access to request a refund and receive information needed to receive a refund for a failed or unsatisfactory vending transaction for which the user was charged (whether paid for using physical currency—e.g., coins or bills—or via an online transaction performed via the mobile device 150). In some implementations, the refund processing device 2630 is mounted in proximity to one or more vending machines and the user can receive the refund directly from one of those vending machines (e.g., in the form of coins or bills) through user interaction with the refund processing device 2630 and operation of the refund processing server 2622 as described herein. In some implementations, the user can receive the refund in form of a credit to an online account maintained by the servers 2620 through user interaction with the refund processing device 2630 and operation of the refund processing server 2622 and/or the servers 2620. In some implementations, a user can request a refund and receive information needed to receive a refund for a failed or unsatisfactory vending transaction for which the user was charged via the mobile device 150 (e.g., via a PayRange application), which is configured to provide the user-side refund operations and user interfaces described herein.

In some implementations, the payment module 100's connection, via the one or more slave interfaces, with the card reader and coin acceptor allow the payment module 100 to easily, seamlessly, and securely process refunds for the unattended machine. For example, the payment module 100 (via an MDB router) is able to control both the card reader and a coin-dispensing mechanism (e.g., coin acceptor) through the one or more slave interfaces (i.e., slave ports). In some implementations, the payment module 100 initially registers with the unattended machine as both a card reader and coin acceptor. In some implementations, the coin acceptor is controlled by the payment module 100 (via the one or more slave interfaces) in order to process and dispense refunds. For example, the payment module 100 can take the coin acceptor off-line from the unattended machine (by issuing a signal through the one or more slave interfaces) and can then send commands to the coin acceptor to dispense refunds. After dispensing the refunds, the payment module 100 can then bring the coin acceptor back online again (by issuing another signal via the one or more slave interfaces) with the unattended machine.

Additional details regarding processing such refunds are described below in reference to FIGS. 30A-30G and 31A-31B.

Figure 27:
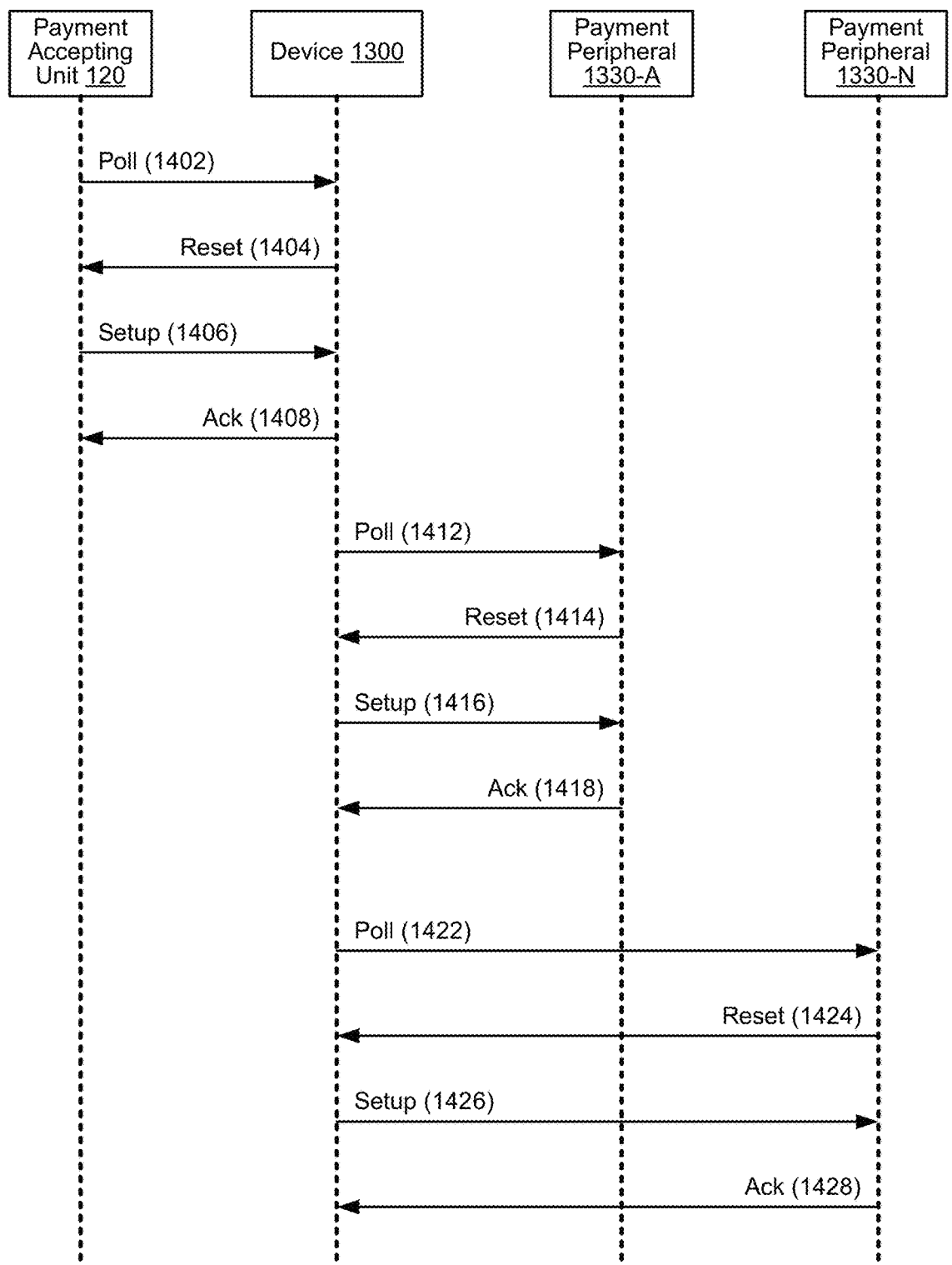
FIG. 27 is a schematic flow diagram of a payment peripheral registration process in accordance with some implementations.

FIG. 27 illustrates a schematic flow diagram of a payment peripheral registration process 1400 in accordance with some implementations. As a result of process 1400, the device 1300 is registered as a slave (e.g., a payment peripheral) to the payment accepting unit 120, and the one or more payment peripherals 1330 are registered as slaves to the device 1300, for example, in accordance with MDB protocol.

In some implementations, the payment accepting unit 120 (i.e., the payment accepting unit controller 1360, FIG. 26A) polls (1402) the device 1300.

In some implementations, in response to the poll command, the device 1300 sends (1404) a reset signal to the payment accepting unit 120. For example, the device 1300 sends the reset signal to the payment accepting unit 120 if it has not yet been registered as a slave (e.g., a payment peripheral). In another example, the device 1300 sends the reset signal to re-register itself as a slave. In some implementations, the device 1300 identifies itself as a coin acceptor, a bill acceptor, or a cashless payment device to the payment accepting unit 120 via the reset signal.

In some implementations, in response to the reset signal, the payment accepting unit 120 sends (1406) a setup signal to the device 1300. In some implementations, the setup signal includes an address assigned to the device 1300.

In some implementations, after receiving and processing the setup signal, the device 1300 sends (1408) an acknowledgement to the payment accepting unit 120 confirming registration as a slave.

In some implementations, the device 1300 polls (1412) the payment peripheral 1330-A.

In some implementations, in response to the poll command, the payment peripheral 1330-A sends (1414) a reset signal to the device 1300. For example, the payment peripheral 1330-A sends the reset signal to the device 1300 if it has not yet been registered as a slave (e.g., a payment peripheral) to the device 1300. In another example, the payment peripheral 1330-A sends the reset signal to re-register itself as a slave. In some implementations, the payment peripheral 1330-A identifies itself as a coin acceptor, a bill acceptor, or a cashless payment device to the device 1300 via the reset signal.

In some implementations, in response to the reset signal, the device 1300 sends (1416) a setup signal to the payment peripheral 1330-A. In some implementations, the setup signal includes an address assigned to the payment peripheral 1330-A.

In some implementations, after receiving and processing the setup signal, the payment peripheral 1330-A sends (1418) an acknowledgement to device 1300 confirming registration as a slave.

In some implementations, the device 1300 polls (1422) the payment peripheral 1330-N.

In some implementations, in response to the poll command, the payment peripheral 1330-N sends (1424) a reset signal to the device 1300. For example, the payment peripheral 1330-N sends the reset signal to the device 1300 if it has not yet been registered as a slave (e.g., a payment peripheral). In another example, the payment peripheral 1330-N sends the reset signal to re-register itself as a slave. In some implementations, the payment peripheral 1330-N identifies itself as a coin acceptor, a bill acceptor, or a cashless payment device to the device 1300 via the reset signal.

In some implementations, in response to the reset signal, the device 1300 sends (1426) a setup signal to the payment peripheral 1330-N. In some implementations, the setup signal includes an address assigned to the payment peripheral 1330-N.

In some implementations, after receiving and processing the setup signal, the payment peripheral 1330-N sends (1428) an acknowledgement to the device 1300 confirming registration as a slave.

Figure 28A:
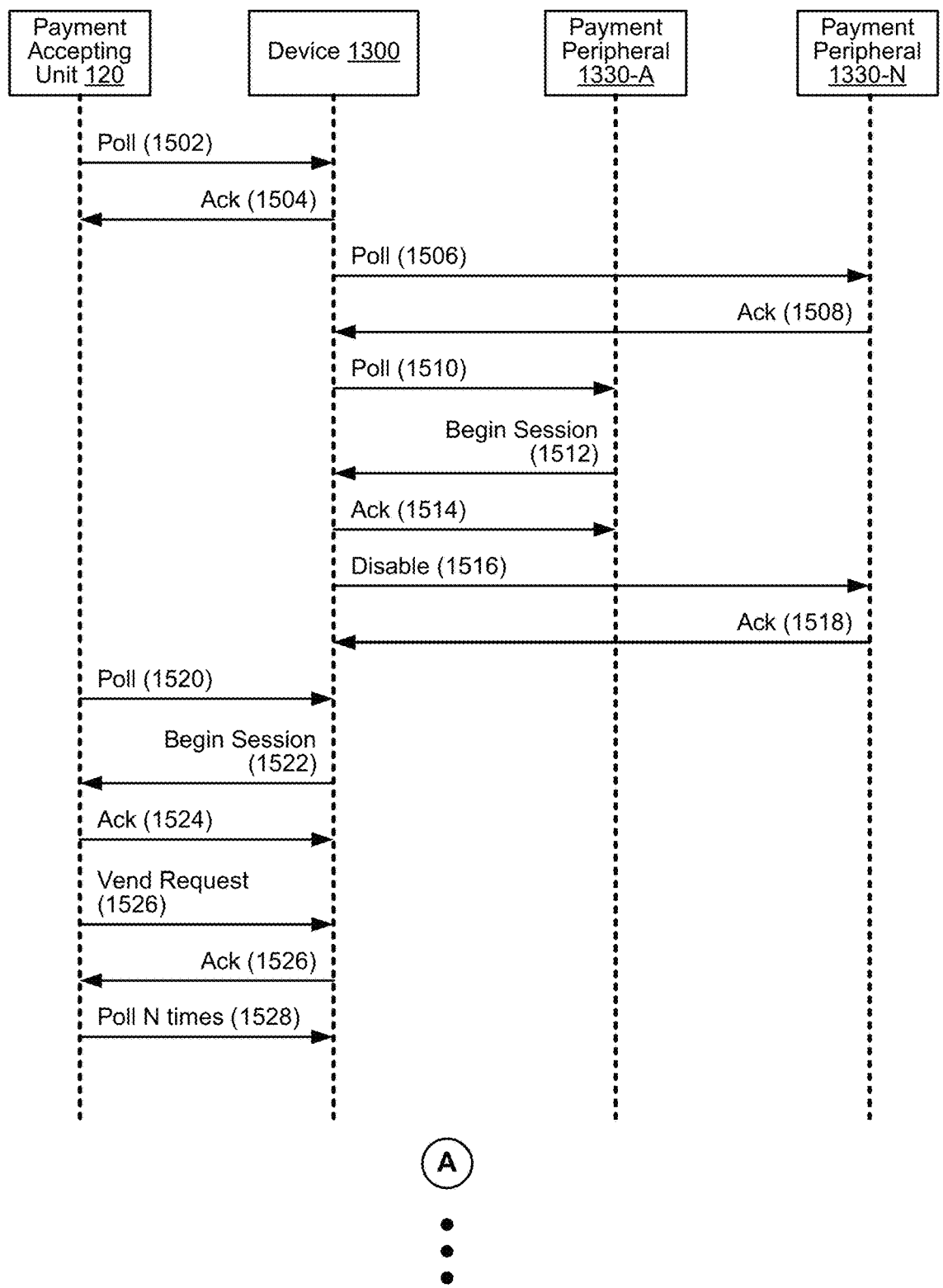
FIGS. 28A-28B illustrate a schematic flow diagram of a payment process in accordance with some implementations.
Figure 28B:
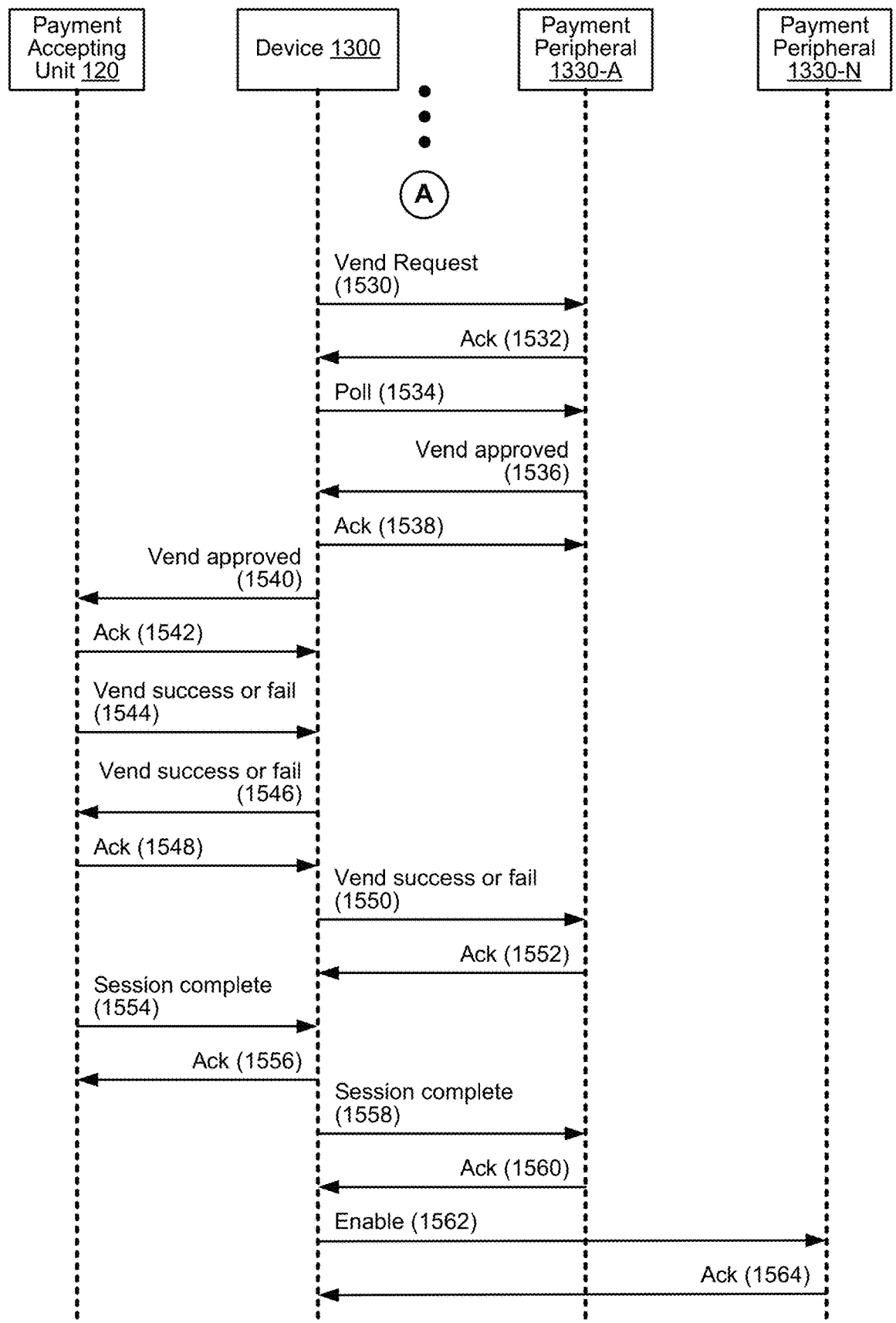
Figure 29A:
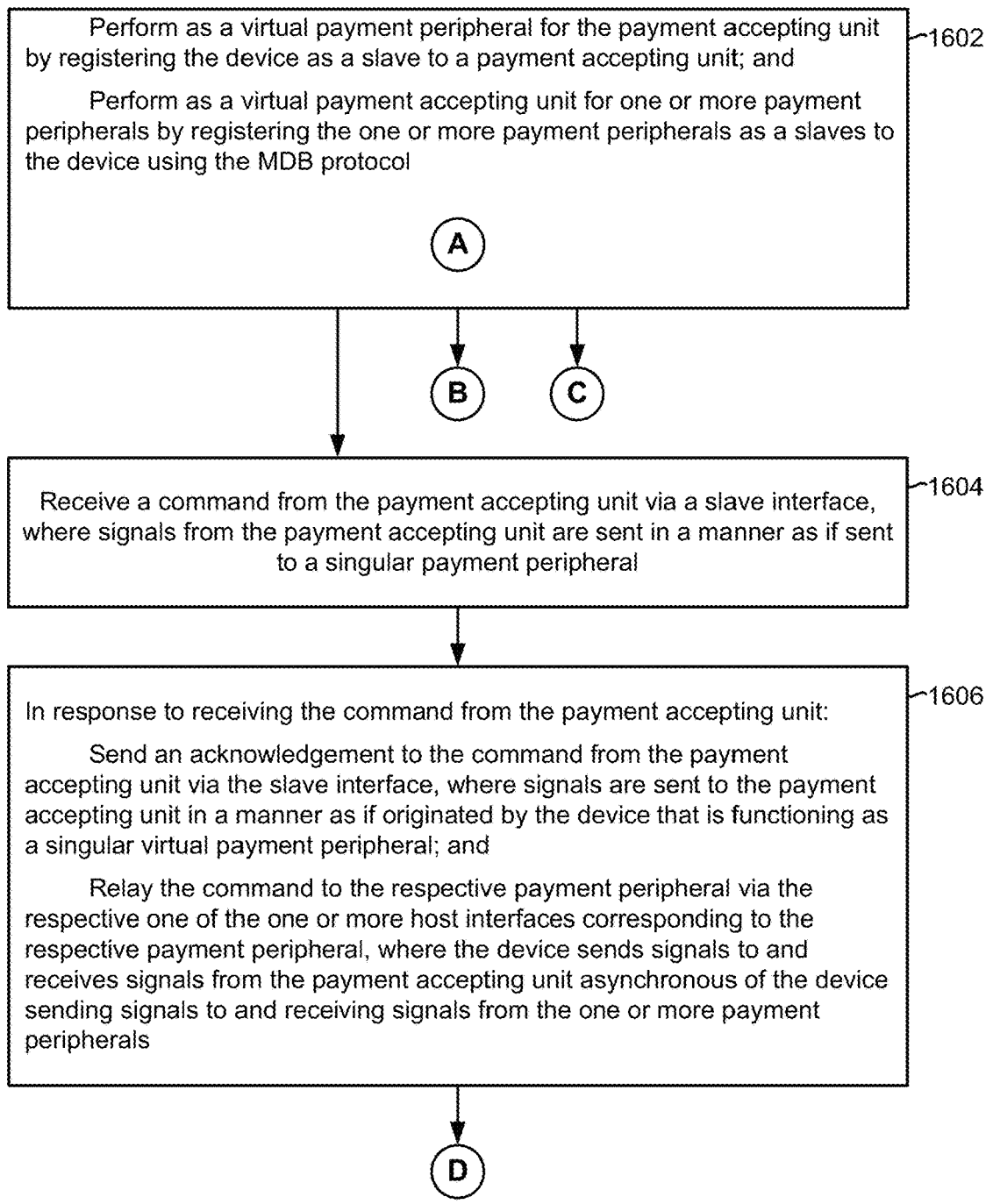
Figure 29B:
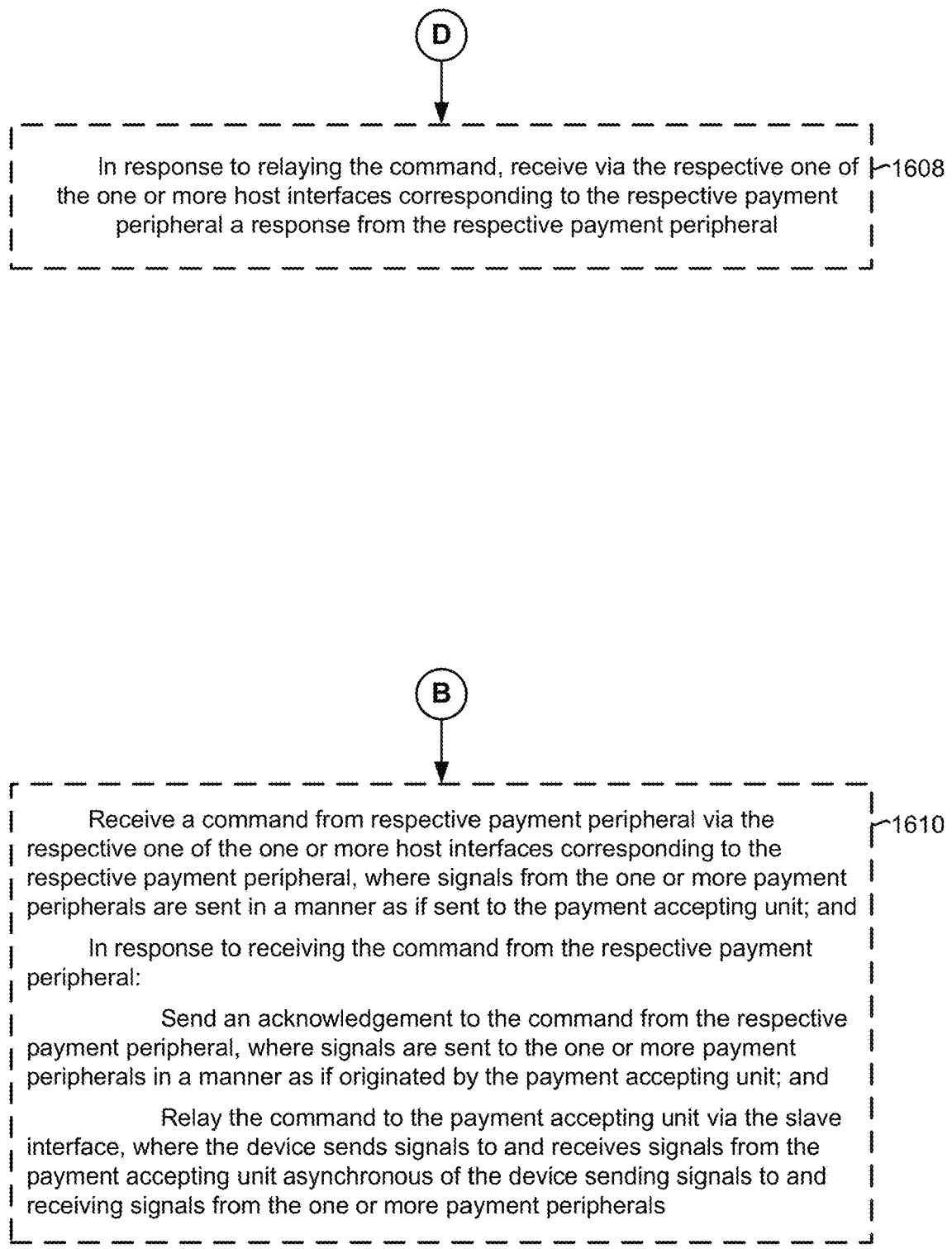
Figure 29C:
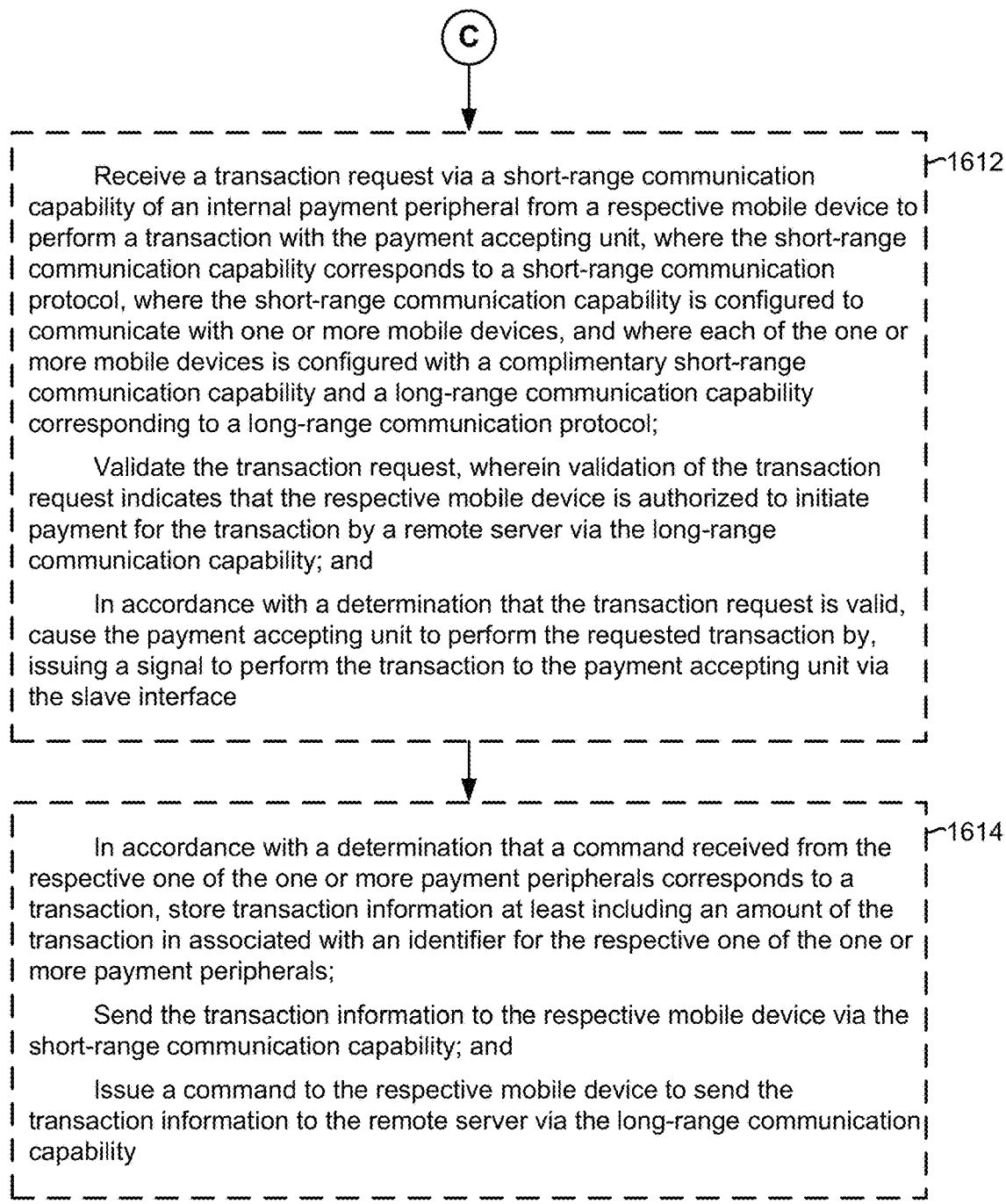

FIGS. 28A-28B illustrate a schematic flow diagram of a payment process 1500 in accordance with some implementations. In some implementations, device 1300 has already been registered as a slave (i.e., a payment peripheral) to payment accepting unit 120 and payment peripherals 1330-A, 1330-N have already been registered as slaves to device 1300 according to process 1400.

In some implementations, the payment accepting unit 120 polls the device 130, along with other payment peripherals connected to the MDB and registered as slaves (e.g., other payment peripherals 1350, 1355 (FIG. 26A)), according to a predetermined time period (e.g., 5 ms). For example, the predetermined time period is assigned by the MDB protocol or specification (e.g., versions 1.0 or 3.0 or higher), which is incorporated herein by reference in its entirety. In response to the poll commands, all slave devices (e.g., at least including the device 1300) respond with an acknowledgment (e.g., indicating that it is still present on the MDB) or with another signal (e.g., indicating another state). In some implementations, in response to a command from payment accepting unit 120, the device 1300 immediately responds to the command and asynchronously relays the command to at least one of the one or more payment peripherals 1330.

In some implementations, in a manner similar to the payment accepting unit 120, the device 1300 also polls all of the one or more payment peripherals 1330 according to the predetermined time period (e.g., 5 ms). For example, the device 1300 polls all of the one or more payment peripherals 1330 whenever it is polled by the payment accepting unit 120.

In some implementations, the payment accepting unit 120 (i.e., the payment accepting unit controller 1360, FIG. 26A) polls (1502) the device 1300.

In response to the polling command in operation 1502, the device 1300 sends (1504) an acknowledgment to the payment accepting unit 120.

In response to or independent of the polling command in operation 1502, the device 1300 also polls (1506) the payment peripheral 1330-N. In response to the polling command in operation 1506, the payment peripheral 1330-N sends (1508) an acknowledgment to the device 1300.

In response to or independent of the polling command in operation 1502, the device 1300 also polls (1510) the payment peripheral 1330-A. In response to the polling command in operation 1510, the payment peripheral 1330-A sends (1512) a request to begin a payment session. For example, the request to begin the payment session is sent in response to a user inserting payment (e.g., a bill(s) or coin(s)) into the payment peripheral 1330-A prior to the polling command in operation 1510.

In response to the request to begin the payment session, the device 1300 sends (1514) an acknowledgment to the payment peripheral 1330-A.

In response to the request to begin the payment session, the device 1300 also sends a disable command to the payment peripheral 1330-N so as to disable the payment peripheral 1330-N while processing the payment session for the payment peripheral 1330-A. In response to the disable command, the payment peripheral 1330-N sends (1518) an acknowledgment to the device 1300.

The payment accepting unit 120 (i.e., the payment accepting unit controller 1360, FIG. 26A) polls (1520) the device 1300.

In response to the polling command in operation 1520, the device 1300 sends (1522) a request to begin a payment session to the payment accepting unit 120. For example, the request to begin the payment session mirrors the request to begin the payment session received from the payment peripheral 1330-A.

In response to the request to begin the payment session in operation 1522, the payment accepting unit 120 sends (1524) an acknowledgment to the device 1300 and also sends (1526) a vend request to the device 1300. In process 1500, vending of a service or product is taken as a non-limiting example.

In response to receiving the vend request, the device 1300 sends (1528) an acknowledgment to the payment accepting unit 120.

In some implementations, the payment accepting unit 120 polls (1530) the device 1300 N times prior to sending the vend approved signal in operation 1540. In some implementations, the device 1300 responds to the N polling command with acknowledgments indicating that the device 1300 is still present and processing the vend request.

In response to receiving the vend request, the device 1300 also relays (1530) the vend request to the payment peripheral 1330-A.

In response to the vend request, the payment peripheral 1330-A sends (1532) an acknowledgement to the device 1300.

Subsequently, the device 1300 polls (1534) the payment peripheral 1330-A. In response to the polling command in operation 1534, the payment peripheral 1330-A sends (1536) a vend approved signal to the device 1300. For example, the vend approved signal indicates that the payment inserted by the user was not-refunded and was used to purchase a service or product.

In response to receiving the vend approved signal, the device 1300 sends (1538) an acknowledgment to the payment peripheral 1330-A and also relays (1540) the vend approved signal to the payment accepting unit 120.

In response to receiving the vend approved signal, the payment accepting unit 120 sends (1542) an acknowledgment to the device 1300 and also sends (1544) a request to the device 1300 to indicate whether the vend was a success or a failure.

In response to receiving the request in operation 1544, the device 1300 sends (1546) a response to the payment accepting unit 120 indicating that the vend was a success or a failure and also relays (1550) the request to the payment peripheral 1330-A to indicate whether the vend was a success or a failure.

In response to the request in operation 1550, the payment peripheral 1330-A sends (1552) an acknowledgement to the device 1300.

In response to receiving the response in operation 1546, the payment accepting unit 120 sends (1548) an acknowledgement to the device 1300 and also sends (1554) a command to end the payment session to the device 1300.

In response to receiving the command to end the payment session, the device 1300 sends (1556) an acknowledgment to the payment accepting unit 120 and relays (1558) the command to end the payment session to the payment peripheral 1330-A.

In response to the command to end the payment session, the payment peripheral 1330-A sends (1560) an acknowledgment to the device 1300.

After receiving the acknowledgment from the payment peripheral 1330-A, the device 1300 sends (1562) an enable command to the payment peripheral 1330-N so as to enable the payment peripheral 1330-N after completion of the payment session for the payment peripheral 1330-A. In response to the enable command, the payment peripheral 1330-N sends (1564) an acknowledgment to the device 1300.

FIGS. 29A-29D illustrate a flowchart diagram of a method 1600 retrofitting a payment accepting unit to accommodate a plurality of payment peripherals in accordance with some implementations. In some implementations, the method 1600 is performed by a device with one or more processors, memory, a slave interface configured to couple the device with the payment accepting unit via a multi-drop bus (MDB), and one or more host interfaces configured to couple the device with one or more payment peripherals, (e.g., a coin acceptor, a bill acceptor, a cashless payment device such as a payment card reader, and the like) where a respective payment peripheral is decoupled from an MDB interface of the payment accepting unit and coupled with a respective one of the one or more host interfaces, and where the one or more payment peripherals are configured to communicate via MDB protocol. For example, in some implementations, the method 1600 is performed by the device 1300 (FIG. 26A) or a component thereof (e.g., device controller 1310). In some implementations, the method 1600 is governed by instructions that are stored in a non-transitory computer readable storage medium (e.g., the memory 1314, FIG. 26A) and the instructions are executed by one or more processors (e.g., the processing unit 1312, FIG. 26A) of the device. Optional operations are indicated by dashed lines (e.g., boxes with dashed-line borders).

The device performs (1602) as a virtual payment peripheral for the payment accepting unit by registering the device as a slave to the payment accepting unit, and the device performs as a virtual payment accepting unit for the one or more payment peripherals by registering the one or more payment peripherals as a slaves to the device using the MDB protocol. In some implementations, the MDB protocol supports a limited number of payment peripherals. Device 1300 expands the number of payment peripherals connected to the payment accepting unit 120 beyond this limited number by emulating the payment accepting unit 120 to the one or more payment peripherals 1330 coupled with the one or more host interfaces 1320 and emulating a payment peripheral to the payment accepting unit 120. As such, in some implementations, the payment accepting unit 120 (i.e., the payment accepting unit controller 1360) views the device 1300 as another payment peripheral connected to the MDB, where the device 1300 sends signals to the payment accepting unit controller 1360 in a manner as if originated by the device 1300 that is functioning as a singular virtual payment peripheral. Moreover, in some implementations, the one or more payment peripherals 1330 view the device 1300 as the payment accepting unit controller 1360, where signals are sent to the one or more payment peripherals 1330 in a manner as if originated by the payment accepting unit controller 1360.

In some implementations, registering the device as a slave to the payment accepting unit further comprises (1616): identifying the device to the payment accepting unit as a cashless payment peripheral; and accepting registration of the device with the payment accepting unit as a cashless payment peripheral. For example, the device 1300 identifies itself to the payment accepting unit 120 as a cashless payment device (e.g., a payment card reader) when sending the reset signal to the payment accepting unit 120 in operation 1404.

In some implementations, registering the device as a slave to the payment accepting unit further comprises (1618): identifying the device to the payment accepting unit as a coin acceptor peripheral; and accepting registration of the device with the payment accepting unit as a coin acceptor peripheral. For example, the device 1300 identifies itself to the payment accepting unit 120 as a coin acceptor when sending the reset signal to the payment accepting unit 120 in operation 1404.

In some implementations, registering the device as a slave to the payment accepting unit further comprises (1620): identifying the device to the payment accepting unit as a bill acceptor peripheral; and accepting registration of the device with the payment accepting unit as a bill acceptor peripheral. For example, the device 1300 identifies itself to the payment accepting unit 120 as a bill acceptor/validator when sending the reset signal to the payment accepting unit 120 in operation 1404.

The device receives (1604) a command from the payment accepting unit via the slave interface, where signals from the payment accepting unit are sent in a manner as if sent to a singular payment peripheral. For example, with reference to process 1500, the payment accepting unit 120 sends a command to the device 1300 to end the payment session in operation 1554.

In response to receiving the command from the payment accepting unit, the device (1606): sends an acknowledgement to the command from the payment accepting unit via the slave interface, where signals are sent to the payment accepting unit in a manner as if originated by the device that is functioning as a singular virtual payment peripheral; and relays the command to the respective payment peripheral via the respective one of the one or more host interfaces corresponding to the respective payment peripheral, where the device sends signals to and receives signals from the payment accepting unit asynchronous of the device sending signals to and receiving signals from the one or more payment peripherals. Continuing with the example above, with reference to process 1500, in response to receiving the command to end the payment session, the device 1300 sends an acknowledgment to the payment accepting unit 120 in operation 1556 in a manner as if originated by the device that is functioning as a singular virtual payment peripheral. Continuing with this example, in response to receiving the command to end the payment session, the device 1300 also asynchronously relays the command to end the payment session to the payment peripheral 1330-A in operation 1558. As such, the command is relayed to the payment peripheral 1330-A asynchronous of sending the acknowledgment to the payment accepting unit 120.

In some implementations, in response to relaying the command, the device receives (1608) via the respective one of the one or more host interfaces corresponding to the respective payment peripheral a response from the respective payment peripheral. Continuing with the example above, with reference to process 1500, in response to the relayed complete session command, the payment peripheral 1330-A sends an acknowledgment to the device 1300 in operation 1560.

In some implementations, in response to receiving the response from the respective payment peripheral, the device: sends an acknowledgement to the respective payment peripheral, where signals are sent to the one or more payment peripherals in a manner as if originated by the payment accepting unit; and relays the response to the payment accepting unit via the slave interface, where the device sends signals to and receives signals from the payment accepting unit asynchronous of the device sending signals to and receiving signals from the one or more payment peripherals. In some implementations, in response to receiving the response from the respective payment peripheral, the device forgoes the above steps.

In some implementations, the device receives (1610) a command from respective payment peripheral via the respective one of the one or more host interfaces corresponding to the respective payment peripheral, where signals from the one or more payment peripherals are sent in a manner as if sent to the payment accepting unit, and, in response to receiving the command from the respective payment peripheral, the device: sending an acknowledgement to the command from the respective payment peripheral, where signals are sent to the one or more payment peripherals in a manner as if originated by the payment accepting unit; and relaying the command to the payment accepting unit via the slave interface, where the device sends signals to and receives signals from the payment accepting unit asynchronous of the device sending signals to and receiving signals from the one or more payment peripherals. For example, with reference to process 1500, when polled in operation 1534, the payment peripheral 1330-A sends a vend approved signal to the device 1300 in a manner as if sent to the payment accepting unit 120 in operation 1536. Continuing with this example, in response to receiving the vend approved signal, the device 1300 sends an acknowledgement to the payment peripheral 1330-A in a manner as if originated by the payment accepting unit 120 in operation 1538. Continuing with this example, in response to receiving the vend approved signal, the device 1300 also asynchronously relays the vend approved signal to the payment accepting unit 120 in operation 1540. As such, the command is relayed to the payment accepting unit 120 asynchronous of sending the acknowledgment to the payment peripheral 1330-A.

In some implementations, the device further includes an internal payment peripheral including a short-range communication capability corresponding to a short-range communication protocol, where the short-range communication capability is configured to communicate with one or more mobile devices, and where each of the one or more mobile devices is configured with a complimentary short-range communication capability and a long-range communication capability corresponding to a long-range communication protocol. For example, with reference to FIG. 26A, the device 1300 includes the internal payment peripheral 1340 which includes hardware, software, firmware, or a combination thereof for providing the payment processing functionalities discussed in FIGS. 7, 8A-8G, 9A-9E, and 23 (e.g., the security unit 755 and the communications unit 770 as shown in FIG. 20). For example, the respective mobile device corresponds to mobile device 150 (FIG. 21) with long-range communication capability 872 and short-range communication capability 876.

In some implementations, the device receives (1612) a transaction request via the short-range communication capability from a respective mobile device to perform a transaction with the payment accepting unit, validates the transaction request, where validation of the transaction request indicates that the respective mobile device is authorized to initiate payment for the transaction by a remote server via the long-range communication capability, and, in accordance with a determination that the transaction request is valid, causing the payment accepting unit to perform the requested transaction by, issuing a signal to perform the transaction to the payment accepting unit via the slave interface. In some implementations, the device 1300 or a component thereof (e.g., internal payment peripheral 1340, FIG. 26A) receives a transaction request via the short-range communication capability (e.g., BLE, NFC, or the like) from the respective mobile device 150 (FIGS. 7, 8A-8G, 9A-9E, and 21), and the device 1300 or a component thereof (e.g., internal payment peripheral 1340, FIG. 26A; or the device controller 1310, FIG. 26A) validates the transaction request from the respective mobile device 150 by determining whether an AuthGrant or authorization grant token associated with the transaction request includes a valid authorization code. In some implementations, in accordance with a determination that the transaction request is associated with a valid authorization code, the device 1300 or a component thereof (e.g., internal payment peripheral 1340, FIG. 26A; or the device controller 1310, FIG. 26A) issues a command to the payment accepting unit 120 to perform the requested transaction by via the slave interface 1302 in a manner as if originated by the device 1300 that is functioning as a singular virtual payment peripheral.

In some implementations, in accordance with a determination that a command received from the respective one of the one or more payment peripherals corresponds to a transaction, the device stores (1614) transaction information at least including an amount of the transaction in associated with an identifier for the respective one of the one or more payment peripherals; after storing the transaction information, sends the transaction information to the respective mobile device via the short-range communication capability; and issues a command to the respective mobile device to send the transaction information to the remote server via the long-range communication capability. In some implementations, the device 1300 or a component thereof (e.g., the internal payment peripheral 1340, FIG. 26A; or the device controller 1310, FIG. 26A) monitors commands and signals from the one or more payment peripherals 1330 that are relayed to the payment accepting unit 120 and, in accordance with a determination that the command and signals are associated with transactions, stores transaction information such as the transaction amount and the respective payment peripheral 1330 associated with the transaction. For example, the device 1300 stores transaction information for each of the one or more payment peripherals 1330 in a table that associates the transaction information with a payment peripheral type (e.g., bill acceptor, coin acceptor, payment card reader, etc.). In some implementations, the device 1300 or a component thereof (e.g., the internal payment peripheral 1340, FIG. 26A; or the device controller 1310, FIG. 26A) sends the table of transaction information or a portion thereof to the respective mobile device 150 that sent the transaction request (or another mobile device 150 that performs a transaction with the device 1300) via the short-range communication capability. In some implementations, the device 1300 or a component thereof (e.g., the internal payment peripheral 1340, FIG. 26A; or the device controller 1310, FIG. 26A) commands the respective mobile device 150 to send the table of transaction information or the portion thereof to the server 130 via its long-range communication capability. As such, the device 1300 uses the respective mobile device 150 as a communication bridge to the server 130.

In some implementations, the device 1300 or a component thereof (e.g., the internal payment peripheral 1340, FIG. 26A; or the device controller 1310, FIG. 26A) also monitors the commands and signals from the one or more payment peripherals 1330 that are relayed to the payment accepting unit 120 and, in accordance with a determination that the command and signals are associated with error codes (e.g., a coin jam, low coin or bill count, etc.) and other information associated with the operation of the one or more payment peripherals 1330, stores corresponding operation information. In some implementations, the device 1300 also sends the operation information along with the table the table of transaction information or the portion thereof to the server 130.

In some implementations, the payment accepting unit further includes one or more other payment peripherals coupled with the MDB, a respective payment peripheral of the one or more other payment peripherals is one of a bill acceptor, coin acceptor, or payment card reader, and where the device further includes an additional interface configured to couple the device with the one or more other payment peripherals of the payment accepting unit. For example, with reference to FIG. 26A, the other payment peripheral(s) 1350 (e.g., acceptors, coin acceptors, payment card readers, etc.) are connected to the MDB before the device 1300 (e.g., prior to the slave interface 1302) and the other payment peripheral(s) 1355 (e.g., acceptors, coin acceptors, payment card readers, etc.) are connected to the MDB after the device 1300 (e.g., after the additional interface 1304).

In some implementations, the device further includes a pass-through channel, the pass-through channel is configured to pass-through signals from the one or more other payment peripherals to the payment accepting unit. For example, with reference to FIG. 26A, the device 1300 includes a pass-through channel to enable signals from the payment accepting unit controller 1360 to reach the other payment peripheral(s) 1355 and to enable signals from other the payment peripheral(s) 1355 to reach the payment accepting unit controller 1360.

It should be understood that the particular order in which the operations in FIGS. 29A-29D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to the method 1600 described above with respect to FIGS. 29A-29D.

Refunds Processing

FIGS. 30A-30G provide example user interfaces for preparing and dispensing refunds from payment accepting unit (including from unattended vending machines). In some implementations, the user interfaces or a subset or superset thereof, can be generated and displayed by software executing on a refund processing device 2630 and/or a mobile device 150 (FIG. 26B). In some implementations, the user interfaces can be displayed within the PayRange (trademark of PayRange Inc.) application and/or within a dedicated Refund Center application (described in reference to FIGS. 30A-G and 31A-B) that is used specifically to request and provide information for refunds. In particular, the sequence of example user interfaces shown in FIGS. 30A-30G illustrates user interactions in some implementations with a tablet device 3002 with a touch sensitive display (or other type of device or an application executing on a mobile phone, such as the PayRange (trademark of PayRange Inc.) application) to receive a refund code (e.g., by requesting a refund through a user interface 3004 provided in FIG. 30A). The same or similar user interactions/interfaces can also be implemented on other device types with different user interfaces via operations of refund software executing thereon. The flow of FIGS. 30A-30G also illustrates for some implementations the coordination of operations of the refund processing device 2630 (such as the tablet device 3002) and servers 2620 (including the refund processing server 2622 in some implementations) by which a refund request is processed.

Figure 30A:
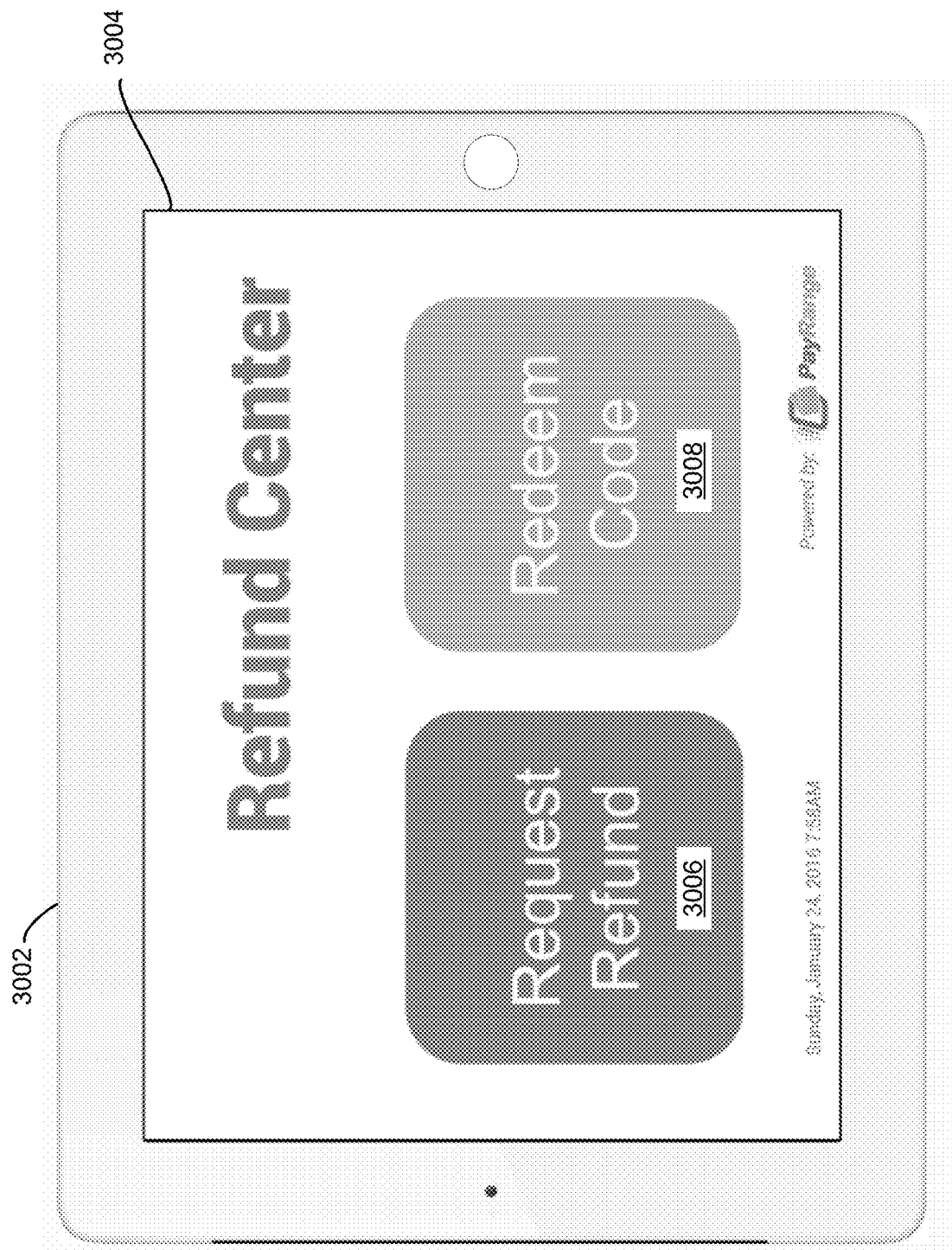
FIGS. 30A-30G provide example user interfaces for processing and dispensing refunds using a refund center.

Referring to FIG. 30A, in some implementations, the interface 3004 displayed by the tablet device 3002 provides user selectable interface elements (sometimes referred to as "affordances") to allow a user to request a refund (3006) and to redeem a refund code (3008).

Figure 30B:
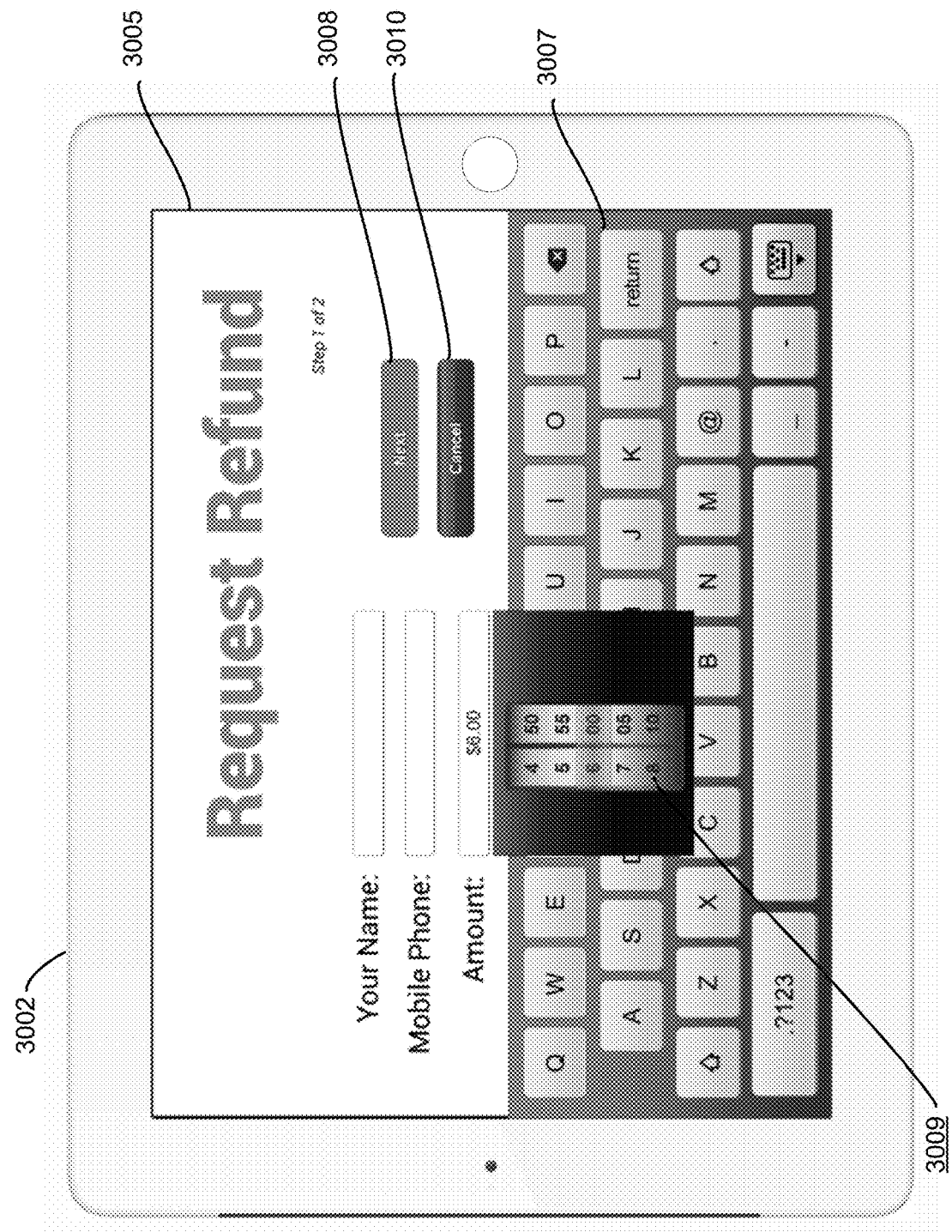

Referring to FIG. 30B, in some implementations, a user interface 3005 is displayed by the tablet device 3002 in response to user selection of the "Request Refund" interface element 3006 of FIG. 30A. In some implementations, The user then enters his/her name, mobile phone number, and a requested refund amount using one or more user interface elements provided by the user interface 3005 (e.g., without limitation, a keyboard 3007 and/or scroll wheel 3009). In some implementations, "Next" and "Cancel" user interface elements 3008, 3010 are provided to allow a user to proceed with the refund request once the refund information (e.g., name, mobile phone number and requested refund amount) has been entered, or to cancel the refund request.

Figure 30C:
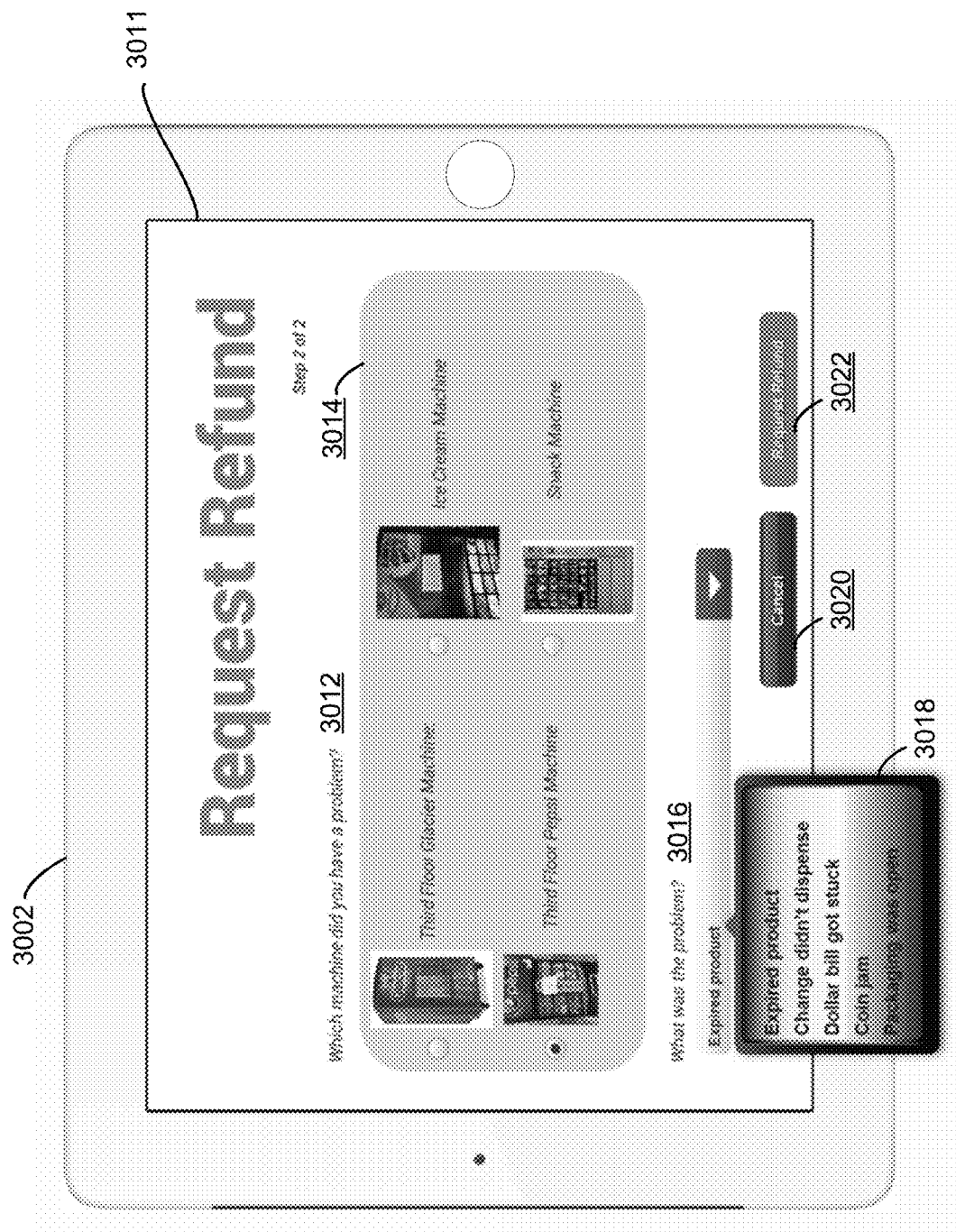

Referring to FIG. 30C, in some implementations, a user interface 3011 is provided by the tablet 3002 through which the user also provides a brief description of the reason for his/her refund request and a machine at which the problem was encountered. In some implementations, the user interface includes a prompt 3012 asking from "Which machine did you have a problem?" and a visual display 3014 of possible machines for which a refund can be obtained by the user. In some implementations, the possible machines are those vending machines located in proximity to the known user's location, which can be determined from a known location of the tablet 3002 and/or of the user's mobile device. In some implementations, the visual display 3014 includes names and/or realistic depictions/appearances of the machines to assist user identification of the correct machine. In some implementations, the user interface 3007 includes a prompt asking "What was the problem?" and a user interface element to allow the user to indicate the problem that triggered the refund request. In some implementations, the user interface provides a user interface element 3018 (such as a scroll wheel, as illustrated) that is populated with a collection of user selectable problem options. In some implementations, "Cancel" and "Request Refund" user interface elements 3020, 3022 are provided to allow the user to cancel his/her refund request or to proceed.

Figure 30D:
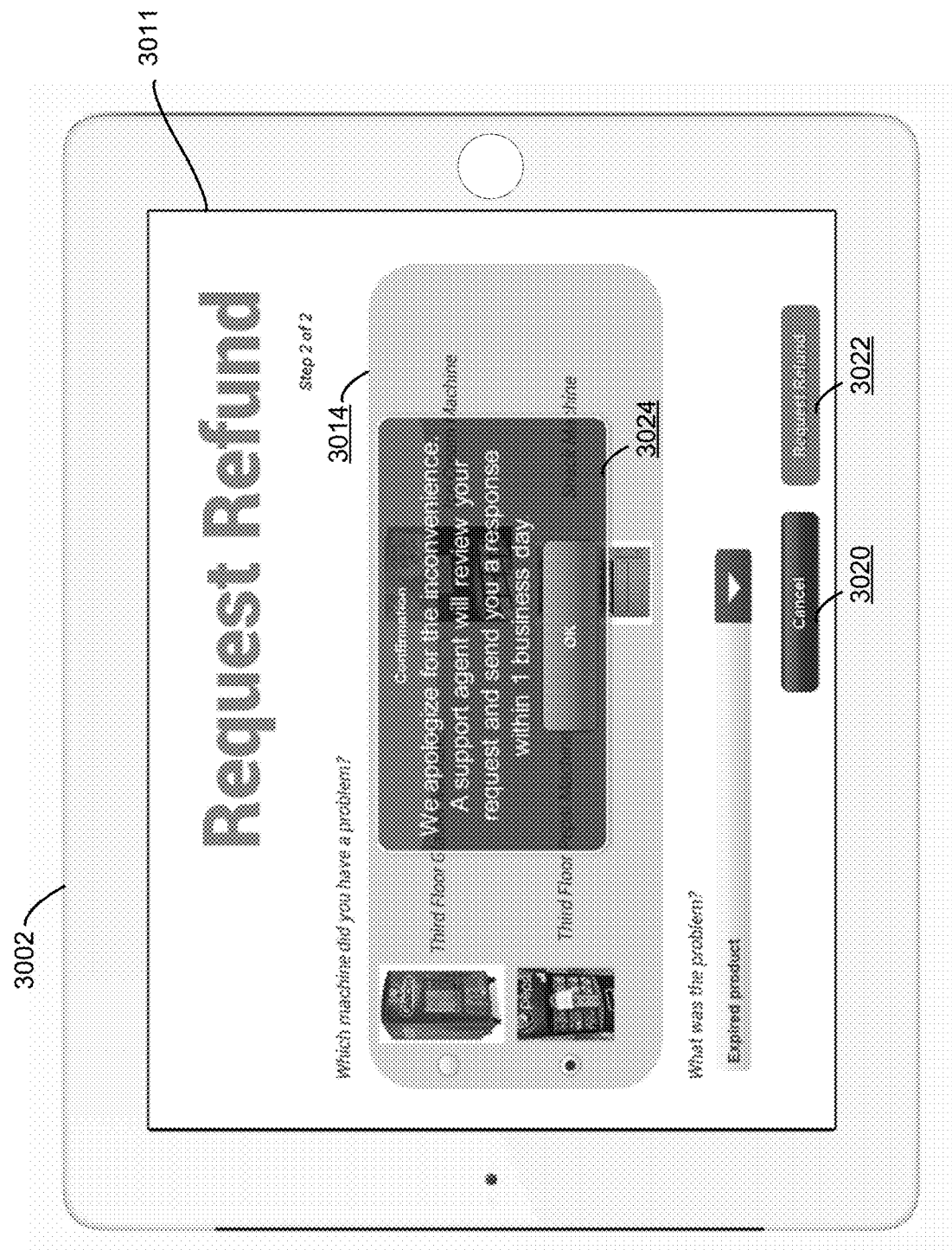

In some implementations, in response to user selection of the "Request Refund" interface element 3022, a dialog 3024 is presented on the user interface 3011 that instructs the user that the refund request will be reviewed and he/she will receive a response with a period of time (e.g., 1, 2, or 3 days, or a longer or shorter period of time), as shown in FIG. 30D. In some implementations, the response will include a refund code sent to the user by the refund processing server 2622 (e.g., without limitation, through a text message, an in-app message, and/or email) or displayed by a user interface provided by the refund processing device 2630 or the user's mobile device 150 (e.g., in the PayRange (trademark of PayRange Inc.) application or a Refund Center application).

Figure 30E:
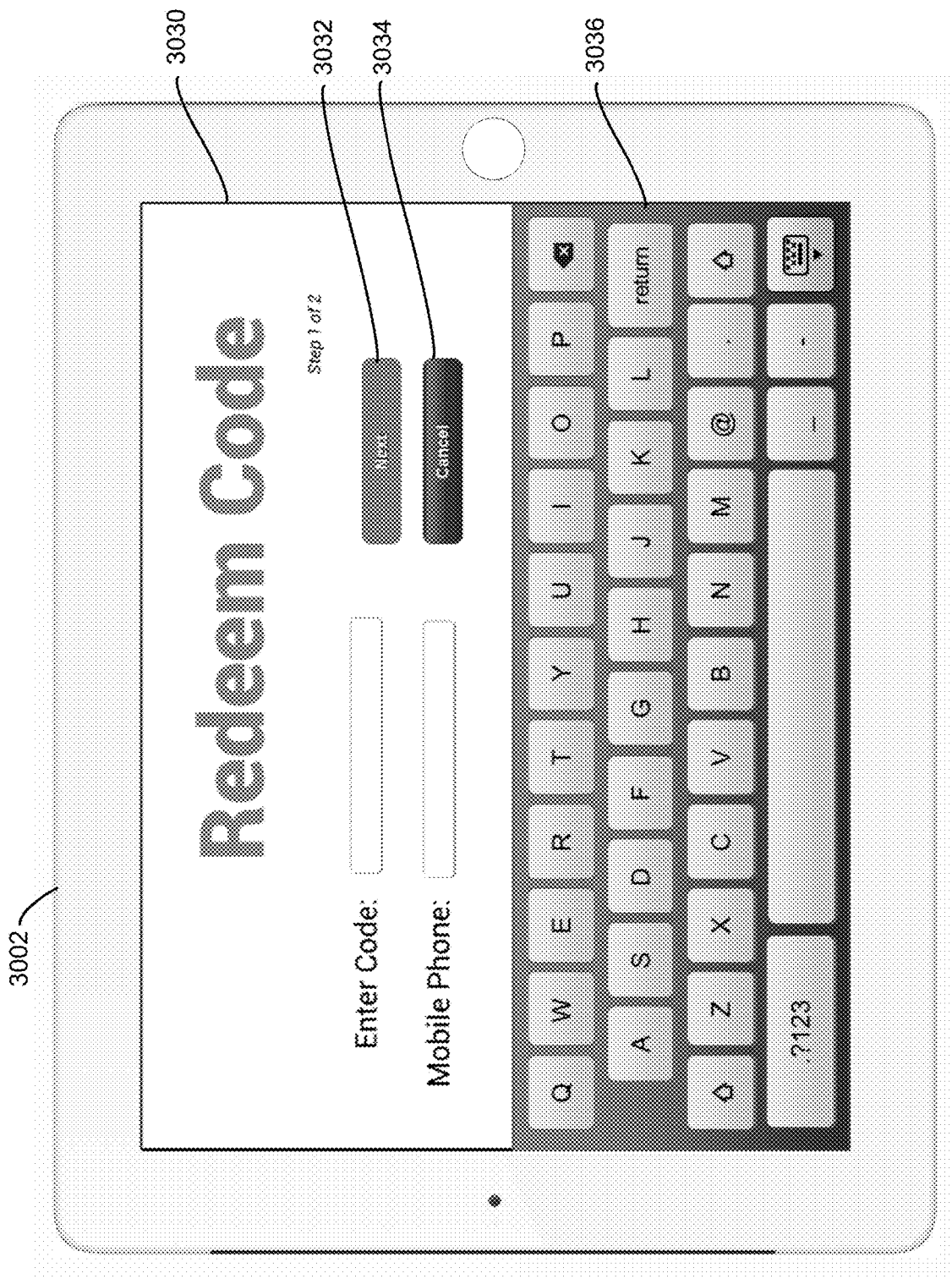

Referring to FIG. 30E, in some implementations, in response to user selection of the "Redeem Code" user interface element 3008 of FIG. 30A, a user interface 3030 is provided by the tablet 3002. The user enters a refund code and his/her mobile phone number (FIG. 30E) after having received the refund code via a server 2620, in order to redeem that code (e.g., for a monetary refund dispensed by an unattended machine located proximate to the tablet device). In some implementations, one or more user interface elements (e.g., a keyboard 3036) are provided to allow the user to enter the requested information. In some implementations, "Next" and "Cancel" user interface elements 3032, 3034 are provided to allow the user to proceed or to cancel his/her refund request.

Figure 30F:
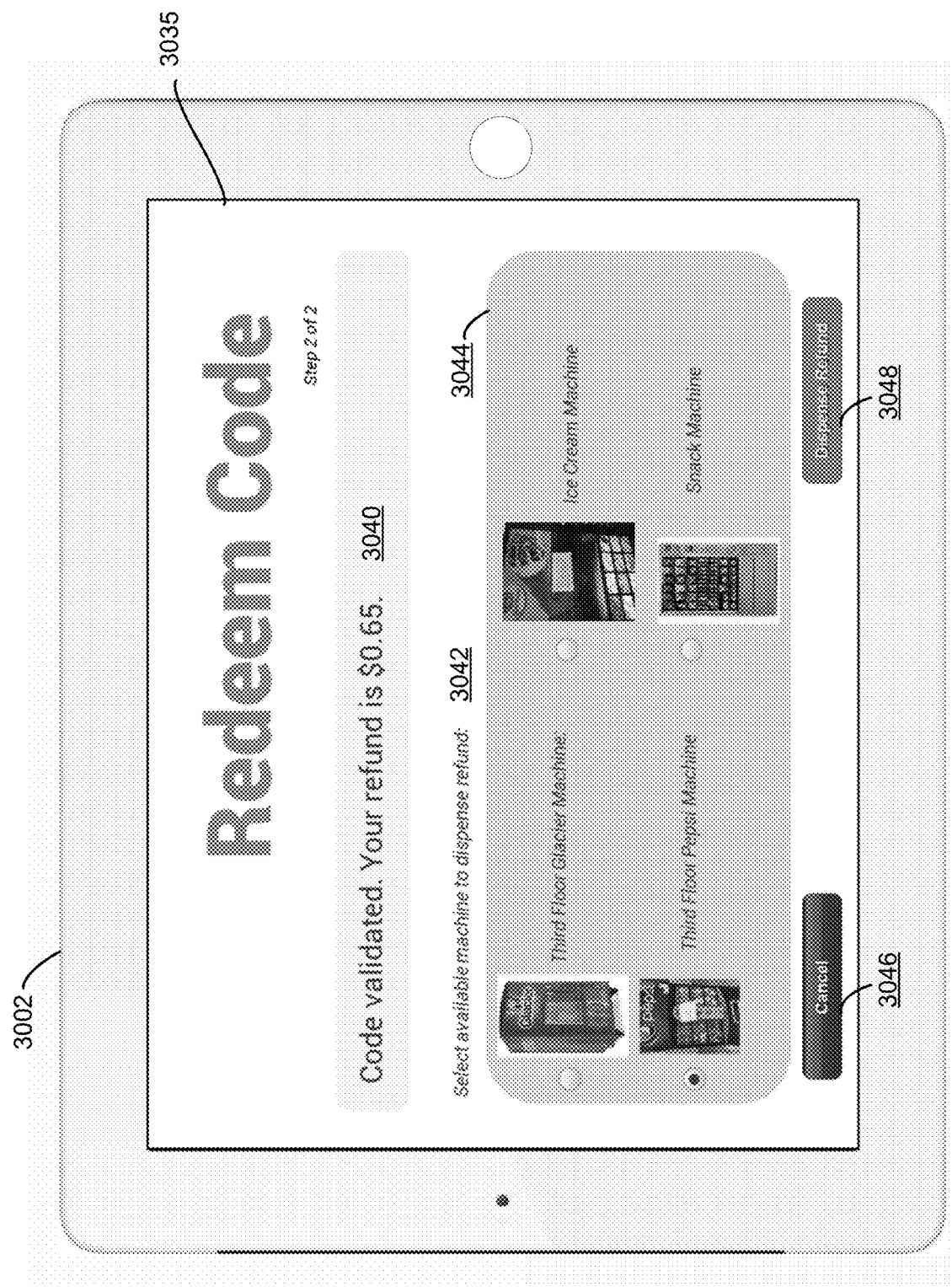

Referring to FIG. 30F, in some implementations, the refund code that was received via the user interface 3030 (FIG. 30D) is then validated (e.g., via a server 2620) and the tablet device 3002 displays a user interface 3035 summarizing the refund amount 3040 and allowing the user to select an unattended machine at which to receive the refund 3042. In some implementations, the machines that are available for selection to dispense the refund are shown in a visual display 3044 that includes names and/or realistic depictions/appearances of those machines. In some implementations, "Cancel" and "Dispense Refund" user interface elements 3046, 3048 are provided to allow the user to cancel his/her refund request or to dispense the refund.

Figure 30G:
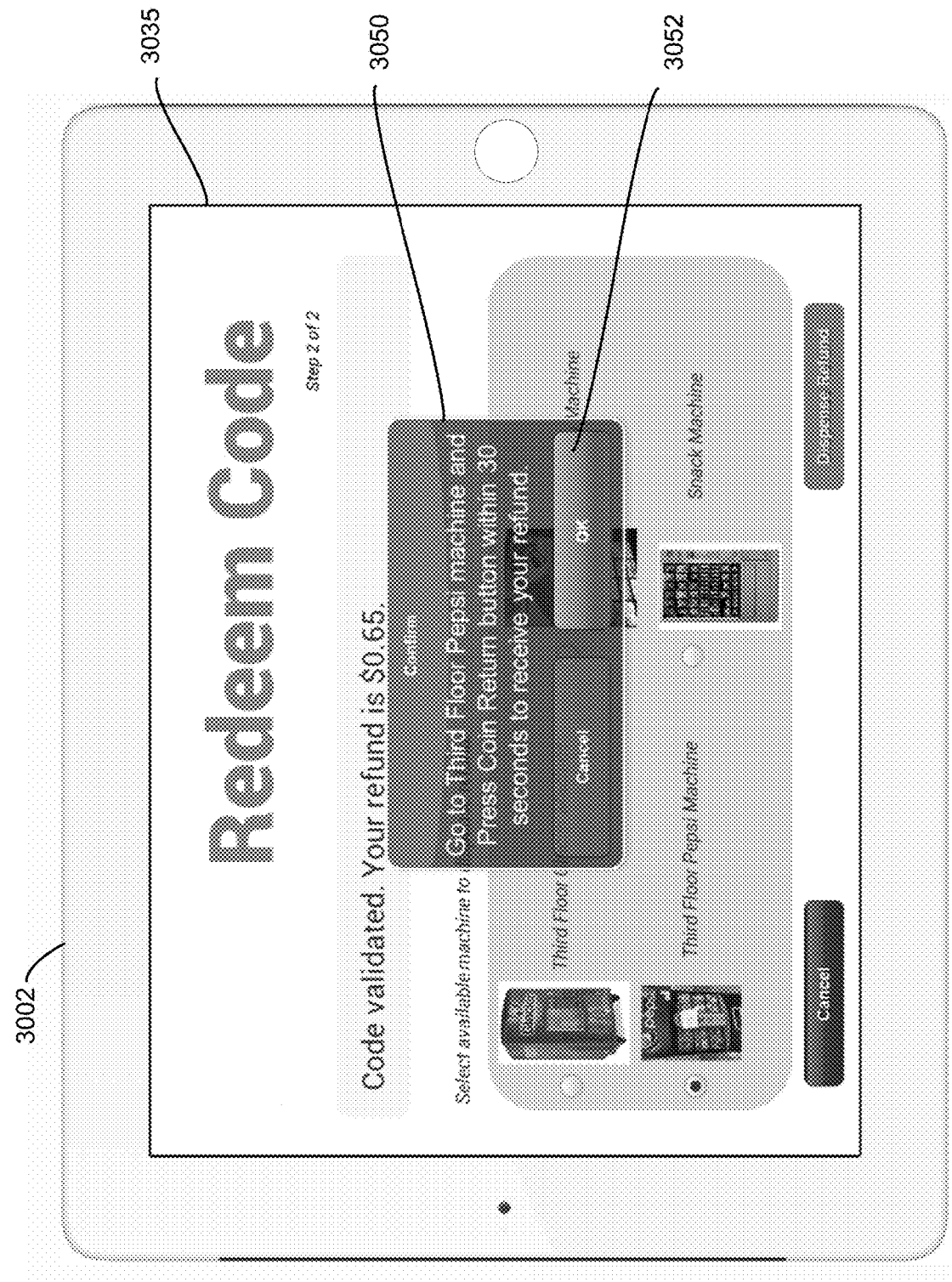

Referring to FIG. 30G, in some implementations, after the user selects an unattended machine at which to receive the refund 3044, a user interface is presented 3050 that instructs the user to perform a condition to complete the return. For example, the user is directed to press a coin return button at the selected machine within a predefined amount of time (e.g., 30 seconds) in order to receive the refund (as shown in FIG. 30G). A user can also be directed to engage (e.g., press or swipe) a button or other control of the selected machine, such that the engagement can be identified by the payment module (e.g., an engagement that can be identified by a message sent via an MDB bus). In some implementations, a user starts a timer for the predefined amount of time by selecting a user element (e.g., the "OK" button 3052) provided by the user interface 3050. In some implementations, the refund processing device 2630 in cooperation with the servers 2620 monitor user completion of conditions (such as entry of a valid code and pressing the coin return button in the required time) to determine whether the refund will be authorized and issued. The refund processing device 2630 then issues instructions to the payment module 100 as described herein to cause the selected vending machine (i.e., payment accepting unit) to dispense the requested refund (e.g., as coins or bills).

Figure 31A:
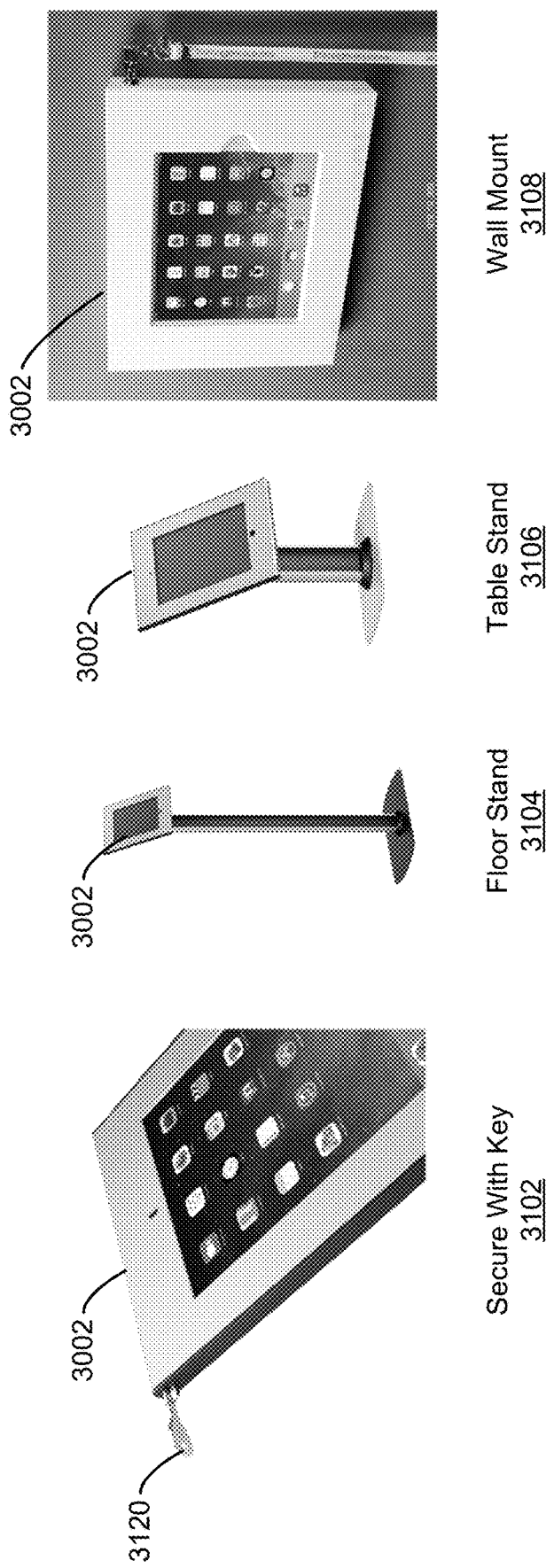
FIGS. 31A-31B provide examples of mounting options for a component (e.g., a table device) of a refund center used for processing and dispensing refunds for vending machines.
Figure 31B:

FIGS. 31A-31B provide examples of mounting options for a component (e.g., a tablet device 3002 or similar device with a user interface that provides a user display and user information entry options) of a refund center used for processing and dispensing refunds for vending machines. Different mounting options include securing 3102 a tablet device 3002 to a support via a secure physical key 3120 (3102). Possible mounting supports include a floor stand (3104), a table stand (3106), and a wall mount (3108). In some refund center implementations, the user interfaces described with reference to FIGS. 30A-G are displayed in context of a "Refund Center" application executed by the tablet device 3002 (or alternative computing device). As mentioned above, in some implementations an application executing on a mobile device (e.g., a mobile device 150) is used instead of a separate tablet device/refund center 3002.

Referring to FIG. 31B, in some implementations, the refund processing and dispensing discussed above is provided by having a tablet 3002 providing a touch sensitive display/user interface 3060 secured to a wall (FIG. 31B) near a bank of unattended machines (e.g., vending machines). In some implementations, each vending machine is equipped with a MDB router payment module (e.g., the payment module 100 pictured and discussed in reference to FIGS. 26A-26B). As discussed above in reference to FIGS. 30A-30G, a user requests a refund at a "Refund Center" tablet 3002; support personnel review the request and send code to the requesting user via a text; the user enters code in the Refund Center and selects an available machine to dispense change. In some implementations, the tablet sends a message to a server for authentication and sends an encrypted payload to a MDB router payment module secured with private unique key (e.g., the unique identifier corresponding to the payment module 100). The user then walks to the selected machine equipped with the MDB router payment module and presses a coin return button (as directed, on the user interface 3060) and the preapproved refund dispenses. Alternatively, a user may enter a refund code (and perform all of the refund steps discussed above in reference to FIGS. 30A-30G) at an application executing on their personal mobile phone (e.g., the PayRange (trademark of PayRange Inc.) application).

In some implementations, the tablet 3002 connects via Wifi or other network connection to the Internet. In some implementations, when a refund code is requested, it is sent to one or more servers (e.g., controlled by a payment processing provider, such as PayRange (trademark of PayRange Inc.), the refund processing server 2622 and/or the servers 2620) for authentication. There, the request can be auto-approved and a code can be sent back, or the request can be sent to customer support for further investigation before issuing the refund code (based on underwriting heuristics).

In some implementations, the refund code sent to the payment module is encrypted with a unique payment module device key (e.g., the unique identifier corresponding to the payment module 100). In some implementations, the mobile application running on a mobile device used at certain locations can have "location mode" enabled and issue refund codes locally. Thus, at such locations, refund can be issued directly without need for tablet. After the user selects a machine for which a refund can be obtained by the user, a secure, encrypted payload is sent from the mobile device via short-range network to the payment module, where the payment module is coupled with the selected machine. The user then goes to the selected machine and presses the coin return button. This causes the selected machine to dispense the change based on the encrypted payload it received from the mobile device. If the coin return button is not pressed within a certain time frame (e.g., 30 seconds), the refund is cancelled. In some implementations, when the refund is paid, a confirmation is routed via short-range network to the mobile device, and the mobile device uploads the confirmation to a server (e.g., the refund processing server 2622 and/or the servers 2620) via long-range network.

Other features of the refund processing and dispensing discussed above include: the payment module 100 can monitor the coin acceptor's status and health. In some implementations, if the machine has a coin jam, for example, the MDB router of the payment module 100 would not take the coin acceptor off-line for refund purposes. When the module is taken off-line, it changes its status in the broadcast and the refund center is aware of the status via the broadcast. Also, if the coin level is low, the MDB router of the payment module 100 will take the coin acceptor off-line for refund purposes, but could still allow the coin acceptor to function for vending transactions. In some implementations, the refund code can be entered in the mobile application and be used to establish a balance. A user can opt to use the mobile app to make a purchase directly with payment module instead of going through refund center. In some implementations, the refund center can periodically poll and connect to the payment modules in range via short-range communications and then upload via long-range communications any alerts/status information, transactions that may be pending, processing pending firmware updates, and the like.

In some implementations, unattended machines that coupled with the payment module 100 described herein can also issue cash for additional reasons (besides just refunds). For example, a machine can issue cash withdrawals from a user's account that is linked with the payment processing systems discussed herein (e.g., to receive money in addition to or instead of receiving just an item stocked by a vending machine).

In some implementations, refunded amounts can be added back to a user's account (e.g., instead of processing a physical cash refund at a vending machine).

In some implementations, a user can also insert cash (e.g., coin or bills) in a vending machine and have that cash added to their account (in order to add funds for use in future transactions).

In some implementations, refunds can be processed for any type of unattended machine (e.g., not just those equipped with a payment module 100). For example, if a user did not receive a requested item from a first vending machine (one that is not equipped with payment module 100), then the user can request a refund and receive that refund at a second vending machine that is distinct from the first vending machine (the second machine is equipped with a payment module 100).

In some implementations, the methods and operations and associated user interfaces associated with processing and dispensing refunds from a payment accepting unit described above (or subsets or supersets of those methods, operations and user interfaces) are performed by or displayed at one or more of the refund processing device 2630; mobile device 150; payment module 100, payment accepting unit 120, and one or more servers 2602 (FIG. 26B). Various of these methods and operations are described below—designated for convenience without any specific requirement as to ordering with identifiers M1-M7.

In particular, in some implementations, a method (M1) of processing and dispensing refunds from a payment accepting unit (e.g., an unattended vending machine) with one or more payment peripherals is performed at an electronic payment module with one or more processors, memory, a slave interface that couples the electronic payment module with the payment accepting unit via an electronic payment interface (such as a multi-drop bus (MDB)), and one or more host interfaces that couple the electronic payment module with at least one payment peripheral of the unattended payment accepting unit, the method including: performing as a virtual payment peripheral for the payment accepting unit by registering the device as a slave to the payment accepting unit; performing as a virtual payment accepting unit for the at least one payment peripheral of the payment accepting unit by registering the at least one payment peripheral as a slave to the electronic payment module; receiving, from a device that is distinct from the electronic payment module, a request to issue an approved refund of a predetermined amount and one or more criteria that must be satisfied before dispensing the approved refund of the predetermined amount; and in accordance with a determination that the one or more criteria are met, issuing (i) a signal to the payment accepting unit, via the slave interface, that the at least one payment peripheral is unavailable and (ii) a signal to the at least one payment peripheral, via the one or more host interfaces, to dispense the approved refund of the predetermined amount.

(M2) In some implementations of the above method M1, the one or more criteria include a criterion that is met when a user actuates a coin return button of the payment accepting unit within a predefined period of time relative to the receiving of the request to issue the approved refund.

(M3) In some implementations of any of the above methods M1-M2, the method further includes, after dispensing the approved refund of the predetermined amount, issuing a signal to the payment accepting unit, via the slave interface, that the at least one payment peripheral is available and reporting that the predetermined amount was dispensed.

(M4): In some implementations of any of the above methods M1-M3, the at least one payment peripheral is a coin acceptor.

(M5) In some implementations of any of the above methods M1-M4, the request is received at the electronic payment module after a user selects the payment accepting unit at which to receive the approved refund of the predetermined amount.

(M6) In some implementations of any of the above methods, the approved refund is approved by a server after the server receives a refund request from the device that is distinct from the electronic payment module.

In some implementations, an electronic payment module (e.g., payment module 100 or 1300 of FIG. 26A) is provided that includes: one or more processors, memory, a slave interface that couples the electronic payment module with a payment accepting unit (such as an unattended vending machine) via an electronic payment interface (such as a multi-drop bus (MDB)), and one or more host interfaces that couple the electronic payment module with at least one payment peripheral of the payment accepting unit, wherein the memory stores one or more programs to be executed by the one or more processors, the one or more programs comprising instructions for performing any of the above methods M1-M6.

In some implementations, a non-transitory computer readable storage medium (e.g., a memory of a payment module 100 or 1300 of FIG. 26A) is provided that stores one or more programs, the one or more programs including instructions, which, when executed by a device with one or more processors, a slave interface that couples the electronic payment module with a payment accepting unit (such as an unattended vending machine) via an electronic payment interface (such as a multi-drop bus (MDB)), and one or more host interfaces that couple the electronic payment module with at least one payment peripheral of the payment accepting unit, cause the device to perform the method of any of the above methods M1-M6.

In some implementations, a method (M7) for processing and distributing payment accepting unit (e.g., unattended vending machine) refunds is performed at a refunds processing device that includes one or more processors, memory, the memory storing one or more programs for execution by the one or more processors to perform the method including: receiving at the refunds processing device a request for a refund for an end user transaction with a first payment accepting unit, wherein the end user has a known location; transmitting the request to a refunds authorizing server distinct from the refunds processing device; receiving from the refunds authorizing server an authorization message authorizing the refund, the message designating a specific payment accepting unit in proximity to the known location of the end user that is: a) communicatively coupled to the refunds processing device; and b) configured to provide payment of the refund; transmitting to the specific payment accepting unit an electronic command to issue the refund subject to one or more conditions; transmitting the one or more conditions to the end user to enable the end user to comply with the conditions and therefore complete the refund.

In some implementations, a refunds processing device (E.g., a refund processing device 2630 or mobile device 1500 of FIG. 26B or an electronic device 3002 of FIGS. 30A-G and 31A-B, such as Refund Center device) is provided that includes: one or more processors, memory and communication capabilities configured to communicatively couple the refunds processing device to a refunds authorizing server (e.g., the refund processing server 2622 of FIG. 26B) and one or more payment accepting units (e.g., one or more payment accepting machines 120 of FIG. 26B), wherein the memory stores one or more programs to be executed by the one or more processors, the one or more programs comprising instructions for performing the above method M7.

In some implementations, a non-transitory computer readable storage medium (e.g., a memory of a refund processing device 2630 of FIG. 26B) storing one or more programs is provided, the one or more programs including instructions, which, when executed by a refunds processing device that includes: one or more processors, memory and communication capabilities configured to communicatively couple the refunds processing device to a refunds authorizing server and one or more payment accepting units, cause the device to perform the above method M7.

Numerous benefits apparent to one or ordinary skill in the art are provided by the refund processing and dispensing discussed herein. In particular, users can quickly process and receive refunds, the implementations can be produced at relatively low-cost (machine dispensing the refund just needs to have a payment module 100), in tablet-based refund centers the tablets can be purchased at a very low cost (e.g., less than $100), streamlined accountability and reporting for unattended machines, refunds can be paid from machine that had the trouble (if desired), and easy and quick installation.

Miscellaneous

It should be noted that relative terms are meant to help in the understanding of the technology and are not meant to limit the scope of the invention. Similarly, unless specifically stated otherwise, the terms used for labels (e.g., "first," "second," and "third") are meant solely for purposes of designation and not for order or limitation. The term "short" in the phrase "short-range" (in addition to having technology specific meanings) is relative to the term "long" in the phrase "long-range."

The terms "may," "might," "can," and "could" are used to indicate alternatives and optional features and only should be construed as a limitation if specifically included in the claims.

It should be noted that, unless otherwise specified, the term "or" is used in its nonexclusive form (e.g., "A or B" includes A, B, A and B, or any combination thereof, but it would not have to include all of these possibilities). It should be noted that, unless otherwise specified, "and/or" is used similarly (e.g., "A and/or B" includes A, B, A and B, or any combination thereof, but it would not have to include all of these possibilities). It should be noted that, unless otherwise specified, the terms "includes" and "has" mean "comprises" (e.g., a device that includes, has, or comprises A and B contains A and B, but optionally may contain C or additional components other than A and B). It should be noted that, unless otherwise specified, the singular forms "a," "an," and "the" refer to one or more than one, unless the context clearly dictates otherwise.

It is to be understood that the inventions, examples, and implementations described herein are not limited to particularly exemplified materials, methods, and/or structures. It is to be understood that the inventions, examples, and implementations described herein are to be considered preferred inventions, examples, and implementations whether specifically identified as such or not.

The terms and expressions that have been employed in the foregoing specification are used as terms of description and not of limitation, and are not intended to exclude equivalents of the features shown and described. While the above is a complete description of selected implementations of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A method, comprising:
at a mobile device:
receiving a request for a cash payment;
transmitting the request to an authorizing server distinct from the mobile device;
receiving from the authorizing server an authorization message authorizing the cash payment;
in response to receiving the authorization message, receiving a user selection of a payment accepting machine distinct from the mobile device;
transmitting from the mobile device to the payment accepting machine an electronic command including one or more time-dependent and payment accepting machine-dependent conditions, wherein a first of the one or more time-dependent and payment accepting machine-dependent conditions comprises a predefined time or time period by which a button or control at the payment accepting machine must be engaged;
displaying the one or more time-dependent and payment accepting machine-dependent conditions on a display of the mobile device;
at the payment accepting machine:
receiving the electronic command and the one or more time-dependent and payment accepting machine-dependent conditions from the mobile device;
determining that the one or more time-dependent and payment accepting machine-dependent conditions are met, including determining that the button or control at the payment accepting machine has been engaged within the predefined time or time period; and
in response to the determination that the one or more time-dependent and payment accepting machine-dependent conditions are met, issuing the cash payment.

2. The method of claim 1, further comprising, at the payment accepting machine:
identifying a message sent via a multi-drop bus (MDB) of the payment accepting machine; and
determining that the button or control at the payment accepting machine has been engaged based on the message received via the MDB.

3. The method of claim 1, wherein the mobile device is a dedicated electronic device distinct from the payment accepting machine.

4. The method of claim 1, wherein the mobile device is a personal mobile device distinct from the payment accepting machine.

5. The method of claim 2, further comprising, at the payment accepting machine:
in response to the determination that the one or more time-dependent and payment accepting machine-dependent conditions are met, issuing:
(i) a first signal via the MDB making a payment peripheral of the payment accepting machine unavailable for vending transactions, and
(ii) a second signal via the MDB causing the payment peripheral to issue the cash payment.

6. The method of claim 1, wherein the cash payment is a refund of a failed vending transaction involving the payment accepting machine.

7. The method of claim 1, wherein the cash payment is a refund of a failed vending transaction involving a different payment accepting machine.

8. The method of claim 1, wherein the cash payment is a withdrawal from a user account that is linked with the authorizing server.

9. The method of claim 1, wherein transmitting the electronic command from the mobile device to the payment accepting machine includes transmitting an encrypted payload secured with a unique private key to a multi-drop bus (MDB) router of the payment accepting machine.

10. The method of claim 1, wherein the payment accepting machine is a vending machine, a parking meter, a toll booth, a washer, a dryer, an arcade game, a kiosk, a photo booth, or a transit ticket dispensing machine.

11. The method of claim 1, wherein determining that the button or control at the payment accepting machine has been engaged within the predefined time or time period includes determining that a coin return button at the payment accepting machine has been pressed within the predefined time or time period.

12. The method of claim 1, wherein determining that the one or more time-dependent and payment accepting machine-dependent conditions are met further includes determining that a valid code has been entered at the payment accepting machine within the predefined time or time period.

* * * * *